US012811671B2

(12) United States Patent
Ravishankar et al.

(10) Patent No.: US 12,811,671 B2
(45) Date of Patent: Nov. 24, 2026

(54) RESOURCE-EFFICIENT MULTICAST IN NON-TERRESTRIAL NETWORKS WITH NON-TRANSPARENT SATELLITES

(71) Applicant: Hughes Network Systems, LLC, Germantown, MD (US)

(72) Inventors: Channasandra Ravishankar, Clarksburg, MD (US); James Jehong Jong, North Potomac, MD (US); Nassir BenAmmar, Rockville, MD (US); Deepak Arur, Vienna, VA (US); Subramanya Krishna, Rockville, MD (US); Gaguk Zakaria, College Park, MD (US); Ganeshan Ramachandran, Frederick, MD (US); Bala Subramanian, Potomac, MD (US)

(73) Assignee: Hughes Network Systems, LLC, Germantown, MD (US)

( * ) Notice: Subject to any disclaimer, the term of this patent is extended or adjusted under 35 U.S.C. 154(b) by 266 days.

(21) Appl. No.: 18/811,433

(22) Filed: Aug. 21, 2024

(65) Prior Publication Data

US 2025/0080213 A1 Mar. 6, 2025

Related U.S. Application Data

(60) Provisional application No. 63/541,148, filed on Sep. 28, 2023, provisional application No. 63/579,459, filed on Aug. 29, 2023.

(51) Int. Cl.
*H04B 7/185* (2006.01)
*H04B 7/0408* (2017.01)
(Continued)

(52) U.S. Cl.
CPC ....... *H04B 7/18523* (2013.01); *H04B 7/0408* (2013.01); *H04B 7/18539* (2013.01);
(Continued)

(58) Field of Classification Search
CPC .. H04B 7/185; H04B 7/1851; H04B 7/18539; H04W 52/143; H04W 52/241
See application file for complete search history.

(56) References Cited

U.S. PATENT DOCUMENTS 8,848,573 B1 9/2014 Maxwell
2016/0021021 A1* 1/2016 Dankberg .............. H04W 4/06 709/226

(Continued)

OTHER PUBLICATIONS

Geraci, et al., "Integrating Terrestrial and Non-Terrestrial Networks: 3D Opportunities and Challenges", Institute of Electrical and Electronics Engineers Communications Magazine, vol. 61, No. 4, Apr. 2023, pp. 42-48.

*Primary Examiner* — Mahran Y Abu Roumi
(74) *Attorney, Agent, or Firm* — Kilpatrick Townsend & Stockton LLP

(57) ABSTRACT

Systems and methods are described herein for providing network and protocol architectures to achieve efficient high speed data services in an integrated terrestrial-non-terrestrial network (iTNTN). The iTNTN can include at least a non-geostationary orbit (NGSO) satellite system and terrestrial radio access and core network infrastructures based on cellular standards (e.g., 5G). Embodiments specially configure packet-based routing and dynamic cell-CU-DU (cell to centralized unit to distributed unit) association to accommodate dynamically changing LEO satellite locations and other iTNTN characteristics. These and other configurations are used to enable features, including end-to-end IP data and Layer 2 data services, integrated LEO-GEO (low-Earth orbit and geosynchronous Earth orbit) and LEO-MEO (low-Earth orbit and medium-Earth orbit) services, direct UT-UT (user terminal to user terminal) services, and resource efficient multicast services.

20 Claims, 43 Drawing Sheets

(51) Int. Cl.
*H04B 7/195* (2006.01)
*H04W 48/20* (2009.01)

(52) U.S. Cl.
CPC ....... *H04B 7/1858* (2013.01); *H04B 7/18584* (2013.01); *H04B 7/195* (2013.01); *H04W 48/20* (2013.01)

(56) References Cited

U.S. PATENT DOCUMENTS

| | | | | |
|---|---|---|---|---|
| 2023/0022283 A1* | 1/2023 | Wigard | H04B 7/18504 | |
| 2023/0079636 A1* | 3/2023 | Edge | H04B 7/18513 | 370/316 |
| 2023/0269780 A1* | 8/2023 | Ravishankar | H04B 7/185 | 370/329 |

* cited by examiner

RESOURCE-EFFICIENT MULTICAST IN NON-TERRESTRIAL NETWORKS WITH NON-TRANSPARENT SATELLITES

CROSS-REFERENCES TO RELATED APPLICATIONS

This application claims priority from U.S. provisional patent application number 63/541,148, filed on Sep. 28, 2023, titled "SYSTEM AND METHODS FOR 5G BASED NGSO OPERATION WITH NON-TRANSPARENT SATELLITES"; and from U.S. provisional patent application No. 63/579,459, filed on Aug. 29, 2023, titled "NETWORK AND PROTOCOL ARCHITECTURES FOR 5G COMMUNICATION USING NON-GEOSTATIONARY SATELLITES"; the entire disclosures of which are incorporated in their entirety herein.

BACKGROUND OF THE INVENTION

Wireless connectivity continues to evolve to meet demands for ubiquity, convenience, reliability, speed, responsiveness, and the like. For example, each new generation of cellular communication standards, such as the move from 4G/LTE (fourth generation long-term evolution) networks to 5G (fifth generation) networks, has provided a huge leap in capabilities along with new and increasing demands on the infrastructures that enable those networks to operate. For example, 5G supports innovations, such as millimeter-wave frequencies, massive MIMO (Multiple Input Multiple Output), and network slicing, which enhance connectivity for unprecedented numbers of devices and data-intensive applications.

More recently, innovations in 5G networking (and its successors) have expanded from terrestrial-based communication infrastructures to so-called non-terrestrial network (NTN) infrastructures. NTN infrastructures leverage satellites and high-altitude platforms to extend 5G coverage and capabilities, such as to serve remote and otherwise underserved areas. Effective deployment of NTN solutions can help support connectivity and applications for rural users, emergency responders, global Internet-of-Things (IoT) deployments, etc.

However, non-terrestrial communication carry complexities and design concerns that are not present in terrestrial-based communications, which can add significant technical hurdles to NTN deployments. For example, effective ground-to-satellite communications involves accounting for orbital dynamics, handovers and/or other transitions between satellites, path loss, propagation delay, atmospheric conditions, inter-satellite and/or inter-beam interference, spectrum and regulatory considerations, and other considerations. New approaches continue to be developed to find technical solutions for overcoming, or at least mitigating, these and other technical hurdles.

BRIEF SUMMARY OF THE INVENTION

Systems and methods are described herein for providing network and protocol architectures to achieve efficient high speed data services in an integrated terrestrial-non-terrestrial network (iTNTN). As used herein, an iTNTN can include at least a non-geostationary orbit (NGSO) satellite system and a satellite radio access network that uses terrestrial (e.g., 5G) standards and protocols. Embodiments specially configure packet-based routing and dynamic cell-CU-DU (cell to centralized unit to distributed unit) association to accommodate dynamically changing LEO satellite locations and other iTNTN characteristics. These and other configurations are used to enable features, including end-to-end IP data and Layer 2 data services, integrated LEO-GEO (low-Earth orbit and geosynchronous Earth orbit) and LEO-MEO (low-Earth orbit and medium-Earth orbit) services, direct UT-UT (user terminal to user terminal) services, and resource efficient multicast services.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, various specific details are set forth in order to provide a thorough understanding of embodiments of the present disclosure. It will be apparent, however, that embodiments of the present disclosure may be practiced without these specific details. Several features described hereafter can each be used independently of one another or with any combination of other features. An individual feature may not address all of the problems discussed above or might address only some of the problems discussed above. Some of the problems discussed above might not be fully addressed by any of the features described herein.

Figure 1:
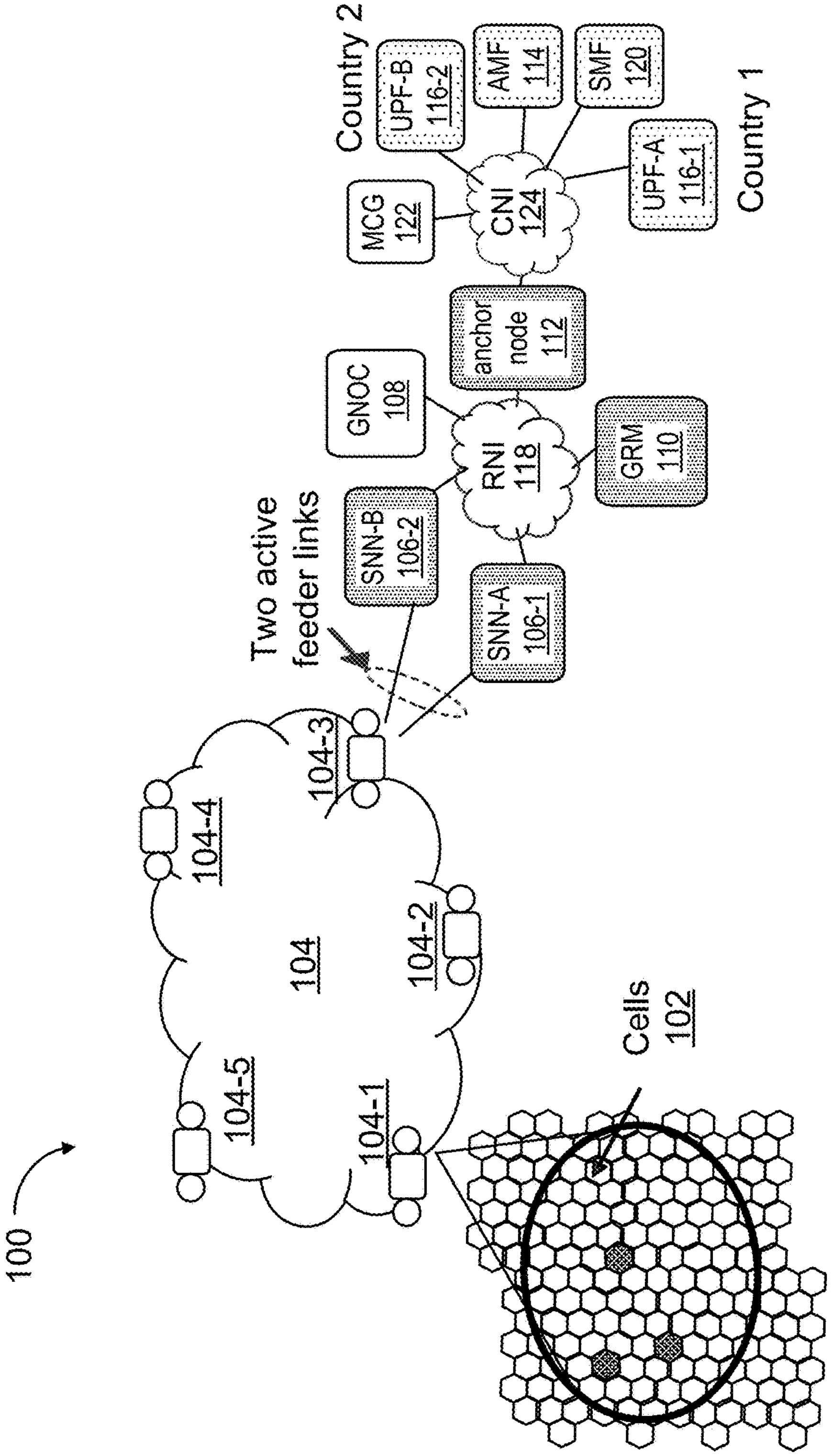
FIG. 1, an example network architecture is shown for implementing an integrated terrestrial-non-terrestrial network (iTNTN) with a non-geostationary satellite system.

Turning first to FIG. 1, an example network architecture 100 is shown for implementing an integrated terrestrial-non-terrestrial network (iTNTN) with a non-geostationary satellite system. The term integrated terrestrial-non-terrestrial network (iTNTN) is used herein to generally include any type of network that includes an NTN extension of terrestrial network concepts. Different iTNTN deployments can involve different amounts of integration between non-terrestrial and terrestrial network concepts. For example, some iTNTN deployments fully integrate components of the terrestrial and non-terrestrial networks to form an integrated network. In other cases, the iTNTN can operate predominantly (or even solely) with non-terrestrial components without a direct or seamless integration into any terrestrial network infrastructure; the "integration" in such cases being based on integration of terrestrial (e.g., 5G) protocols into satellite communications (e.g., by the satellite radio access network). For example, such an iTNTN can be used in scenarios where terrestrial connectivity is minimal or absent, such as in remote or oceanic regions, and the iTNTN (e.g., a 5G NTN) can be designed to provide connectivity directly from one or more multi-beam satellites to user terminals without routing through terrestrial base stations or a core network. Thus, references to iTNTNs herein broadly include any network deployments in which satellite communication use and/or integrate with terrestrial protocols and standards, such as any 5G NTN deployments.

The network architecture 100 may include one or more user terminals in designated cells 102 illuminated by a satellite network 104 including a plurality of satellites (104-1, 104-2, 104-3 . . . 104-N) communicatively coupled with a ground network. The ground network includes a satellite radio access network (RAN, SRAN); a global network operations center (GNOC) 108; a global resource manager (GRM) 110 (which can include at least a route determination function (RDF) module); and a core network (CN). The SRAN can include one or more satellite network nodes (SNNs) 106 (also referred to as SNN sites herein), such as SNN-A 106-1 and SNN-B 106-2, and an anchor node 112 (also referred to herein as an anchor node, AN). The CN can include an access and mobility function (AMF) module 114, one or more user plane function (UPF) modules 116, a session management function (SMF) 120, and a multicast gateway (MCG) 122. For example, a first UPF 116-1 is in a first country, and a second UPF 116-2 is in a second country.

The illustrated SNNs 106 can be implemented by any suitable network component for facilitating communications and data exchange between the satellites of the satellite network 104 and the ground network infrastructure. For example, the SNNs implement functions relating to relaying data between the satellite network 104 and the ground network, including managing uplink and downlink communications. The SNNs 106 can also help to ensure compatibility between satellite communication protocols and terrestrial network protocols.

User terminals in the cells 102 communicate with the ground network through the satellite network 104. At any given instant of time, the user terminals may communicate on a Ku user link of a satellite and the ground network/node may communicate on Ka/V/Q feeder link of a satellite in the satellite network 104. Other implementations can use any feasible spectrum bands for communications.

As illustrated, the satellites of the satellite network 104 can be implemented as a constellation of satellites. The satellite (for example, SAT3 104-3) with which the ground network/node communicates may be different from the satellite (for example, SAT1 104-1) with which the user terminal (controlled by that ground node) may be communicating. For example, the user terminals are communicating with the SAT1 104-1 to reach the ground node (for example, SNN-A 106-1 or SNN-B 106-2) that is communicating with the SAT3 104-3. Inter-satellite links (ISLs) may be used to establish connectivity between the satellites (104-1, 104-2, 104-3 . . . 104-N) in the satellite network 104. In an example, a lightweight software defined satellite networking concept may be used to find the best route between two satellites in the satellite network 104.

The SNN-A 106-1 and the SNN-B 106-2 may communicate with the SAT3 104-3 through active feeder links, such as the two active feeder links shown in FIG. 1. The SNN-A 106-1, the SNN-B 106-2, the GNOC 108, the GRM 110, and the anchor node 112 may communicate with each other via a RAN network infrastructure (RNI) 118, which can include any one or more suitable networks, such as one or more local-area networks (LANs) and/or wide-area networks (WANs). The GNOC 108 may operate for multiple networks across various geographies from one central location. The AMF module 114, UPF modules 116, SMF module 120, and multicast gateway 122 may communicate with each other via a CN network infrastructure (CNI) 124, which can include any one or more suitable networks, such as one or more LANs and/or WANs. The anchor node 112 can communicatively couple the RNI 118 with the CNI 124.

A person of ordinary skill in the art will understand that there may be any number of user terminals, satellites, or other components in the network architecture 100. As used herein, the user terminal may refer to a wireless device and/or a user equipment (UE). The terms "computing device," "wireless device," "user device," and "user equipment (UE)" may be used interchangeably throughout the disclosure. A user device or the UE may include, but not be limited to, a handheld wireless communication device (e.g., a mobile phone, a smart phone, a phablet device, and so on), a wearable computer device (e.g., a head-mounted display computer device, a head-mounted camera device, a wristwatch computer device, and so on), a Global Positioning System (GPS) device, a laptop computer, a tablet computer, or another type of portable computer, a media playing device, a portable gaming system, and/or any other type of computer device with wireless communication capabilities, etc.

In an example, the user devices may communicate with the satellite network 104 and/or the ground network and/or the core network via a set of executable instructions residing on any operating system. In an example, the user devices may include, but are not limited to, any electrical, electronic, electro-mechanical or an equipment or a combination of one or more of the above devices such as virtual reality (VR) devices, augmented reality (AR) devices, laptop, a general-purpose computer, desktop, personal digital assistant, tablet computer, mainframe computer, or any other computing device, wherein the user device may include one or more in-built or externally coupled accessories including, but not limited to, a visual aid device such as camera, audio aid, a microphone, a keyboard, input devices for receiving input from a user such as touch pad, touch enabled screen, electronic pen, etc. A person of ordinary skill in the art will appreciate that the user devices may not be restricted to the mentioned devices and various other devices may be used.

The satellite network 104 may be communicatively coupled to the user devices in the cell 102 via a network. The satellite network 104 may communicate with the user devices in a secure manner via the network. The network may include, by way of example, but not limited to, at least a portion of one or more networks having one or more nodes that transmit, receive, forward, generate, buffer, store, route, switch, process, or a combination thereof, etc. one or more messages, packets, signals, some combination thereof, or so forth. The network may also include, by way of example, but not limited to, one or more of a wireless network, a wired network, an internet, an intranet, a public network, a private network, a packet-switched network, a circuit-switched network, an ad hoc network, an infrastructure network, a Public-Switched Telephone Network (PSTN), a cable network, a cellular network, a satellite network, a fibre optic network, or some combination thereof. In particular, the network may be any network over which the user devices communicate with the satellite network 104.

Although FIG. 1 shows exemplary components of the network architecture 100, in other examples, the network architecture 100 may include fewer components, different components, differently arranged components, or additional functional components than depicted in FIG. 1. Additionally, or alternatively, one or more components of the network architecture 100 may perform functions described as being performed by one or more other components of the network architecture 100.

Figure 2:
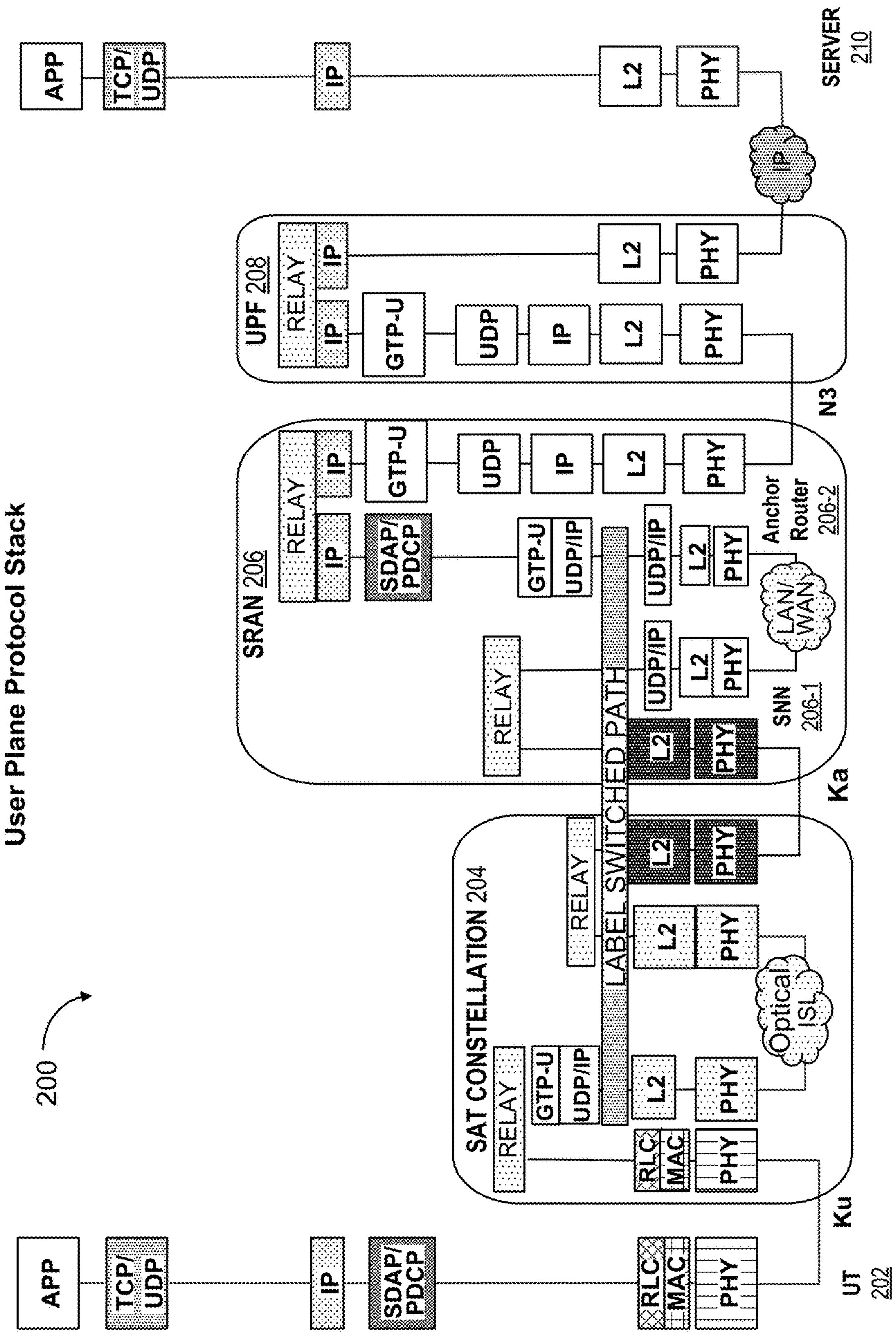
FIG. 2 illustrates an example representation of an end-to-end protocol stack for user plane for the proposed system.

FIG. 2 illustrates an example representation of an end-to-end protocol stack for user plane 200 for the proposed system. Components depicted in FIG. 2 may be similar to the components of FIG. 1 in their functionality. The illustrated end-to-end protocol stack for user plane 200 may be based on the Third Generation Partnership Project (3GPP) 5G new radio (NR) protocol stack with satellite-specific enhancements described herein, such as enhancements to the access stratum. Although embodiments are described herein with reference to 5G and related standards and protocols, techniques described herein can be modified to accommodate other (e.g., subsequent) versions and generations of architectures, such as fourth generation (4G) long-term evolution (LTE), sixth generation (6G), seventh generation (7G), etc. Physical (PHY), medium access control (MAC), and radio link control (RLC) layers of air interface may be implemented in a user-satellite link of the satellites of a satellite network (i.e., between user terminal(s) 202 and satellite(s) in the satellite network 204). The satellite network 204 may be an implementation of the satellite network 104 of FIG. 1 and may include a constellation of multiple satellites. In some embodiments, the user-satellite link is implemented via a Ku interface.

In the illustrated end-to-end protocol stack for user plane 200, packet data convergence protocol (PDCP) and service data adaptation protocol (SDAP) layers of the protocol stack (e.g., the 5G protocol stack) are implemented between the UT 202 and an anchor node 206-2 of a satellite radio access network (SRAN) 206. In earlier generations of mobile networks, the SRAN was implemented as a GPRS (general packet radio service) RAN. In 5G and next-generation mobile networks, the SRAN is sometimes referred to as a NG-RAN (next-generation RAN), and typically includes a base station (e.g., a gNodeB, or gNB), an evolved NodeB (eNB), a next-generation evolved NodeB (ng-eNB), or the like. These components manage communication between the network and mobile devices using new radio (NR) technologies. The SRAN 206 can also implement one or more satellite network nodes (SNNs) 206-1. The illustrated SNN 206-1 may be an implementation of the SNN-A 106-1 or the SNN-B 106-2 of FIG. 1. The anchor node 206-2 may be an implementation of the anchor node 112 of FIG. 1.

The PDCP layer implements access stratum encryption, integrity protection, and header compression. Both IP header compression as well as Layer-2 (L2) header compression are supported by the anchor node 206-2. The interface between the PHY, MAC, and RLC layers in the satellite user-link and the PDCP and SDAP layers in the anchor node 206-2 is based on 3GPP "F1" interface specifications (e.g., as defined by 3GPP TS 38.470). Typically, the PHY, MAC, and RLC layers are implemented in a distributed unit (DU) of a 5G architecture, while PDCP and SDAP layers are implemented in a central unit of the 5G architecture. As such, the illustrated end-to-end protocol stack for user plane 200 effectively splits the CU and DU functions between the satellite and ground portions of the network.

As illustrated, the SNN 206-1 and the anchor node 206-2 may connected via a network, such as a LAN or WAN. For example, as illustrated in FIG. 1, the SNN 206-1 and the anchor node 206-2 can be in communication via GIN 118. The link between the SNN 206-1 and the anchor node 206-2 may support guaranteed delivery and/or flow control. In some embodiments, the satellite network 204 communicatively couples with the SRAN 206 via a Ka-band interface. In some embodiments, the interface between the SRAN 206 and the 5G core network (5GC) elements is a standard N3 interface. As illustrated, label-based switching can be used between endpoints of the connection between the satellite user link and the anchor node 206-2. Such label-based switching is described in more detail below (e.g., with reference to FIGS. 6 and 25).

The anchor node 206-2 may be connected to multiple UPFs 208. To avoid overcomplicating the Figure, only a single UPF 208 is shown. For example, separate UPFs 208 can be implemented in different countries to permit user terminal position-based legal interception. The anchor node 206-2 may route sessions belonging to the user terminal 202 to an appropriate UPF 208 based on a location of the user terminal 202. Further, the UPF 208 may be connected to a server 210 to provide appropriate services to the user terminal 202.

For example, a protocol for a management plane between the user terminal 202 and the device management server 210 may use the end-to-end protocol stack for user plane 200. This may be carried over a separate data network name (DNN) between the user terminal 202 and the device management server 210. Air interface protocols may permit the user terminal(s) 202 to establish IP connections to multiple DNNs, and one of these DNNs may be for the management plane. Management plane protocol stacks can also be provided between satellites and ground elements, such as a route determination function (RDF). In addition to determining routes for normal operation, the RDF can be augmented to deal with inter-constellation interference proactively. For example, the RDF can determine and execute alternate routes when it is predicted that there will be a strong in-line interference with a satellite from a different constellation using the same band. To further improve this function, machine learning techniques can be employed whereby the signature of interference from interferer is learned over time and is applied in the re-routing algorithm.

Figure 3:
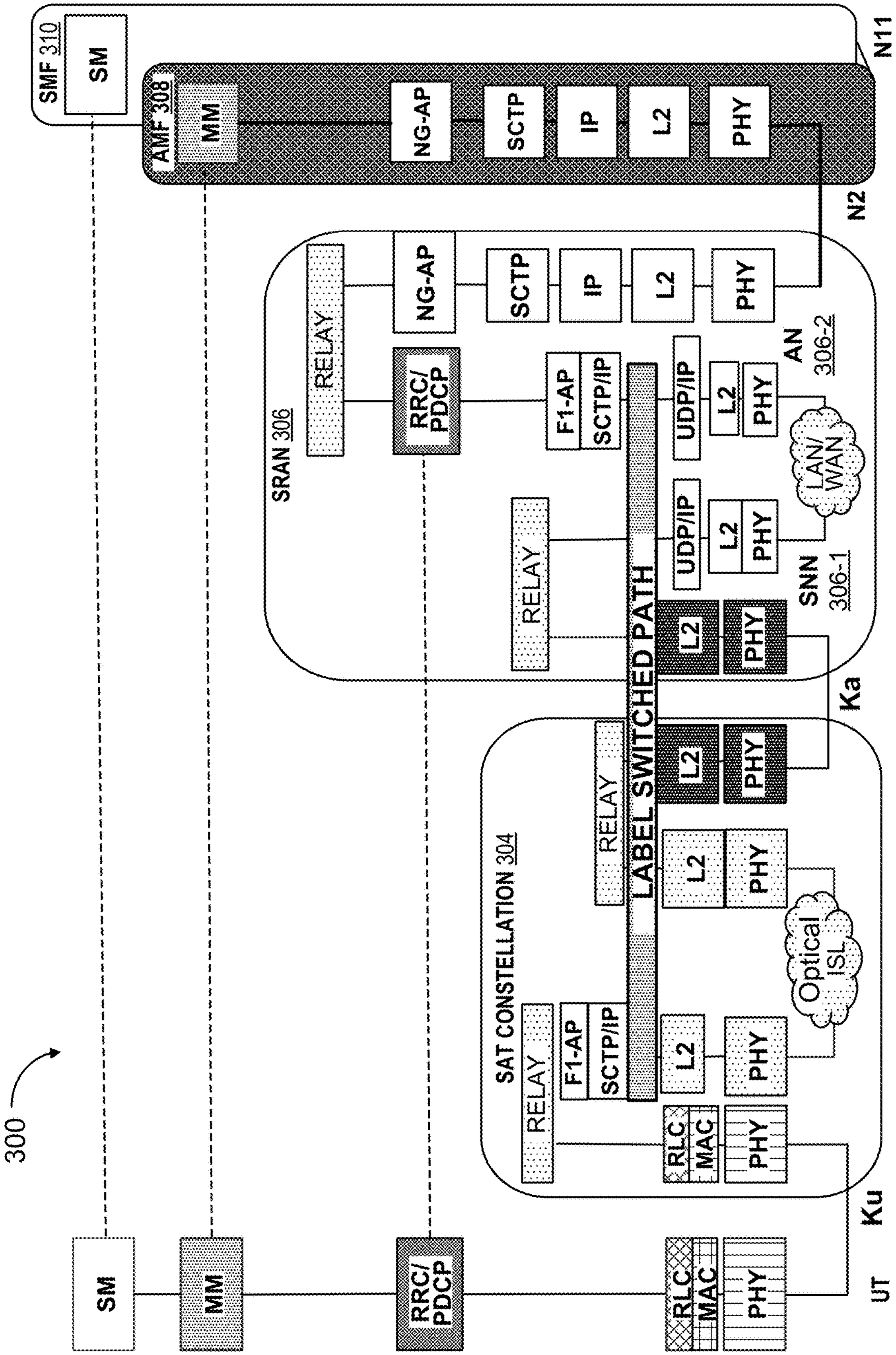
FIG. 3 illustrates an example representation of an end-to-end protocol stack for control plane for the proposed system.

FIG. 3 illustrates an example representation of an end-to-end protocol stack for control plane 300 for the proposed system. The components depicted in FIG. 3 may be similar to the components of FIGS. 1 and 2 in their functionality. Non-access stratum (NAS) protocols between a user terminal 302 and an AMF 308 (in a 5G core network) may be based on terrestrial standards. Access stratum protocols may be optimized for a satellite environment.

As illustrated, the radio resource control (RRC) and PDCP layers are between a UT 302 and a SRAN 306. The PHY, MAC, and RLC layers are between the UT 302 and a user-link of each satellite of a satellite network 304. The interface between the PHY, MAC, and RLC layers of the satellite user-link and the PDCP and SDAP layers in an anchor node 306-2 are based on 3GPP F1-AP interface specifications. The interface between the SRAN 306 and core network functions (e.g., the 5G core network) is based on standard terrestrial NG-AP protocols, such as defined in 3GPP TS 38.413 standards. For example, the SRAN 306 communicates with the AMF 308 using a standard N2 interface, and the AMF communicates with a session management function 310 in the 5G core network using a standard N11 interface. The Ka-band feeder link can be standards-based, such as based on a standard DVB-S2X feeder link. The SRAN 306 can be implemented to accommodate other variants of forward error correction (FEC), such as Consultative Committee for Space Data Systems (CCSDS) FEC for optical communications, or 5G-NR FEC.

Figure 4:
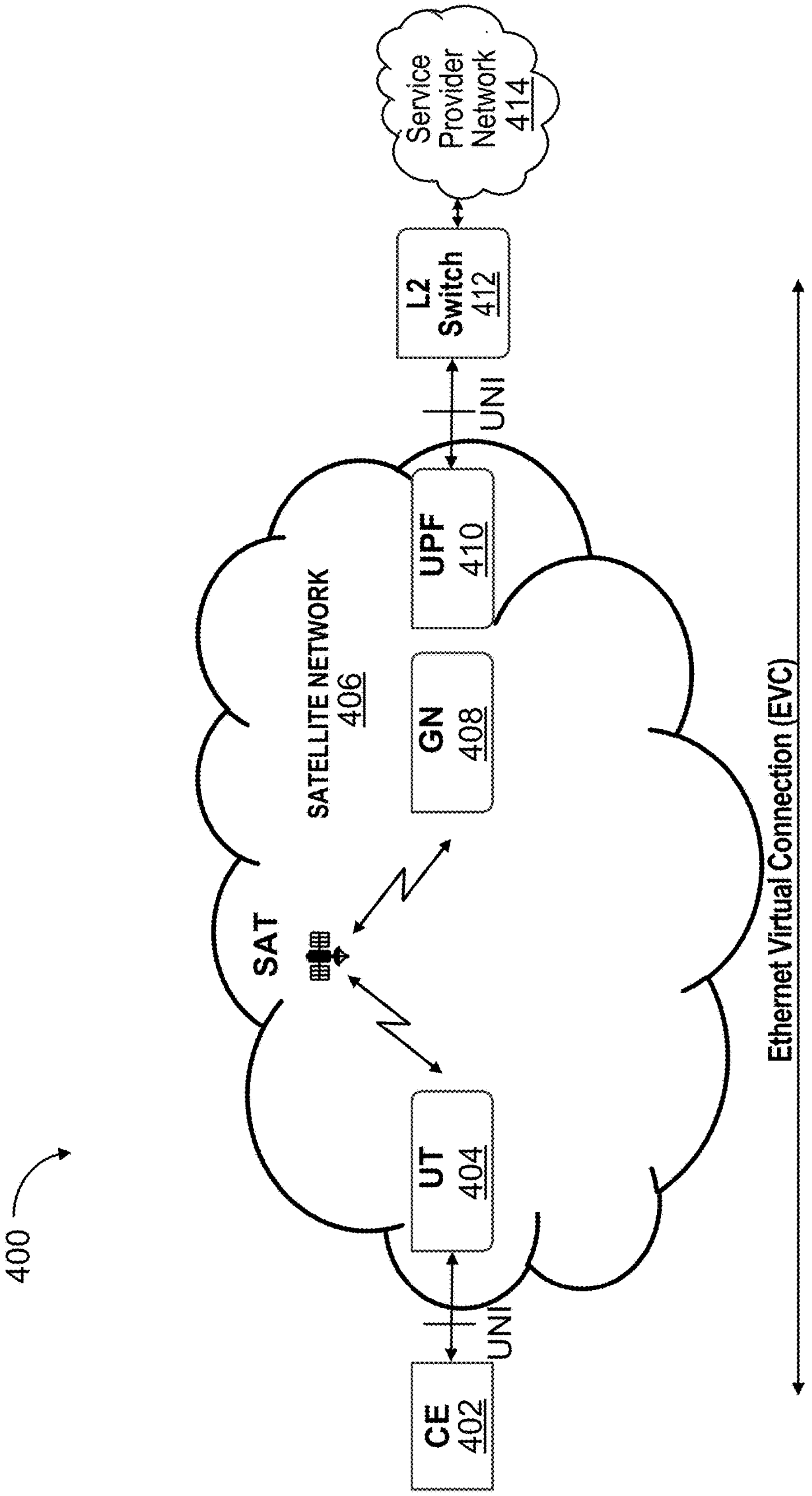
FIG. 4 illustrates an example representation of a layer 2 (L2) transport layer over the proposed system.

FIG. 4 illustrates an example representation of a layer 2 (L2) transport layer 400 over the proposed system. The L2 transport layer 400 seeks to provide L2-like links between UTs 402 and the core network to be compatible with metro Ethernet standards. Embodiments exploit an Ethernet protocol data unit (PDU) session type that has been introduced in 5G standards, such as Section 5.6.10.2 of 3GPP TS 23.501, version h.3.0. An Ethernet frame generated by a terminal equipment (TE) 402 attached to a user terminal 404 may be tunneled through a satellite network 406, such that core network (i.e. UPF 410) output may be identical to the Ethernet frame generated at the source. The Ethernet frame may be sent through the ground node (GN) 408 to the UPF 410. Further, through a L2 switch 412, the Ethernet frame may be sent from the TE 402 to a service provider network 414.

In some implementations, an Ethernet preamble and start-of-frame delimiter may not be transmitted over the satellite network 406. For uplink traffic, the user terminal 404 may strip the preamble, start-of-frame delimiter, and frame check sequence (FCS) from the Ethernet frame. For downlink traffic, the UPF 410, acting as a packet data unit (PDU) session anchor, may strip the preamble, start-of-frame delimiter, and FCS from the Ethernet frame.

As illustrated, in accordance with Metro Ethernet specifications, a customer service connection may be made at a user-network interface (UNI). The satellite network 406 between UNIs may be made through an Ethernet Virtual Connection (EVC). The EVC may maintain an Ethernet MAC address and unaltered frame contents, which can enable establishing layer 2 connectivity between locations. This can also ensure that traffic moves between the intended UNIs.

Figure 5:
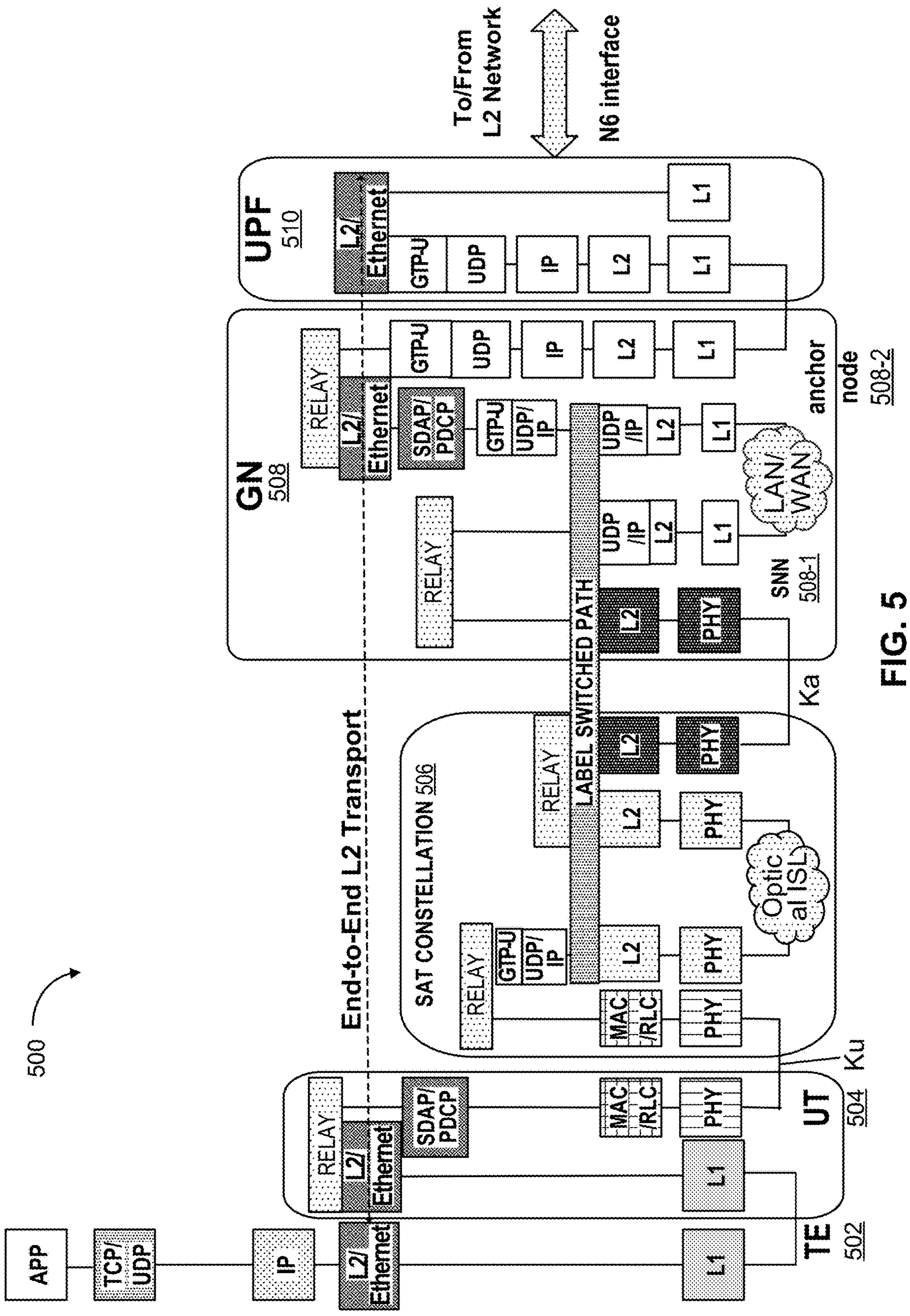
FIG. 5 illustrates an example representation of an end-to-end protocol stack for L2 transport over the proposed system.

FIG. 5 illustrates an example representation of an end-to-end protocol stack for layer 2 transport 500 over the proposed system. An Ethernet frame may be generated at a terminal equipment (TE) 502 attached to a user terminal (UT) 504. The Ethernet frame may be tunneled through a satellite network 506 and a ground network (GN) 508, including an SNN 508-1 and an anchor node 508-2. The anchor node 508-2 can connect to a core network (e.g., 5G core) including a UPF 510. Ethernet header compression (EHC) defined in 3GPP TS 38.323, version g.6.0 may be implemented in PDCP layer at the anchor node 508-2 in the GN 508 and the user terminal 504 in order to be efficient over the air and to minimize overhead. For example, this can permit a reduction of the Ethernet header from 18 bytes to 2 bytes.

Figure 6:
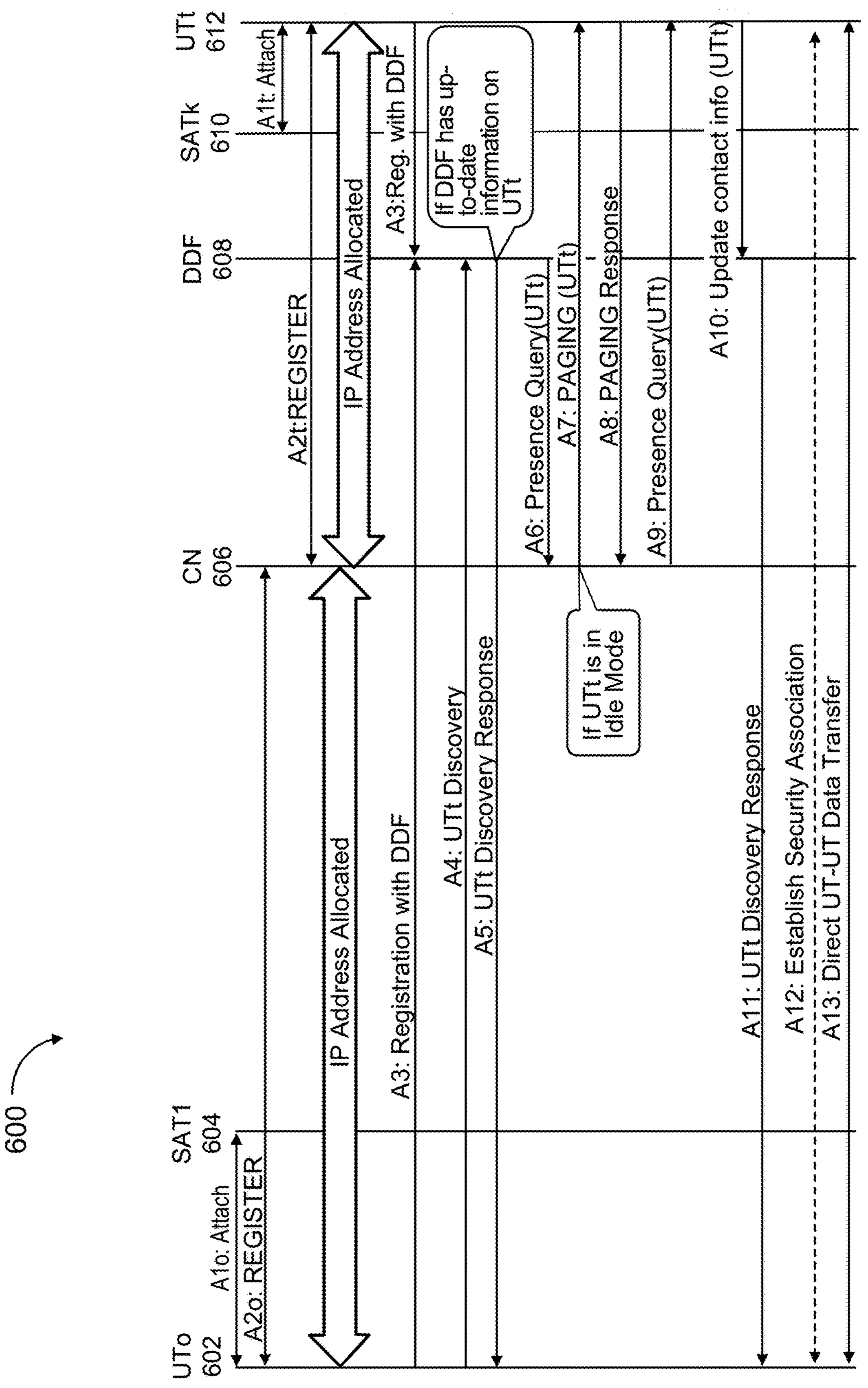
FIG. 6 illustrates an example signal flow for implementing direct user terminal to user terminal (UT) connectivity.

FIG. 6 illustrates an example signal flow 600 for implementing direct user terminal to user terminal (UT) connectivity. Direct UT-to-UT connectivity may be achieved based on a proposed label switched routing framework. Here, direct UT-to-UT connectivity may be achieved by providing ingress and egress satellite endpoints with labels that points to each other. For example, each user terminal is provided with a label that points to a satellite and cell that the other user terminal may be currently communicating with. In an example, packets belonging to a given destination user terminal may be directed to a queue pertinent to the cell with which the destination user terminal may be associated. In an example, when the destination user terminal is in an idle mode, the core network may page the user terminal, after which the direct UT-to-UT session may be established. For additional protection, the two user terminals may establish a security association between themselves using security keys, as illustrated.

The direct discovery function (DDF) module 608 may be implemented as a 5G Direct Discovery Name Management Function (DDNMF), if the 5G core network supports it. DDNMF is defined in 3GPP as a proximity services feature. A primary use case for direct UT-to-UT sessions is to prevent ability to intercept communications between two user terminals on the ground. However, there are use cases where these communications must be allowed to be intercepted on the ground. In such cases, the ingress and egress satellites are provided with a second route such that the satellites replicate packets from a UT to two routes (one to the destination UT and another to the SRAN). In addition, the security key used for the UT-to-UT route and the UT-to-SRAN route will be the same. The control plane traffic for a direct UT-to-UT session may still be through the SRAN and may use the end-to-end protocol stack for control plane 300 illustrated in FIG. 3.

The flow 600 is illustrated as including steps "A1"-"A13." At steps "A1," a source user terminal (UTo) 602 and a destination user terminal (UTt) 612 may each attach and establish a PDU session with a core network (CN) 606. For example, at stage "A1o" UTo 602 may attach and establish a PDU session with the CN 606 (or a particular CN 6060, not explicitly shown) via a source satellite (SAT1) 604, and the UTt 612 may attach and establish a PDU session with the CN 606 (or a particular CN 606*t*, not explicitly shown) via a destination satellite (SATk) 610. For example, in this step, each terminal can establish a radio link that allows it to begin data communication and can then establish a PDU session for specific data services. At steps "A2o" and A2t," the UTo 602 and UTt 612 may register with the network, respectively. This can involve each terminal identifying and authenticating itself.

At step "A3," UTo 602 and UTt 612 may perform registration with the DDF 608. In some cases, registration with the DDF 608 can occur at a different time (e.g., at an earlier step). In the illustrated case, registration with the DDF 608 occurs directly after establishing a PDU session as illustrated, such as to facilitate utilization of network services by the user terminals prior to engaging in local direct communications and/or for other reasons. At step "A4," UTo 602 may perform UTt discovery via the DDF 608. The DDF 608 may send UTt discovery response at step "A5," if the DDF 608 has up-to-date information on the UTt 612. Further, at step "A6," the DDF 608 may send a presence query for the UTt 612 to the core network 606. In an example, if the UTt 612 is in an idle mode, the core network 606 may page the UTt 612 at step "A7." At step "A8," the UTt 612 may send a paging response to the core network 606. Based on the paging response, at step "A9," the core network 606 may send a presence query to the UTt 612.

Further, at step A10, in response to the presence query at step "A9," the UTt 612 may update its contact information at the DDF 608. Based on the updated contact information of the UTt 612, the DDF 608 may send an UTt discovery response to the UTo 602 at step "A11." At step "A12," the UTo 602 may establish a security association with the UTt 612 by sharing security keys. At step "A13," direct UT-to-UT connectivity may be established, and UTo 602 and UTt 612 may begin to perform data transfers.

Integrated LEO/GEO Operation

Some embodiments described herein provide integration of low Earth orbit (LEO) and geosynchronous Earth orbit (GEO) operation with user terminals that are of receiving on both GEO and LEO links. Some such embodiments assume that the user terminals only transmit on LEO links. Some such embodiments implement integrated LEO/GEO operations using dual connectivity features based on those defined in 3GPP TS 37.340. One technical difficulty to such an integrated LEO/GEO approach is that, when a user terminal is receiving on the GEO link, the network will expect the user terminal to transmit feedback to the GEO gateway. For example, receipt on the GEO link may require the user terminal to provide feedback to the GEO gateway at MAC, RLC, and RRC layers of the 5G control plane protocol stack in the return link. Since the user terminal does not have a direct return link to the GEO gateway (assuming the user terminal is only capable of transmitting on LEO links), embodiments provide protocol architecture support for achieving the return link to the GEO gateway.

Figure 7:
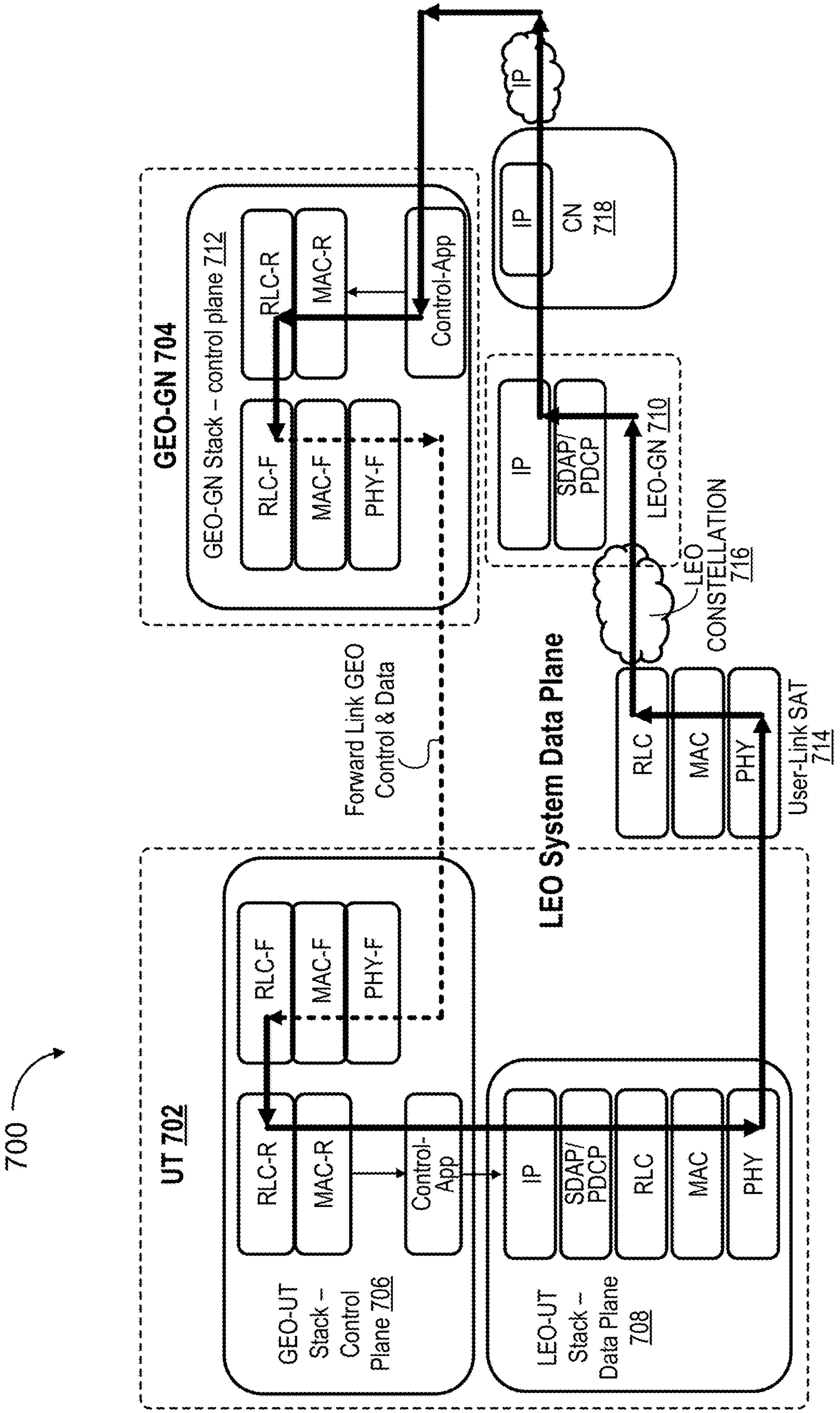
FIG. 7 illustrates a protocol architecture to support a return link from a user terminal to a GEO ground node (GEO-GN) in the context of an integrated LEO/GEO operation where the user terminal does not have a GEO return link.

FIG. 7 illustrates a protocol architecture 700 to support a return link from a user terminal 702 to a GEO ground node (GEO-GN) 704 in the context of an integrated LEO/GEO operation where the user terminal 702 does not have a GEO return link (e.g., the user terminal 702 can transmit only on LEO links). The integrated LEO/GEO operation involves at least one GEO satellite (e.g., part of a GEO constellation) and at least one LEO satellite (e.g., part of a LEO constellation). As illustrated, control signaling between the user terminal 702 and the GEO-GN (e.g., a GEO gateway) 704 are carried as application layer messages over a LEO IP data plane transport. Therefore, the control signing path via the LEO system is transparent to the LEO system. The proposed scheme has the advantage that it also lends itself to an integrated LEO/GEO operation where the GEO system need not be based on 5G protocol stack. In this case, an anchor server or Home Agent splits the traffic between GEO and LEO paths based on binding messages (e.g., between the user terminal 702 and the Home Agent) using protocols, such as DSMIPv6.

In the illustrated architecture 700, the user terminal 702 includes a GEO-UT control plane protocol stack 706 and a LEO-UT data plane protocol stack 708. The GEO-UT control plane protocol stack 706 can be an implementation of the corresponding portion of FIG. 3, and the LEO-UT data plane protocol stack 708 can be an implementation of the corresponding portion of FIG. 2. It is assumed that, at any time, the user terminal 702 is in communication with a GEO-GN 704 via one or more GEO satellites. The GEO-GN 704 includes a GEO-GN control plane protocol stack 712 having corresponding components to those of the GEO-UT control plane protocol stack 706. The user terminal 702 is concurrently in communication with a LEO-GN 710 via one or more satellites of a LEO constellation 716. As illustrated, at any particular time, signals are sent from the user terminal 702 up to a satellite user-link 714 of one of the satellites of the LEO constellation 716 and back down to the LEO-GN 710. The LEO-GN 710 can then forward signals to the core network 718 (e.g., the 5G core). The core network 718 can be in communication (e.g., via an IP network) with the GEO-GN 704.

In the forward-link direction, signals (e.g., GEO control signals, data signals, etc.) are sent from the GEO-GN 704 up to a GEO satellite and down to the user terminal 702. For example, the GEO-GN control plane protocol stack 712 can transmit through forward-link components (e.g., forward-link RLC, MAC, and PHY layers), and the GEO-UT control plane protocol stack 706 can receive through corresponding forward-link components (e.g., forward-link PHY, MAC, and RLC layers).

In the return-link direction, it is assumed that the signals cannot be transmitted from the user terminal 702 back to the GEO-GN 704. Instead, return-link signals (e.g., LEO control signals, data signals, etc.) are transmitted from the user terminal 702 via a LEO system data plane. Return-link signals can be transmitted through return-link components of the GEO-UT control plane protocol stack 706 (e.g., return-link RLC and MAC layers) and into and through components of the LEO-UT data plane protocol stack 708 (e.g., IP, SDAP/PDCP. RLC, MAC, and PHY layers). The return-link signals can be received through corresponding components of the satellite user-link 714 and LEO-GN 710 (e.g., return-link PHY, MAC, RLC, SDAP/PDCP, and IP layers). The return-link signals can be forwarded from the LEO-GN 710 to the core network 718 (e.g., at the IP layer).

The core network 718 can then forward return-link control plane signals to the GEO-GN 704, where it can be received by return-link components of the GEO-GN control plane protocol stack 712 that correspond to those of the GEO-UT control plane protocol stack 706 (e.g., return-link MAC and RLC layers). In this way, a return-link control plane path is established for the GEO system via the LEO data path. As illustrated, instead of a PHY layer in the return-link portions of the GEO-UT control plane protocol stack 706 and the GEO-GN control plane protocol stack 712, each can include a control application (Control-App).

Resource Efficient IP Multicast

Bandwidth limits tend to impose significant constraints on the capacity of a communication network. One technique for increasing bandwidth efficiency is to support multicast communications. Multicast is a network communication technique whereby data is simultaneously sent from one source to multiple destinations (e.g., who have opted to receive the multicast stream), thereby efficiently distributing information to multiple receivers using reduced network bandwidth. Many Internet Protocol (IP) networks support so-called IP multicast, by which IP datagrams are efficiently sent to groups of interested receivers with a single transmission. For example, special IP address ranges can be designated for multicast, such as 224.0.0.0 to 239.255.255.255 in IPv4.

In the context of satellite networks, multicast can be used to send a same transmission to multiple user terminals serviced by a same beam of a same satellite (i.e., in a same beam coverage area), thereby effectively sharing the same bandwidth across multiple user terminals. Satellite multicast has long been a part of GEO satellite networks. For example, in many GEO satellite networks, stationary user terminals point at a designated GEO satellite, which communicates with a designated one or more GEO gateways. Because the satellite is in geosynchronous orbit, forward- and return-link communications with the user terminal typically remain serviced by a same GEO satellite and a same one or more GEO gateways (e.g., except in relatively rare cases of gateway failures, or the like). Even with mobile user terminals, the satellite-to-gateway links remain relatively static, and handoffs of the user link tend to be relatively infrequent. For example, an aircraft making a transcontinental flight would tend to remain within the coverage area of a single GEO satellite for most or all of its flight.

Thus, in GEO satellite network contexts, beam assignments for user terminals tend to remain mostly constant (static). It can be relatively straightforward to establish multicast groups in the context of static (or mostly static) beam assignments. For example, for a given transmission, multicast groups can be determined by determining which user terminals may be interested in receiving that transmission and which groups of those user terminals share a same beam assignment. Subsequently, that transmission can be assigned to a particular GEO-gateway for transmission via a particular GEO satellite to a particular group of interested user terminals sharing a particular beam. Even if there is some overhead involved with setting up the multicast groups and corresponding multicast streams, those groups and streams will remain static, or relatively static, over the course of the transmission.

Multicast implementations can be much more challenging in the context of satellite networks having a constellation of LEO satellites, because the positions of LEO satellites are constantly changing with respect to the surface of the Earth as they traverse non-geosynchronous orbits. As the LEO satellites' positions change, so do their beam coverage areas, such that user terminals are continuously being serviced by different satellites and by different LEO gateways. Similar to the GEO context, establishing a multicast group involves determining which groups of user terminals sharing a same user beam may be interested in a same transmission. However, in the LEO context, this becomes a highly dynamic determination. At each time, transmitting a stream to a particular user terminal may involve transmitting that stream from a different gateway, through a different LEO satellite, and/or to a different beam; which can change which groups of user terminals can be grouped together into a multicast group.

IP multicast has been proposed in 3GPP 5G-NR standards as part of Multicast Broadcast Services (MBS), such as defined in 3GPP TS 23.247. The approach proposed in the 3GPP standards implements a multicast architecture in the core network. To date, this approach has gained very little traction at least because the approach involves adding special new network functions on the radio side of the core network to be compatible with multicast. Those functions can add complexity and cost to the network deployment. For example, the 3GPP standards propose a new multicast broadcast UPF (MB-UPF) and a new MB-SMF, along with new interfaces to support those new functions. The roles of the new network functions and interfaces includes figuring out and managing a multicast solution that accounts for the dynamically updating locations and assignments of user terminals, satellites, gateways, beams, cells, etc.

Embodiments described herein provide an efficient IP multicast approach that can be successfully deployed in a LEO-based satellite communication network. The approach described herein is transparent (agnostic) to the core network. As such, a customer can provide its own core network, and the IP multicast-enabled LEO network deployment can transparently be attached thereto. Embodiments of the described approach uses unicast bearers all the way to the gateway, and the gateway then determines which unicast bearers to fuse together into fewer multicast bearers. Thus, rather than attempting a static determination in the core network, the described approach can make dynamic determinations at the gateways.

Figure 8:
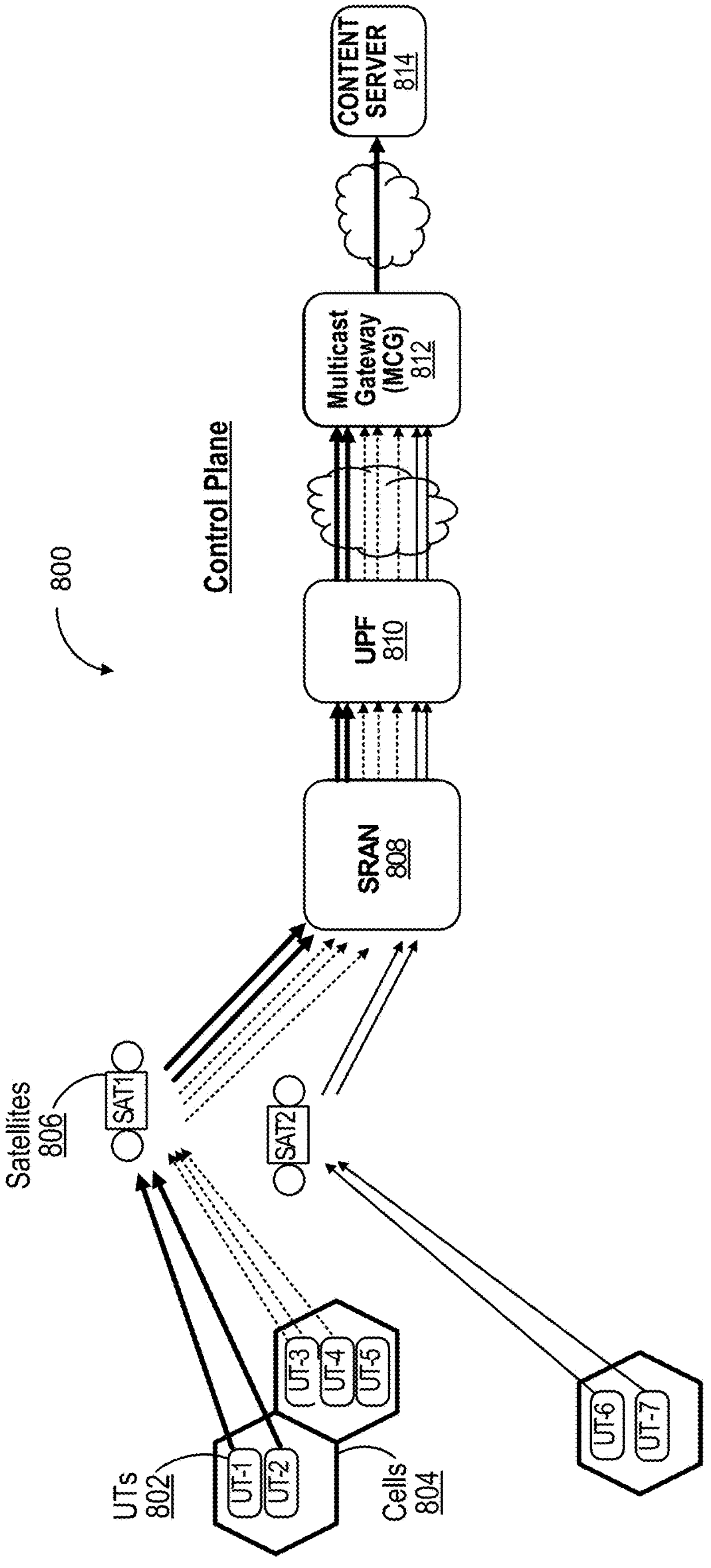
FIGS. 8 and 9 show a control plane architecture and a data flow architecture, respectively, for an IP multicast-enabled satellite communication system.
Figure 9:
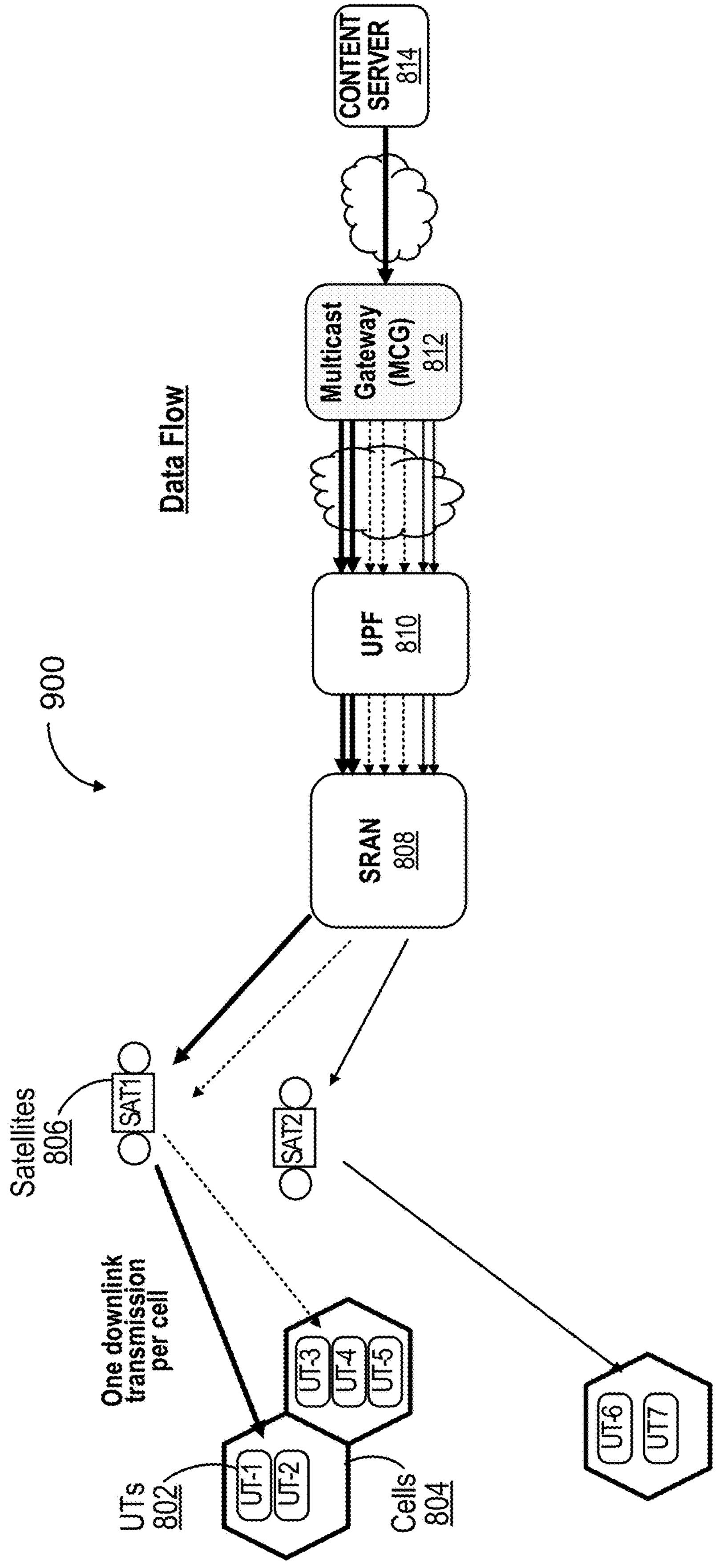

FIGS. 8 and 9 show a control plane architecture 800 and a data flow architecture 900, respectively, for an IP multicast-enabled satellite communication system. In both of FIGS. 8 and 9, the architectures include user terminals 802 in cells 804, satellites 806, a SRAN 808, a UPF 810, a multicast gateway 812, and a multicast content server 814. For example, the satellites 806 can be LEO satellites of a LEO constellation, and the SRAN 808 can include a LEO-GN, LEO gateway, etc.

Turning first to FIG. 8, an application on a user terminal 802 triggers an Internet Group Management Protocol (IGMP) membership report. IGMP is a communication protocol used by hosts, routers, and other components of IP networks to manage the membership of Internet Protocol multicast groups, such as by ensuring that data is only sent to network interfaces that are interested in receiving particular multicast streams. The IGMP membership report can be a "Join" message. The IGMP membership report can be sent on an upstream path toward the multicast content server 814. At the time of sending the IGMP membership report, the user terminal 802 is in a cell 804 being illuminated by a particular satellite 806, and the particular satellite is communicating with the SRAN 808. Transmitting the IGMP membership report can involve the user terminal 802 sending the IGMP membership report up to the particular satellite 806 and back down to the SRAN 808.

The SRAN 808 can have a tunneled connection with the UPF 810 and can forward the IGMP membership report to the UPF 810 via the tunneled connection as a unicast communication (e.g., using the GPRS tunneling protocol, or other suitable protocol). The UPF 810 can forward the unicast message containing the IGMP membership report to the multicast gateway 812. In some implementations, the message is sent from the UPF 810 to the multicast gateway 812 using a combination of the user datagram protocol (UDP) and IP, or UDP/IP. UDP is generally a connectionless transport layer protocol that allows for sending of datagrams without first establishing a connection between a sender and receiver. UDP is fast and efficient, but it does not guarantee reliable delivery, ordering, or error checking of packets. IP can be made responsible for addressing and routing packets of data to help ensure that they travel across networks and arrive at their correct destinations. The combined UDP/IP protocol can use IP to handle the delivery of UDP datagrams with minimal overhead and without relying on pre-establishment of reliable sessions or connections.

As illustrated, in the control plane illustrated by FIG. 8, each user terminal 802 sends its own respective IGMP membership report. For N user terminals 802, there are N corresponding signals being sent to the multicast gateway 812 via one or more satellites 806, the SRAN 808, and the UPF 810. Upon receipt, the multicast gateway 812 can interpret each IGMP membership report and can use the IGMP membership reports to construct multicast membership information (MMI) for each multicast group. For example, the MMI can include, for each (of at least some) multicast content provided by the multicast content server 814, a corresponding IP multicast addresses for the content, and an indication of which user terminals are interested in the content (i.e., which have requested to join).

The multicast gateway 812 can communicate at least some of the MMI to the multicast content server 814. In some implementations, communications between the multicast gateway 812 and the multicast content server 814 use Protocol Independent Multicast-Sparse Mode (PIM-SM). For example, PIM-SM can be used to construct a multicast tree (e.g., a source-based tree).

Turning to FIG. 9, the data flow begins with the multicast content server 814 sending multicast content to the multicast gateway 812 for delivery to interested user terminals 802. The multicast content server 814 can send the multicast content to the multicast gateway 812 on the IP multicast address associated with the multicast group (as part of the received membership information previously sent by the multicast gateway 812. In accordance with PIM-SM, the interested user terminals 802 can be leaf nodes of the multicast tree associated with the multicast group.

The multicast gateway 812 receives the multicast content, replicates it, encapsulates it in unicast headers, and sends a point-to-point (PTP) stream to each group member over the core network (e.g., including UPF 810). For example, the multicast gateway 812 sends unicast transmissions according to the UDP/IP protocol to the UPF 810, and the UPF 810 forwards the unicast transmissions to the SRAN 808 via a tunneled connection (e.g., using UDP/IP and the GPRS tunneling protocol). For N user terminals 802, N corresponding unicast bearers are used to send signals from the multicast gateway 812 to the SRAN 808 via the UPF 810.

The SRAN 808 (e.g., a gateway node in the SRAN) determines which sets of PTP (i.e., unicast) streams in each beam can be consolidated onto a single point-to-multipoint (PTM) stream for delivery as a multicast stream to a group of user terminals 802 that are multicast group members. Each consolidated PTM stream can be transmitted using a single PTM radio bearer in a downlink carrier in a cell 804. For example, a single downlink transmission can be transmitted to each cell 804 for each multicast session. As illustrated, for N (N=7) user terminals 802 in M (M=3) cells 804, the N PTP streams are fused into M PTM streams. The determination and creation of PTM streams at the SRAN 808 involves novel RRC communications between the SRAN 808 and the user terminals 802. Such RRC communications are described in more detail below.

As noted above, the described IP multicast approach is transparent to the core network (e.g., the 5G packet core). For example, the multicast gateway 812 can interface with the core network functions (e.g., the UPF 810) at an "N6" reference point, similar to any distributed node (DN), as defined in 5G specifications, and the like. The approach does not rely on special or dedicated signaling interfaces at the UPF 810, and the approach does not place additional burdens on the satellite, as compared to unicast sessions.

There are many possible use cases for the described IP multicast approach. One example use case is using multicast to more efficiently transmit same video content to multiple sites. For example, the President of the United States is giving a State of the Union address, which is being transmitted live to people across the United States and across the globe. Depending on whether user terminals receiving the speech are in the same or different beams at any particular time, one or more SRANs 808 can dynamically determine which streams can be fused together onto single PTM radio bearers for transmission to multicast groups of user terminals.

Another example use cases is using multicast to efficiently handle point-to-multipoint push-to-talk services. In such contexts, a group of users is moving around for a common purpose, such as to respond as emergency first responders to an incident, to engage in a military campaign or exercise, etc. When a team leader, commander, or the like pushes "talk," the communication terminals are set up so that all receivers concurrently receive the same stream. Thus, multicast can be used to send the same stream to all receivers in the same beam via a single PTM radio bearer.

Figure 43:
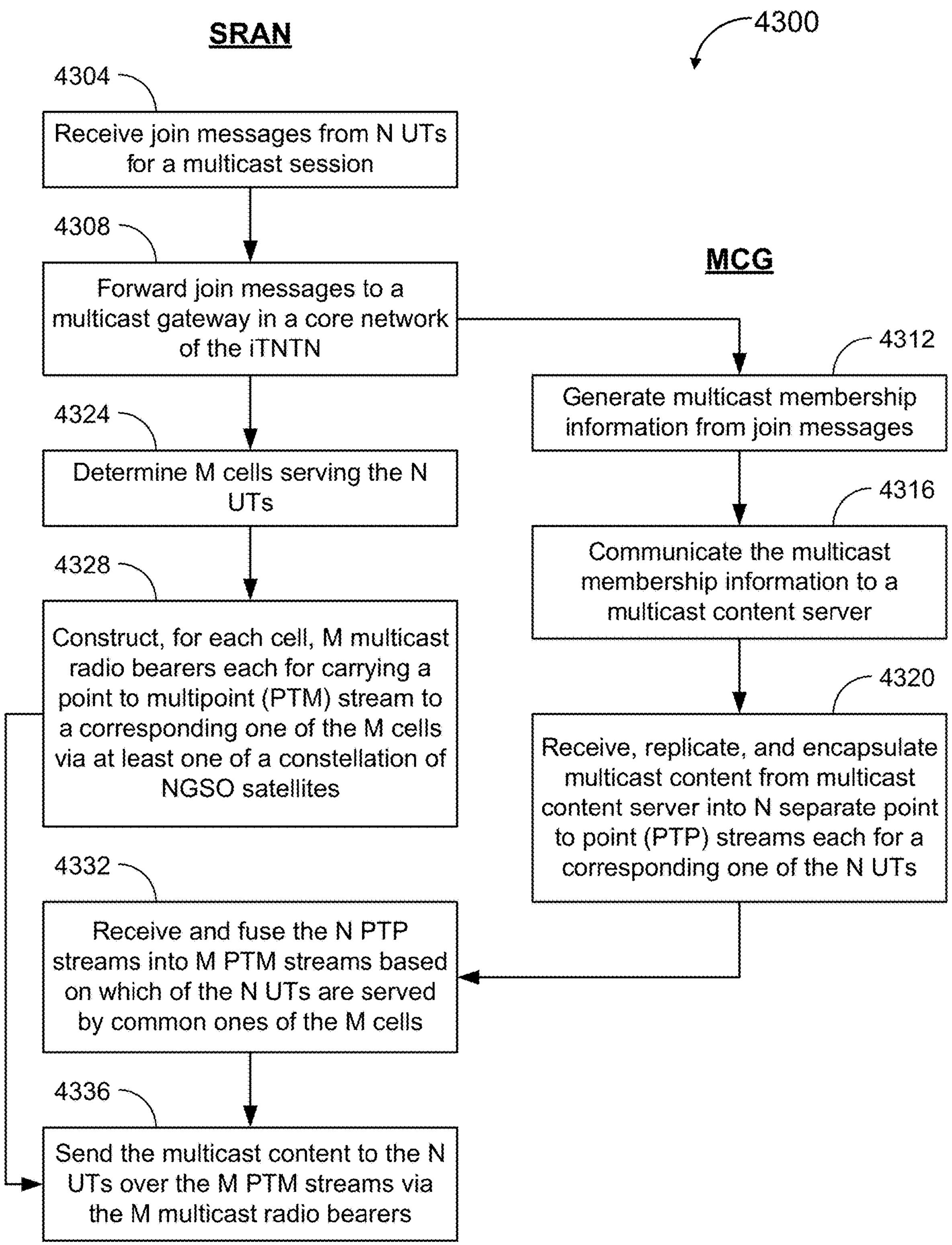
FIG. 43 shows a flow diagram of an illustrative method for multicast communication in an integrated terrestrial-non-terrestrial network (iTNTN), according to embodiments described herein.

FIG. 43 shows a flow diagram of an illustrative method 4300 for multicast communication in an integrated terrestrial-non-terrestrial network (iTNTN), according to embodiments described herein. Embodiments of the method 4300 begin at stage 4304 by receiving join messages from N (N is an integer greater than 1) user terminals (UTs) by a ground node of a satellite radio access network (SRAN) of the iTNTN. The join messages indicate a request by the UTs to join a multicast session.

At stage 4308, embodiments can forward the join messages by the ground node to a multicast gateway. At stage 4312, embodiments can generate, responsive to receiving the join messages forwarded in stage 4308, multicast membership information for the multicast session. At stage 4316, embodiments can communicate the multicast membership information from the multicast gateway to a multicast content server that hosts the multicast content associated with the multicast session. In some embodiments, the communicating at stage 4316 includes coordinating between the multicast gateway and the multicast content server to construct a multicast tree for the multicast session (e.g., a Protocol Independent Multicast-Sparse Mode (PIM-SM) multicast tree). At stage 4320, embodiments can receive the multicast content by the multicast gateway from the multicast content server. Embodiments can further replicate the multicast content and can encapsulate the replicated multicast content into N point to point (PTP) (unicast) streams. Each PTP stream is indicated (e.g., in header information) as destined for a corresponding one of the N UTs At stage 4332, embodiments can receive (e.g., by the ground node from the multicast gateway) the N PTP streams of replicated multicast content and can fuse the N PTP streams into M point to multipoint (PTM) streams. For example, at stage 4324, embodiments can determine M cells as serving the N UTs (M is a positive integer; multicast increases transmission resource efficiency when M is less than N). At stage 4328, embodiments can construct, for each of the M cells, a corresponding one of M multicast radio bearers, each multicast radio bearer to carry a corresponding one of the M PTM streams to a corresponding one of the M cells. At stage 4336, embodiments can send the M PTM streams to the N UTs in the M cells via the M multicast radio bearers.

Satellite Radio Access Network (SRAN) and Core Network (CN) Architectures

Figure 10:
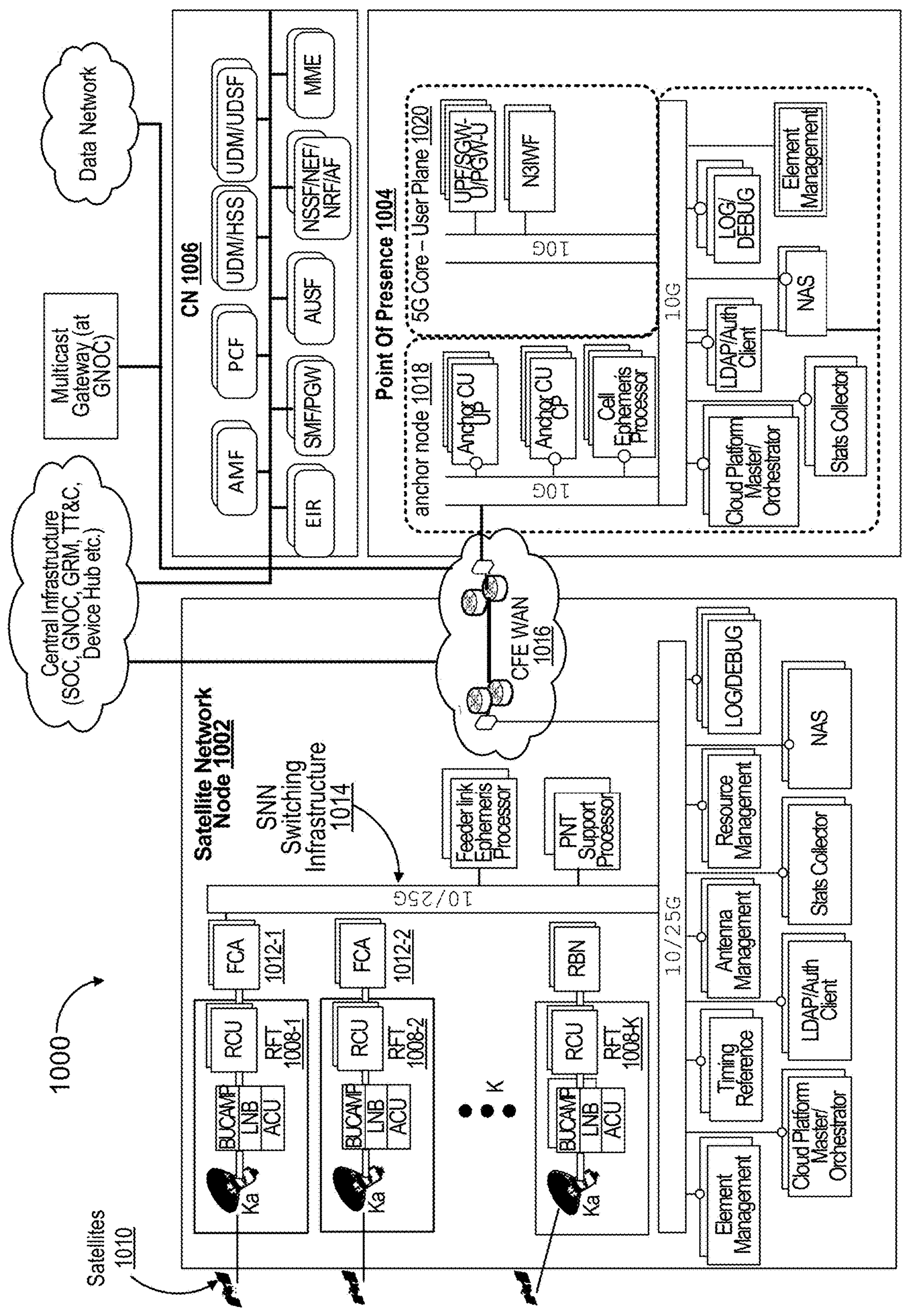
FIG. 10 illustrates a ground network architecture detailing components of the satellite radio access network (SRAN), the core network (CN), and their connectivity.

FIG. 10 illustrates a ground network architecture 1000 detailing components of the SRAN and CN, and their connectivity. The SRAN is illustrated by its components: a SNN (Satellite Network Node) site 1002 and Point Of Presence (POP) sites 1004 (only one POP site 1004 is shown). The SNN site 1002 provides connectivity to the satellites 1010 from the ground network over the feeder links, while the POP sites 1004 provide connectivity to terrestrial data network.

Each SNN site 1002 consists of several radio frequency terminals (RFTs) 1008, such as RFTs 1008-1-1008-K. Each RFT 1008 contains the equipment used to track and maintain a radio connection with a satellite 1010. Each SNN site 1002 can also include Feederlink Convergence Appliance (FCA) nodes 1012 that implement modem processing and payload control channel functions. A signal processing framework (e.g., a field-programmable gate array (FPGA) based signal processing framework) allows for advanced low-density parity-check (LDPC) codes to be implemented on the feeder link and also allows for any ranging waveforms and functions used to assist in positioning, navigation, timing and/or other similar features. The FCA nodes 1012 also implement the Digital Video Broadcasting-Satellite-Second Generation Extension (DVB-S2x) protocol functions for the feeder-link channel between the SNN site 1002 and the satellite 1010 with which it has contact.

In some implementations, the RFTs 1008 are outdoor equipment, the FCA nodes 1012 are indoor equipment, and remaining components of the SNN site 1002 are also indoor equipment, which may be housed in rack containers. The remaining components can include an SNN switching infrastructure 1014 (e.g., a 25G/10G switching infrastructure), a pair of timing reference units, a pool of servers implementing SNN functions, element management units, antenna management units, resource management units, NAS units, and any other platform functional entities, such as cloud platform orchestrators, statistics collectors, logging and debugging processors, LDAP authentication clients, etc. At least some of the timing reference units (i.e., in at least a few of the GRANs) are cesium frequency reference units, while the rest may be rubidium-based frequency reference units.

As illustrated, the FCA nodes 1012 are coupled with the SNN switching infrastructure 1014 by the fiber links. The SNN switching infrastructure 1014 connects to a site network infrastructure 1016 (e.g., a customer front end (CFE) WAN infrastructure), via which it can communicate with other portions of the terrestrial infrastructure, including the POP sites 1004.

Each POP site 1004 POP houses an anchor node 1018 and core user plane equipment 1020. The anchor node 1018 performs upper layer protocols of the NodeB (e.g., 5G gNB) functions for a set of administrative regions (ARs) in coordination with the SNN sites 1002 with which it communicates. The core user plane equipment 1020 provides a connection to external IP networks, such as the Internet and private networks. In some implementations, components of the anchor node 1018 are housed in rack containers. This can include a respective portion of the 10 Gigabit Ethernet switching infrastructure, a pool of anchor nodes (e.g., implementing PDCP, SDAP, RRC, 5G Next Generation Application Protocol (NGAP), and GTP protocol layers), element management units, NAS units, and platform functional entities, such as cloud platform orchestrators, statistics collectors, logging and debugging processors, LDAP authentication clients, etc.

Embodiments of the anchor node 1018 can include several components and can perform several functions. One example anchor node 1018 component is a central unit (CU) control plane (CP) processor. The CU CP manages signaling and control-related tasks, such as session management, mobility management, and establishing connections between the network and user equipment. Embodiments of the CU CP processor can perform some or all of the following: setup an N2 interface with an AMF for assigned cells, implement label edge router (LER) functions (described below), coordinate with distributed units (DUs) in satellites to authenticate (e.g., using Internet key exchange version 2 (IKEv2) procedures), setup IPSec tunnels, setup stream control transmission protocol (SCTP) connections, setup F1 interfaces, receive satellite ephemeris data from a cell ephemeris processor and generate cell system information (SIB), propagate cell system information and configuration (e.g., multi-operator core network (MOCN) radio resource sharing policy) to the satellite DUs, perform RRC connection establishment with user sessions, perform AMF selection for user equipment-selected slices (e.g., for public land mobile network (PLMN) and/or MOCN) and coordinate UE registration and/or PDU session establishment between user equipment and a selected AMF, perform CU UP instance assignment and E1 bearer setup, setup user equipment context in the DU for the bearers (e.g., along with the QoS, network slice, user equipment aggregated maximum bit rate (UE AMBR), etc.), coordinate with other CU UP instances over Xn interface for handovers, execute global resource manager (GRM) commanded handovers (e.g., coordinating with DUs, other CU CPs, CU UPs, user terminals, AMF, and/or UPF), perform cell and/or satellite selection for paging and paging dilation, coordinate with GEO ground node (e.g., gNB over Xn interface) and user terminal for implementing LEO/GEO NR dual connectivity (DC) (e.g., as described herein), etc.

Another example anchor node 1018 component is a central unit (CU) user plane (UP) processor. The CU UP manages actual transmission of user data, such as by being responsible for forwarding and routing of user data packets to and from the SRAN and the CN. Embodiments of the CU UP processor can perform some or all of the following: setup IPSec tunnels with the satellite DUs using the CU CP-provided IPSec derived keys, setup GTP tunnel and F1-U interfaces with the satellite DUs upon E1 bearer setup from the CU CP for user sessions, setup GTP sessions with assigned GPF for the user sessions, implement SDAP and/or PDCP functions (e.g., QoS flow mapping, header compression/decompression, ciphering/de-ciphering, PDCP sequence numbering, PDCP reordering/duplication detection), perform data transport and/or flow control and/or retransmission over the F1-U interface with satellite DUs, implement label edge router (LER) functions (described below), monitor data inactivity and coordinate with CU CP for RRC operations (e.g., inactivity, suspend, paging, resume, etc.), perform data forwarding to other CU UP instances over Xn interface for user session handovers, perform data forwarding to the GEO gNB for LEO/GEO NR DC, etc.

Another example anchor node 1018 component is one or more cell ephemeris processors, which can receive satellite ephemeris files (e.g., from a SOC), compute neighbor satellite geometry and corresponding system information (e.g., system information block 19, SIB 19, information), propagate information to relevant CU CP instances for each of the configured cells, etc. Another example anchor node 1018 component is one or more element management components, which can coordinate with a cloud orchestrator for component software image repository and upgrades, coordinate with the GNOC and/or GRM to receive static and dynamic configurations (e.g., antenna definitions, neighbor site relationships, AR-TAC-POP relationships, AR boundary definitions, contact schedules, etc.), implement FCAPS functionality for the site, implement a web-based local/remote graphical interface and ReST-based management interface, etc. Another example anchor node 1018 component is one or more on-premises cloud platform orchestration components, which can auto discover nodes and maintain centralized registries; perform component application profile assignments and container orchestration; perform image caching and deployment of software and configuration on nodes; setup container interconnect virtual networking, routing, security, and policy enforcement; perform node health monitoring, fault handing, and reconfigurations, including required redundancy; maintain site install configurations, etc. Another example anchor node 1018 component is one or more site support components (e.g., NAS, LDAP, Log, LUI, etc.), which can collect SRAN component statistics and push to cloud storage, coordinate with central active directories to authorize and authenticate SRAN users and their roles, perform component diagnostics log collection and tools for visualization and/or filtering, etc. Embodiments can include any or all of these and/or other anchor node 1018 components, and the anchor node 1018 components can perform any or all of these and/or other anchor node-related functions.

Embodiments can be architected in a modular fashion to support scalability. For example, additional satellites 1010 can be served by adding RFTs 1008 incrementally to the SRAN. Data processing functions in the SRAN can be implemented using a load distributed architecture with a pool of traffic carrying processor instances (e.g., anchor nodes, etc.). Additional capacity can be served by adding additional processor instances, as needed. An on-premises cloud architecture is employed to allow the system to dynamically instantiate and configure the system functions as needed, without requiring hardcoded installs, thereby reducing inefficiencies of hardware resource usage.

Figure 11:
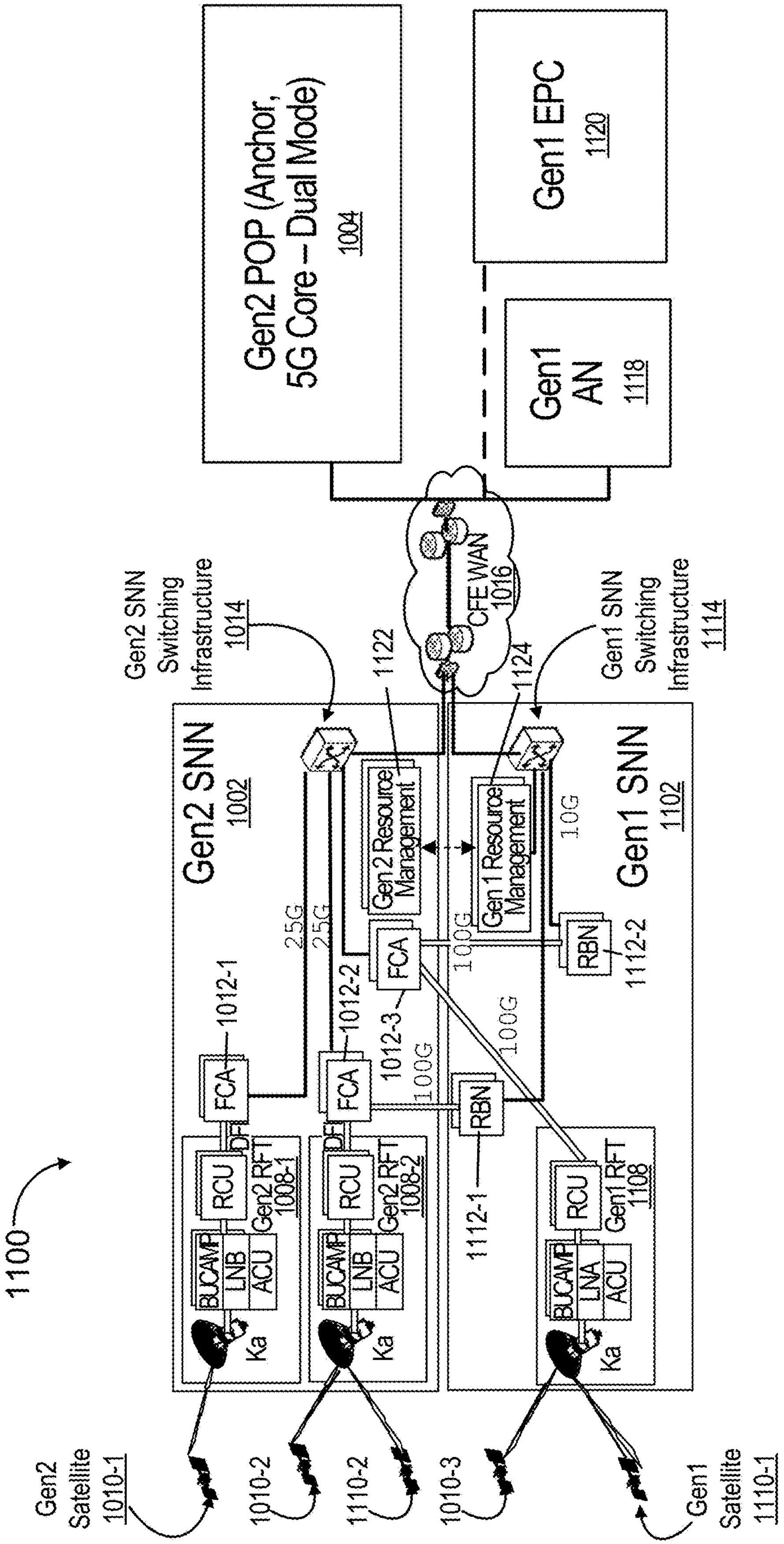
FIG. 11 shows an example combined architecture that includes both components of the novel architecture of FIG. 10 (referred to as "Gen2") and components of a legacy architecture (referred to as "Gen1").

Some embodiments of the architecture 1000 are configured to be compatible with a legacy architecture. FIG. 11 shows an example combined architecture 1100 that includes both components of the novel architecture 1000 of FIG. 10 (referred to as "Gen2") and components of a legacy architecture (referred to as "Gen1"). The "legacy," of "Gen1" architecture can be the architecture described in U.S. Patent Application No. 63/312,044, filed Feb. 20, 2022, titled "SYSTEMS AND METHOD FOR 5G-BASED NON-GEOSTATIONARY SATELLITE SYSTEMS (NGSOS) WITH INTER-SATELLITE LINKS," the disclosure of which is hereby incorporated by reference in its entirety.

On a first side of the combined architecture 1100, "Gen2" components include salient portions of the architecture 1000 of FIG. 10 with the same reference designators used in FIG.

10: Gen2 satellites 1010 and a Gen2 SNN site 1002 (including Gen2 RFTs 1008, FCA nodes 1012, and a Gen2 SNN switching infrastructure 1014). On the same first side of the combined architecture 1100, "Gen1" components include corresponding legacy components: Gen1 satellites 1110, a Gen1 SNN site 1102 (including a Gen1 RFT 1108, radio baseband nodes (RBNs) 1112, and a Gen1 SNN switching infrastructure 1114).

On a second side of the combined architecture 1100, "Gen2" components include other salient portions of the architecture 1000 of FIG. 10 with the same reference designators used in FIG. 10: a Gen2 POP site 1004, including an anchor node 1018 and core user plane equipment 1020. On the same second side of the combined architecture 1100, "Gen1" components include other corresponding legacy components: a Gen1 anchor node 1118 and a Gen1 core user plane equipment 1120 (e.g., a 4G evolved packet core, or EPC).

As described with reference to FIG. 10, the first and second sides of the combined architecture 1100 are in communication via a site network infrastructure 1016, such as a CFE WAN infrastructure. Further, as illustrated, Gen2 and Gen1 components can be in communication with each other. For example, Gen2 RFT 1008-2 is shown as coupled with the Gen1 SNN switching infrastructure 1114 via FCA node 1012-2 and RBN 1112-1, and Gen1 RFT 1108 is shown as coupled with the Gen2 SNN switching infrastructure 1014 via FCA node 1012-3. Further, embodiments of the Gen2 POP sites 1004 may be in communication with embodiments of the Gen1 anchor node 1118 via the site network infrastructure 1016. At least because of these interconnections, as illustrated, the combined architecture 1100 can support both the Gen1 and Gen2 components communicating via both Gen1 satellites 1110 and Gen2 satellites 1010.

In an example deployment case, a majority of Gen2 SNN sites 1002 are located at legacy Gen1 SNN sites 1102. As such, it may be desirable to reuse as much of the existing Gen1 SNN site 1102 infrastructure as possible for implementing the Gen2 SNN sites 1002. It may also be desirable to share legacy resources with new Gen2 deployments, including dynamic sharing of Gen1 RFTs 1108 between the Gen1 and Gen2 systems. To reuse Gen1 RFTs 1108 for the Gen2 system, the Gen2 SNN 1002 can provision the Gen2 FCA nodes 1012 for corresponding Gen1 RFTs 1108 (e.g., as described above). Gen1 changes may be limited to software and FPGA image upgrades to support Gen2 operations. For example, to minimize changes in the Gen1 system, fibers from RCUs (in the Gen1 RFTs 1108) that are coming indoors can terminate at Gen2 FCA nodes 1012, instead of at Gen1 RBNs 1112. The Gen2 FCA nodes 1012 can setup fiber interfaces with Gen1 RBNs 1112 and can largely mimic a legacy Gen1 RCU to Gen1 RBN 1112 interface, so that the Gen1 RBN 1112 operates as if it is directly communicating with a Gen1 RCU. In this way, a Gen2 FCA node 1012 can effectively relay control signaling and IQ samples between a Gen1 RCU and a Gen1 RBN 1112.

As illustrated, the Gen2 SNN site 1002 can include a Gen2 resource management system (RMS) 1122, and the Gen1 SNN site 1102 can include a Gen1 RMS 1124. One feature of such RMSs is coordination of a "RFT sharing mechanism." Continuing the example deployment case, the Gen2 RMS 1122 may coordinate with the Gen1 RMS 1124 to borrow a Gen1 RFT 1108. When Gen1 contact is assigned, FCA 1012-3 commands the RCU of the Gen1 RFT 1108 to switch the configuration to use Gen1 feeder link physical layer channelization and packet formatting between the RCU and an RBN 1112-2. It also enables a packet relay function within the RBN 1112-2 to relay all the packets (both control and traffic) between the Gen1 RCU and the Gen1 RBN 1112-2.

When Gen2 contact is assigned, an appropriate FCA node 1012 (e.g., FCA node 1012-2) commands the RCU of its connected Gen2 RFT 1008 to switch its configuration to use Gen2 feeder link physical layer channelization and packet formatting (e.g., according to Digital IF Interoperability (DIFI) standards) between the RCU and a connected RBN 1112 (e.g., RBN 1112-1). Feeder-link physical layer processing can terminate at the RBN 1112-1, and the upper layer packets can be sent directly from the RBN 1112-1 via switches of the Gen2 SNN switching infrastructure 1014. In some cases, the Gen1 and Gen2 systems may use different time references. For example, the Gen1 system may use a GPS-based time reference, while the Gen2 system may use an internal system time. In such cases, there may be small offsets (e.g., nanoseconds), so that use of the RBN 1112-1 may involve synchronizing its operation to the Gen2 time reference.

The RFT sharing mechanism can be extended to using Gen2 RFTs 1008 for the Gen1 system. As an example use case, when a Gen1 RFT 1108 is to be replaced (e.g., due to faulty HW, HW obsolescence, etc.), it can be replaced with Gen2 RFT 108 and augmented with an associated FCA node 1012. The FCA node 1012 can, in turn, connect to the RBN 1112 of the corresponding RFT (i.e., formerly a Gen1 RFT 1108). In such a use case, the Gen1 RMS 1124 would borrow the Gen2 RFT 1008 from the Gen2 RMS 1122 when needed.

Figure 12:
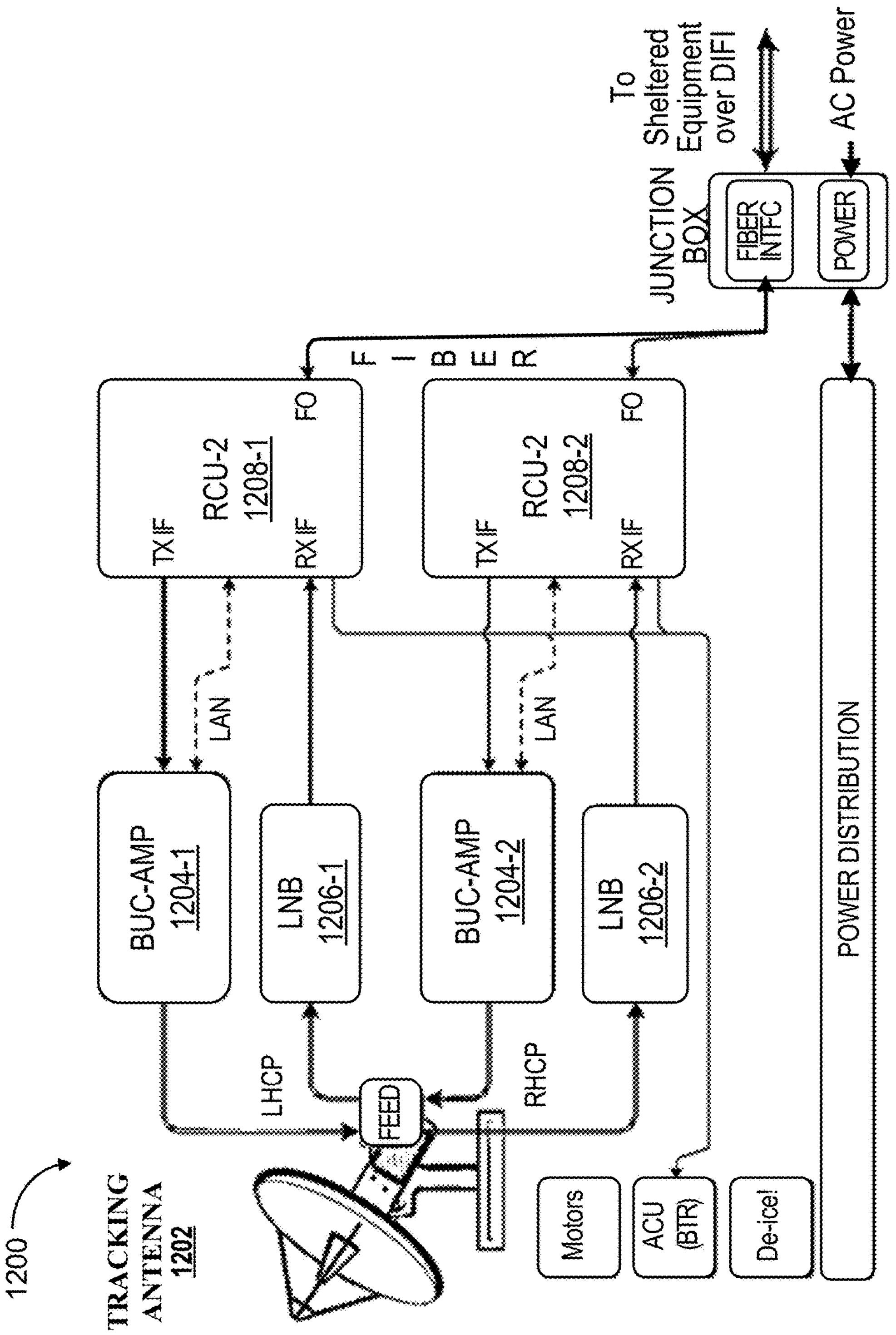
FIG. 12 illustrates a high-level block diagram of a radio frequency terminal (RFT).

FIG. 12 illustrates a high-level block diagram of a radio frequency terminal (RFT) 1200. The RFT 1200 can be an implementation of the Gen2 RFTs 1008 of FIGS. 10 and 11. In some embodiments, the radiofrequency front-end (RFFE) hardware design (e.g., for Ka band) is identical to that of the legacy (Gen1) RFTs 1108. Embodiments of the RFT 1200 can be designed with a preference toward certain design considerations, such as minimizing a number of physical entities and/or elements mounted on the tracking antenna, combining functional blocks where feasible to reduce numbers of field replaceable units (FRU), minimizing the number of interconnects between elements, multiplexing signals where feasible, using reliable technologies for power amplifiers, generating up/down converter frequency plans that minimize spurious signals, and using latest and forward-looking advanced technologies and components to maximize performance and to reduce size.

Embodiments can be designed to interface with satellites (e.g., Gen2 satellites 1010 of FIGS. 10 and 11) that use the Ka-band for both transmit and receive paths. The RFT 1200 can include a tracking antenna 1202 with a diameter of 3.5 to 4.0 meters to support communications in the Ka-band. In the forward direction, embodiments of the Ka-band RFT 1200 can transmit multiple carriers occupying a total bandwidth of up to 2.5 GHz in each polarization (e.g., right-hand circular polarization (RCHP) and left-hand circular polarization (LHCP)). In some such embodiments, the uplink transmit frequency consists of two bands: 27-29.1 GHz and 29.5-30 GHz. Embodiments comply with imposed emission limits. For example, the U.S. Federal Communication Commission (FCC) imposes specific emission limits for 200 MHz spectrum separating these two bands. In the return direction, embodiments of the Ka-band RFT 1200 can receive multiple carriers occupying a total bandwidth of up to 2 GHz. In some such embodiments, the downlink receive frequency consists of two bands: 17.8-18.6 and 18.8-19.3 GHz.

As illustrated, for each polarization orientation, the RFT 1200 includes a BUC-AMP 1204, a LNB 1206, and an RCU 1208. Each BUC-AMP 1204 is a combination of a block upconverter (BUC) and an amplifier in a single integrated unit. The BUC portion of the BUC-AMP 1204 takes RF signals (e.g., baseband or intermediate frequency (IF) signals) from a corresponding one of the RCUs 1208 and upconverts the signal to a higher frequency for transmission by the tracking antenna 1202. The amplifier portion of the BUC-AMP 1204 increases the power (gain) of the RF signals prior to transmission by the tracking antenna 1202 to help ensure that the signals are strong enough to reach the satellite while overcoming any losses that occur during transmission (e.g., atmospheric loss). In some embodiments, the BUC portion of the BUC-AMP 1204 up-converts IF signals to Ka-band frequencies (27-30 GHZ), and the power amplifier portion of the BUC-AMP 1204 amplifies the composite signal to a level suitable for transmission to the satellite while also providing uplink power control based on a beacon receiver and ephemeris data.

The LNB 1206 includes a Ka-band low-noise amplifier (LNA) and a block down-converter (BDC) integrated into a single component. The LNA portion of the LNB 1206 allows the satellite gateway to receive RF signals from the satellite and provides low noise amplification. The BDC portion of the LNB 1206 provides non-inverting block down-conversion from Ka-band to a receive IF. The down-converted signal can also include a beacon used for satellite tracking and/or for uplink power control.

The RCUs 1208 are implemented as a pair of RCUs 1208 (labeled "RCU-2"), each for a respective polarization orientation (e.g., one for RHCP and one for LHCP). The RCU-2 (the pair of RCUs 1208) is connected to the modems (e.g., indoor modem components, as part of the FCA in FIG. 10) via two bidirectional links. For example, the links can be implemented as bidirectional 100 Gbps fiber links. The fiber links provide wide bandwidth and an interference-resistant, robust interface. The fiber links carry payload data, monitoring and control data, synchronization information, etc. In some embodiments, DIFI standards are used between the RCUs 1208 and the FCA for carrying IQ samples, signal context information, and version context information.

Embodiments of the tracking antenna 1202 (e.g., LEO tracking antenna) operate in the Ka band, covering a complete 360-degree azimuth and 5-degree-90-degree elevation range. The tracking antenna 1202 can track the satellite per programmed ephemeris with support for automatic tracking with the help of embedded beacon tracking receivers and an antenna control unit (ACU). The antenna control units can interface with the AMS (e.g., the antenna management subsystem shown in the SNN site 1002 of FIG. 10) to receive commands for acquiring satellite contact along with the associated timestamped ephemeris data for the contact duration. The ACU can synchronize its timing with an SNN network time protocol (NTP) server to precisely apply the ephemeris data.

A single FCA can handle modem functions for both polarizations of the RFT 1200. For each feeder-link channel, the FCA can implement feeder-link air interface physical layer functions based on DVB-S2x, including: FEC encoding and/or decoding; interleaving and/or scrambling functions; π/2-BPSK, QPSK, 8PSK, 16APSK, 32APSK and 64APSK modulation and/or demodulation; SNR control; frequency and/or timing estimation; transmit and/or receive frame timing; multiplexing and/or demultiplexing; fragmentation and/or reassembly of upper layer data (e.g., AN, SOC TT&C) into GSE packets; adaptive coding modulation for feeder-link channels; and coordination with an ephemeris processor and RCU to apply delay and/or doppler compensation. For each feeder-link channel, the FCA can also receive satellite contact allocation and configure the feeder link channels, perform system time transfer and ranging functions (for positioning, navigation, timing, etc.), perform label switch routing functions selecting the feeder-link channel based on a load balancing hash in the label in the forward direction and AN/SOC selection in the return direction, etc.

Embodiments of the architectures described herein can include several service access control (SAC) components. One example of SAC components is one or more feeder link ephemeris processors, which can receive Gen2 satellite ephemeris files (e.g., from a security operations center, SOC), compute feeder link delay and/or doppler compensation for active contacts for propagation to RFTs, provide satellite ephemeris to antenna systems (e.g., AMS and/or ACU) for active contacts, etc. Another example of SAC components is one or more antenna management components, which can monitor RFT and/or ACU status and coordinate with RMS for appropriate RFT assignment for satellite contacts, coordinate with the ephemeris processor to feed the assigned satellite ephemeris to an ACU and command the ACU to point and/or acquire and track the satellite, etc. Another example of SAC components is one or more resource management components, which can perform periodic SRAN component status monitoring and reporting to GRM, perform satellite contact assignment to RFTs based on GNOC-provided satellite contact schedule adhering to priority and least-recently-used RFT constraints, perform coordination with Gen1 RMS for implementing the RFT sharing mechanism (e.g., as described above), etc. Another example of SAC components is one or more element management components, which can coordinate with a cloud orchestrator for component software image repository and upgrades, coordinate with the GNOC and/or GRM to receive static and dynamic configurations (e.g., antenna definitions, neighbor site relationships, AR-TAC-POP relationships, AR boundary definitions, contact schedules, etc.), implement FCAPS functionality for the site, implement a web-based local/remote graphical interface and ReST-based management interface, etc. Another example of SAC components is one or more on-premises cloud platform orchestration components, which can auto discover nodes and maintain centralized registries; perform component application profile assignments and container orchestration; perform image caching and deployment of software and configuration on nodes; setup container interconnect virtual networking, routing, security, and policy enforcement; perform node health monitoring, fault handing, and reconfigurations, including required redundancy; maintain site install configurations, etc. Another example of SAC components is one or more site support components (e.g., NAS, LDAP, Log, LUI, etc.), which can collect SRAN component statistics and push to cloud storage, coordinate with central active directories to authorize and authenticate SRAN users and their roles, perform component diagnostics log collection and tools for visualization and/or filtering, etc. Embodiments can include any or all of these and/or other SAC components, and the SAC components can perform any or all of these and/or other SAC-related functions.

Figure 13:
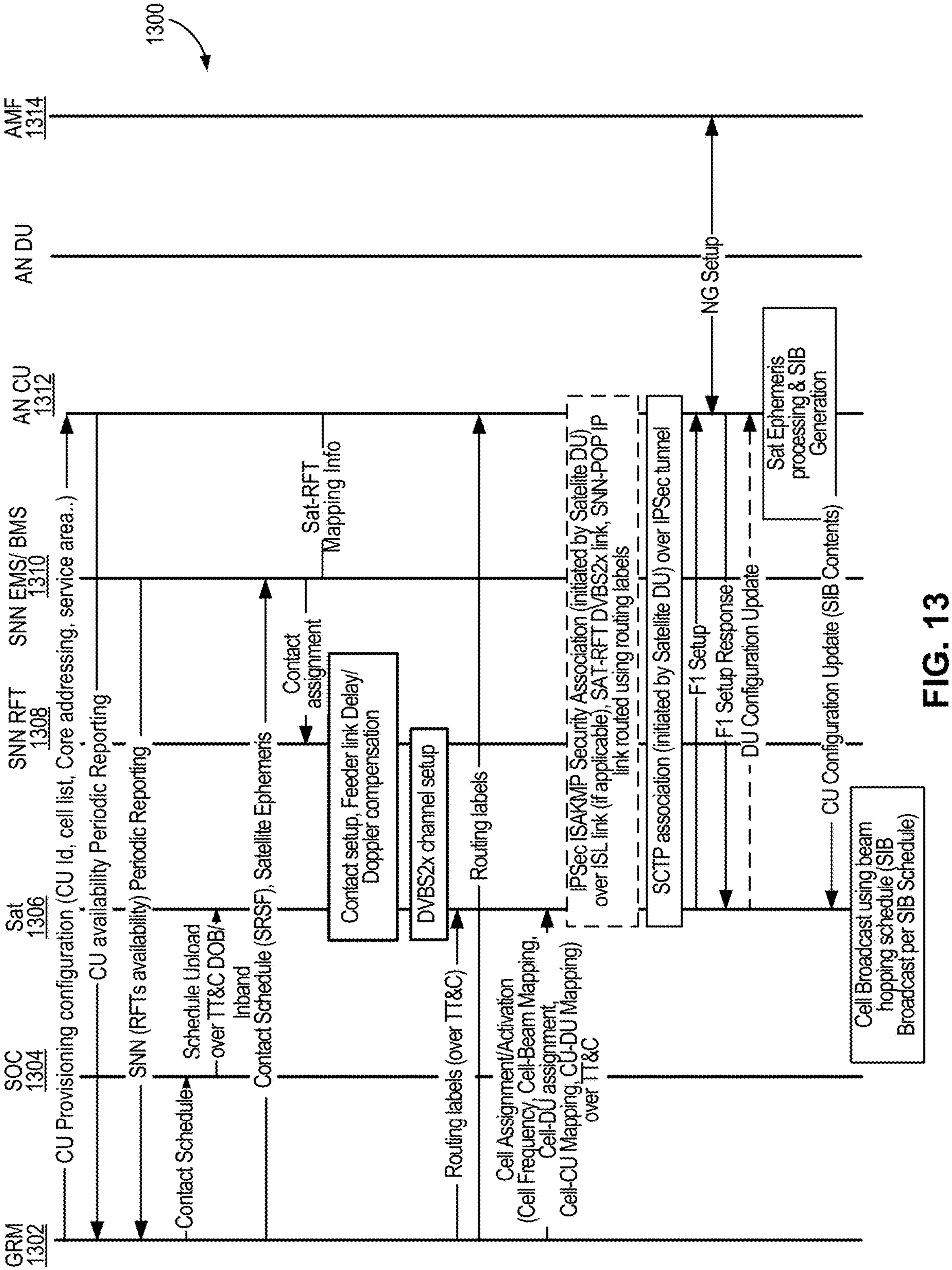
FIG. 13 illustrates an example system startup sequence, including the manner in which a security operations center (SOC), global resource manager (GRM), SRAN, and CN subsystems coordinate to setup cell transmission and to become ready for providing user service.

FIG. 13 illustrates an example system startup sequence 1300, including the manner in which a security operations center (SOC) 1304, global resource manager (GRM) 1302, satellite radio access network (SRAN), and core network (CN) subsystems coordinate to setup cell transmission and to become ready for providing user service. Embodiments of the GRM 1302 (e.g., and GNOC) define geographic cell definitions, AR and/or country border definitions, and associations of cells to POP anchor node CUs 1312. Depending on the satellite coverage of cells, the GRM 1302 can also dynamically associate cells (and cell-frequency slots) to satellite(s) 1306 and constituent beams. In addition, embodiments of the GRM 1302 also define DU containers in satellites 1306, and can map the cells activated in the satellite 1306 belonging to a given CU in that DU.

The cell and CU configuration is pushed from the GRM 1302 (e.g., and GNOC) to the POP anchor node CUs 1312 through configuration files. Upon instantiation of CU instances, the POP anchor node CUs 1312 provide health information to the GRM 1302 periodically. The RMS at the SNNs (SNN EMS/RMS 1310) also periodically provides SNN health information to the GRM 1302 to aid the GRM 1302 in contact planning. After the contact planning, the plan is pushed, via the SOC 1304, to the SNN EMS/RMS 1310 and to the satellites 1306. To push the contact plan to the satellites 1306, the SOC 1304 may use out-of-band telemetry tracking and command (TT&C) channel (or an in-band TT&C channel, if one exists via some other SNN). The GRM 1302 also pushes the default routing labels to be used by the edge routers in the satellite 1306 and POP anchor node CUs 1312 for CU-DU communication via the SNNs (and optionally intermediate satellites).

For the assigned contacts, the SNN EMS/RMS 1310 can allocate an RFT (SNN RFT 1308). The satellite 1306 and SNN RFT 1308 set up DVB-S2x channels after compensating for delay and/or doppler. The RFT-satellite assignment information is propagated to POP anchor node CUs 1312 to aid in their label routing. If IPSec (e.g., Internet Security Association and Key Management Protocol, ISAKMP) security association is not already setup with the CUS (corresponding to the assigned cells) at the satellite 1306, the satellite 1306 can initiate an appropriate setup procedure (e.g., IKEv2). To reduce the number of IPSec associations at the satellite 1306, a single exchange may be used for all the CUs in a POP as opposed to using an individual exchange with every CU in that POP.

Over the IPSec tunnel, using the derived keys (e.g., from IKEv2), the satellite 1306 can initiate SCTP/F1 setup procedure. Upon receiving F1 setup from the satellite 1306 (i.e., the satellite DUs), if an NG interface is not already setup with the AMF(s) 1314, the POP anchor node CUs 1312 setup the NG interface. In some cases, there may be more than one AMF 1314, depending on the number of MOCNs and/or PLMNs supported in the cell. The POP anchor node CUs 1312 can then generate the system information pertaining to the activated cells in the DUs including satellite ephemeris, system information schedule, network sharing configuration, etc. The satellites 1306 can start broadcasting information blocks, according to the schedule in the cells which can also be synchronized with a beam hopping schedule. For example, the satellites 1306 can begin broadcasting master information blocks (MIBs), which contain essential information for initial cell selection and synchronization in cellular networks (e.g., system bandwidth, system frame number, etc.), and system information blocks (SIBs), which provide detailed operational parameters of the network (e.g., configuration and access protocols).

Figure 14:
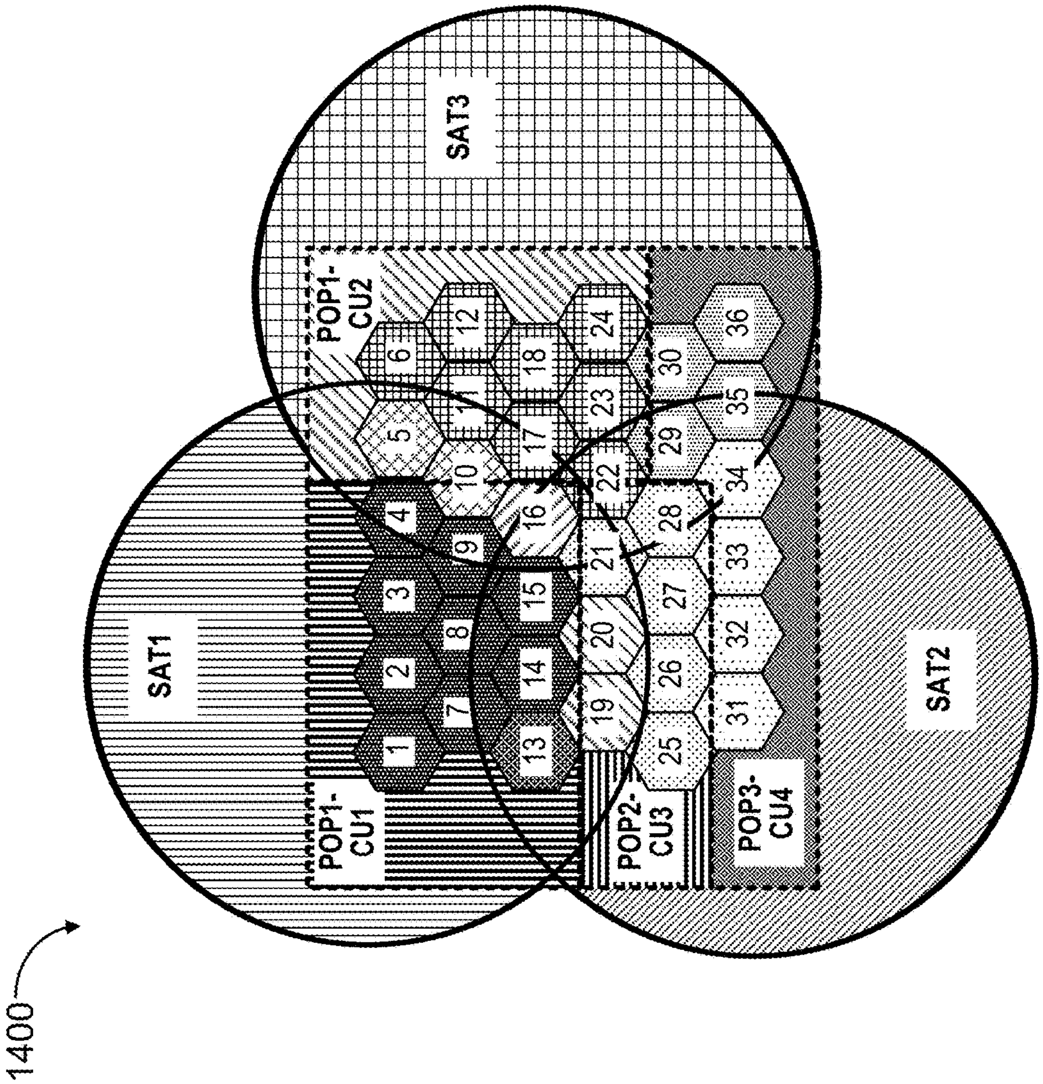
FIG. 14 illustrates an example of cell-DU-CU mapping to illustrate a combination of assignments.

Embodiments described herein can associate cells with CUs and DUs in any feasible manner. FIG. 14 illustrates an example of cell-DU-CU mapping 1400 to illustrate a combination of assignments. For the sake of the illustrated mapping, three satellites are shown as each projecting three beams corresponding to nine total DUs. The beams are presently illuminating overlapping coverage areas including three POPs associated with four CUs. The illuminated area also includes 36 cells.

The cells can be polygons defined on the surface of the earth. Since this is a geographically static configuration, the cells are associated with the POPs responsible for the corresponding geographic area. Mapping of cells to the CU instances in the POP can also be done through static configuration based on capacity estimates of the CUs in terms of number of cells that each can support. An example set of cell-to-CU mappings can be as follows:

| CU | Cell |
|---|---|
| CU1 | 1, 2, 3, 4, 7, 8, 9, 13, 14, 15, 16 |
| CU2 | 5, 6, 10, 11, 12, 17, 18, 22, 23, 24 |
| CU3 | 19, 20, 21, 25, 26, 27, 28 |
| CU4 | 29, 30, 31, 32, 33, 34, 35, 36 |

An example set of cell-to-beam mappings can be as follows:

| Beam | Cell |
|---|---|
| Satellite 1, Beam 1 | 1, 3, 8, 5, 10 |
| Satellite 1, Beam 2 | 2, 9, 15, 20 |
| Satellite 1, Beam 3 | 4, 7, 14, 19 |
| Satellite 2, Beam 1 | 13, 31, 27 |
| Satellite 2, Beam 2 | 25, 33 |
| Satellite 2, Beam 3 | 21, 26, 28, 32, 34 |
| Satellite 3, Beam 1 | 6, 12, 17, 30 |
| Satellite 3, Beam 2 | 11, 22, 24, 29, 36 |
| Satellite 3, Beam 3 | 16, 18, 23, 35 |

In accordance with the above mappings, an example set of cell-DU-CU mappings can be as follows:

| DU | CU | Cell |
|---|---|---|
| DU1 (Satellite 1) | CU1 | 1, 2, 3, 4, 7, 8, 9, 14, 15 |
| DU2 (Satellite 1) | CU2 | 5, 10 |
| DU3 (Satellite 1) | CU3 | 19, 20 |
| DU4 (Satellite 2) | CU1 | 13 |
| DU5 (Satellite 2) | CU3 | 21, 25, 26, 27, 28 |
| DU6 (Satellite 2) | CU4 | 31, 32, 33, 34 |
| DU7 (Satellite 3) | CU1 | 16 |
| DU8 (Satellite 3) | CU2 | 6, 11, 12, 17, 18, 22, 23, 24 |
| DU9 (Satellite 3) | CU4 | 29, 30, 35, 36 |

As described above, in contrast to terrestrial architectures (e.g., and also to some GEO-based deployments), the association of cells to the satellites and DUs is very dynamic in a LEO-based satellite system. Given that a satellite may be carrying cells serviced by multiple POP CUs, and one DU cannot have multiple F1 interfaces with multiple CUs (this is not allowed by the 5G architecture), the satellites must instantiate individual DUs with each of the CUs mapped to the cells carried by the satellite. The list of cells contained in a specific DU (mapped to a specific CU) in the satellite changes dynamically as and when the cells are assigned to and removed from the satellite. Since a GRM can be aware of the overall picture, the GRM can maintain the cell to DU mapping and can provide the corresponding configuration to the satellite. For example, there may be no predefined mapping between a cell and a beam. Instead, this mapping can also be handled by the GRM based on estimated traffic on each of the cells, assigned frequencies to the cells, and the number of available beams in the satellite.

Figure 15:
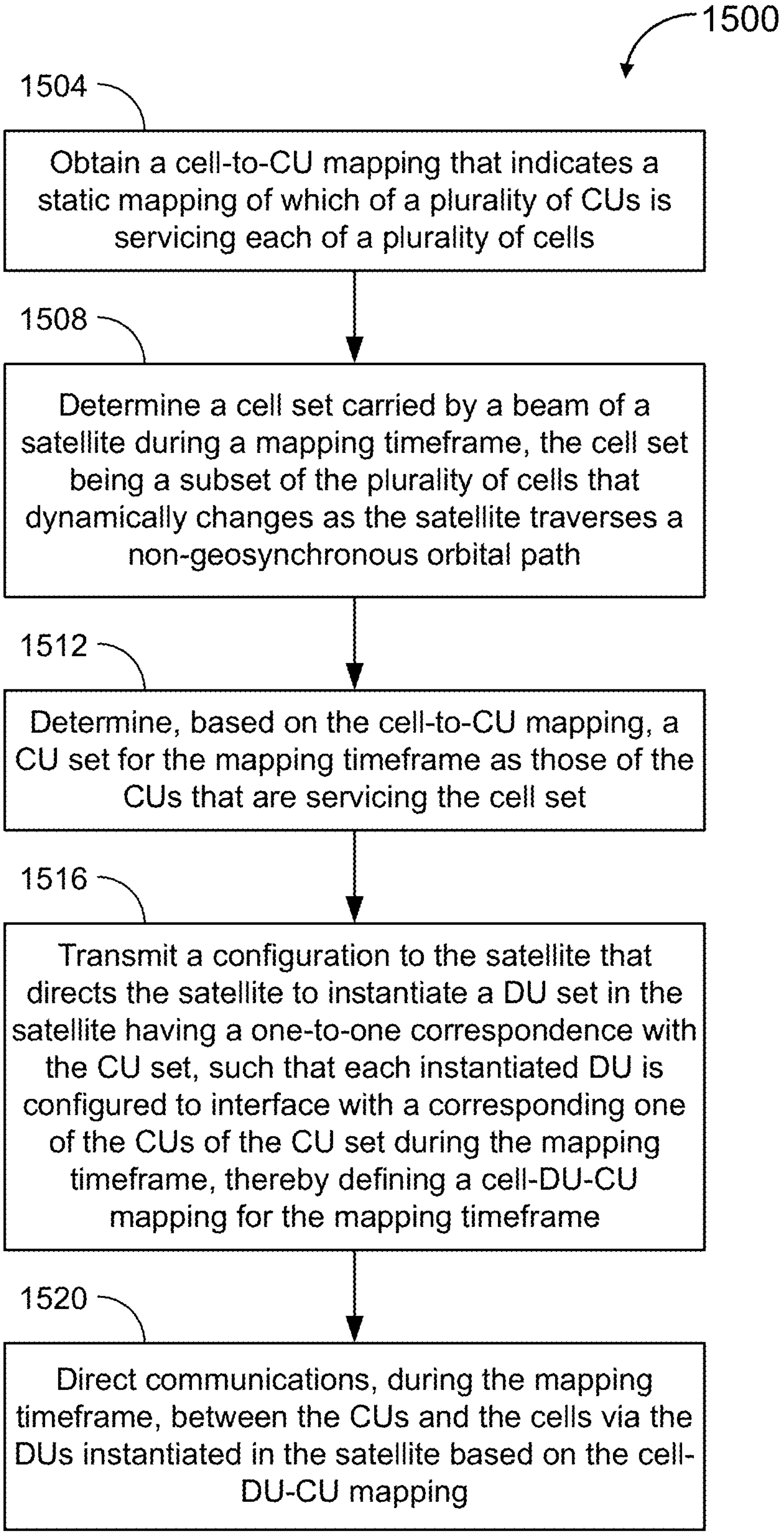
FIG. 15 shows a flow diagram of an illustrative method for establishing communications with user terminals in an integrated terrestrial-non-terrestrial network (iTNTN), according to embodiments described herein.

FIG. 15 shows a flow diagram of an illustrative method 1500 for establishing communications with user terminals in an integrated terrestrial-non-terrestrial network (iTNTN), according to embodiments described herein. Embodiments begin at stage 1504 by obtaining (e.g., by a global resource manager of the iTNTN) a cell-to-CU mapping that indicates a static mapping of which of a plurality of centralized units (CUs) is servicing each of a plurality of cells in the iTNTN. Each of the CUs can be statically associated with a geographic region. For example, each of a plurality of points of presence (POPs) is geographically assigned, and each includes one or more CUs. The POPs can also include anchor nodes that couple SRAN components and functions of the iTNTN with core network components and functions of the iTNTN.

At stage 1508, embodiments can determine (e.g., by the global resource manager) a cell set carried by a beam of a satellite during a mapping timeframe. The cell set is a subset of the cells that dynamically changes as the satellite traverses a non-geosynchronous orbital path (i.e., the satellites are NGSO satellites, such as LEO satellites). In some embodiments, determining the cell set includes selecting the cell set to assign to a beam of the satellite at least based on estimated traffic on the plurality of cells and assigned frequencies to the plurality of cells.

At stage 1512, embodiments can determine (e.g., by the global resource manager), based on the cell-to-CU mapping, a CU set for the mapping timeframe as those of the CUs that are servicing the cell set.

At stage 1516, embodiments can transmit a configuration to the satellite (e.g., by the global resource manager). The configuration directs the satellite to instantiate a distributed unit (DU) set in the satellite having a one-to-one correspondence with the CU set, such that each instantiated DU is configured to interface with a corresponding one of the CUs of the CU set during the mapping timeframe, thereby defining a cell-DU-CU mapping for the mapping timeframe. In some embodiments, the transmitting at stage 1516 includes pushing at least the cell-to-CU mapping from the global resource manager to an anchor node that communicatively couples a satellite radio access network (SRAN) portion of the iTNTN with a core network (CN) portion of the iTNTN. Some embodiments can also push the configuration from the global resource manager to one or more terrestrial satellite network node (SNN) sites in the SRAN portion of the iTNTN for transmission to the satellite. For example, the SNN sites have radio frequency terminals (RFTs), that the transmission to the satellite is via one of the RFTs of one of the SNN sites.

In some such embodiments, the transmitting at stage 1516 further includes pushing default routing labels from the global resource manager to the AN (inside the POP). For example, the routing label stacks for each LSP (label switched path) between edge routers can change dynamically as the topology of the network changes, due to the moving constellation. The labels in each stack identify the next hop in the path. The labels are tagged with start and end times, so that the receiving edge router knows when to obsolete a current label stack and start using a next one. As described herein, the default routing labels enable label-based routing of communications between a POP edge router and a satellite edge router via one of the SNN sites in accordance with the cell-DU-CU mapping (i.e., the satellite edge router is in the satellite, and the POP edge router is in a point of presence (POP) in which the anchor node is disposed).

At stage 1520, embodiments can direct communications, during the mapping timeframe, between the plurality of CUs and the plurality of cells via the DUs instantiated in the satellite based on the cell-DU-CU mapping. For example, the directing can use label-based routing, as described herein.

In some embodiments, the mapping timeframe is one of a sequence of timeframes, each associated with a corresponding location of the satellite along its non-geosynchronous orbital path. In such embodiments, the determining at stage 1508 can include determining a sequence of cell sets comprising a corresponding cell set for each of the sequence of timeframes, the determining at stage 1512 can include determining a sequence of CU sets comprising a corresponding CU set for each of the sequence of cell sets. Further, in such embodiments, the configuration can direct the satellite, for each timeframe of the sequence of timeframes, to instantiate a DU set in the satellite having a one-to-one correspondence with the CU set for the timeframe, thereby defining a cell-DU-CU mapping for each timeframe of the sequence of timeframes.

In some embodiments, the satellite is one of a constellation of satellites, each traversing the non-geosynchronous orbital path in a different corresponding location distributed along the non-geosynchronous orbital path (i.e., they form a NGSO constellation, or a portion thereof). In such embodiments, the determining at stage 1508 can include determining, for each satellite of the constellation, a corresponding cell set as those of the plurality of cells being carried by the satellite during the mapping timeframe. Further, the determining at stage 1512 can include determining, for each satellite of the constellation, a corresponding CU set as those of the plurality of CUs servicing the corresponding cell set for the satellite during the mapping timeframe. Further, the transmitting at stage 1516 can include transmitting the configuration to the constellation, such that the configuration directs each satellite of the constellation to instantiate a corresponding DU set, thereby defining a plurality of cell-DU-CU mappings including a corresponding cell-DU-CU mapping for each satellite during the mapping timeframe.

In some embodiments, each satellite produces multiple beams, each illuminating a corresponding geographic coverage area at the mapping timeframe. In such embodiments, the determining at stage 1508 can include determining, for each beam, a corresponding cell set as those of the plurality of cells being carried by the beam during the mapping timeframe; and the determining at stage 1512 can include determining, for each beam of the constellation, a corresponding CU set as those of the plurality of CUs servicing the corresponding cell set for the beam during the mapping timeframe. Further, in such embodiments, the configuration can direct the satellite to instantiate a corresponding DU set for each of the plurality of beams, thereby defining a plurality of cell-DU-CU mappings including a corresponding cell-DU-CU mapping for each beam during the mapping timeframe.

Physical Layer

Beginning with the feeder-link, the physical layer generally follows DVB-S2x standards. The following table provides a general overview of exemplary features for both the forward and return directions:

| | Forward Link | Return Link |
|---|---|---|
| Multiple access | TDM | TDM |
| Polarization | RHCP, LHCP | RHCP, LHCP |
| Bandwidth per carrier | 250 MHz | 125 MHz |
| Number of carriers per pol. | Up to 12 | Up to 10 |
| Symbol rate | Approx. 238 Msps | Approx. 119 Msps |
| Filter roll-off factor | Approx. 5% | Approx. 5% |
| Modulation | QPSK, 8PSK, 16APSK, 32APSK, 64APSK | QPSK, 8PSK, 16APSK, 32 APSK, 64APSK |
| FEC | DVB-S2X LDPC, Rate 1/4~9/10 | DVB-S2X LDPC, Rate 1/4~9/10 |
| SNR range | −2 dB to 20 dB | −2 dB to 20 dB |
| ACM/Power control | ACM/Carrier level on-off, ULPC | ACM/Carrier level on-off, DLPC |
| MCS peak spectral efficiency (SE) | Up to approx. 5 bits/symbol (64 APSK R5/6) | Up to approx. 5 bits/symbol (64 APSK R5/6) |

Figure 16A:
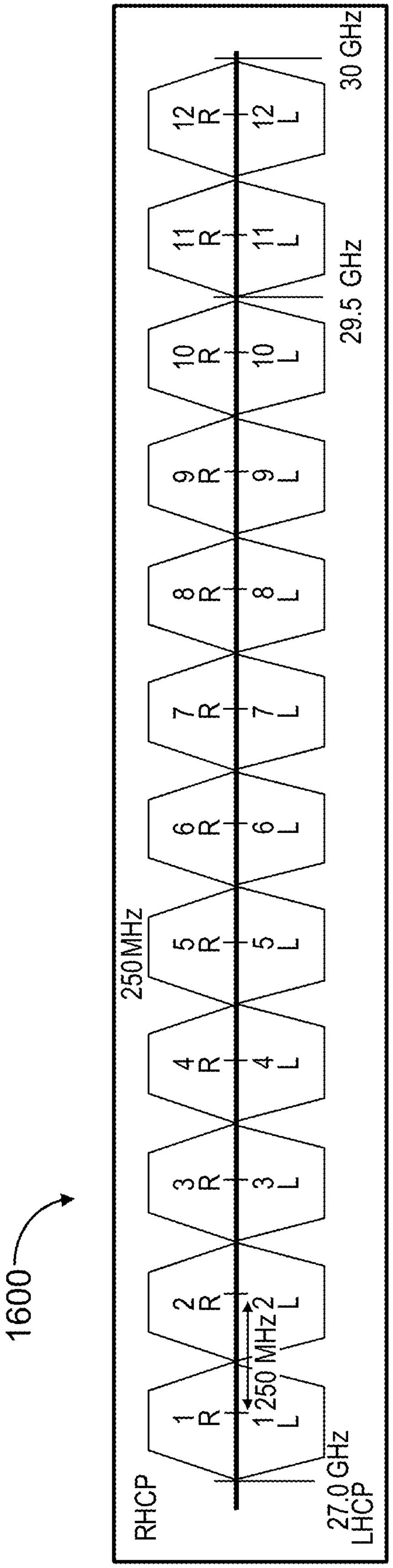
FIGS. 16A and 16B show an example baseline Ka-band feeder link forward channelization and return channelization, respectively.
Figure 16B:
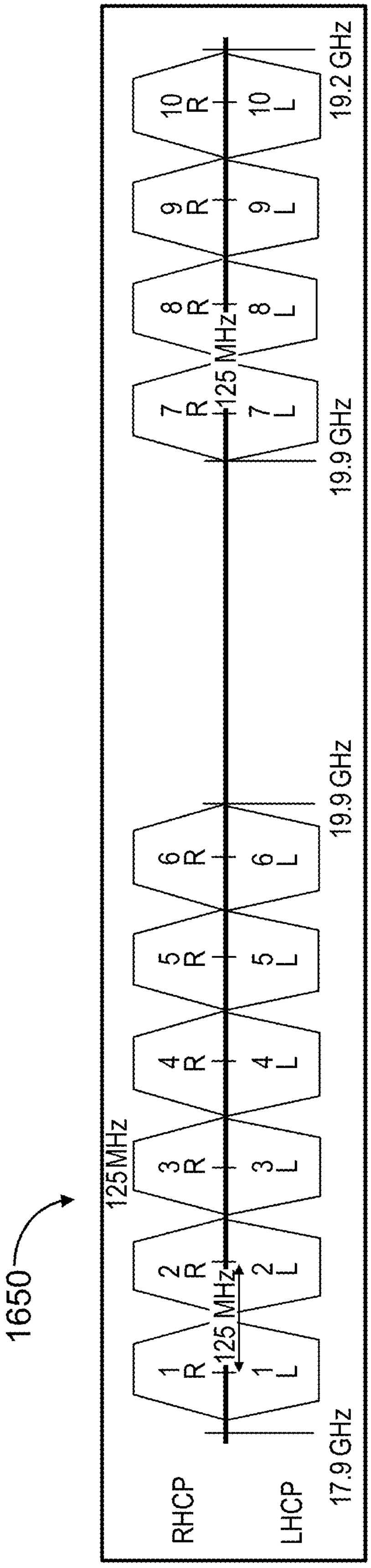

FIGS. 16A and 16B show an example baseline Ka-band feeder link forward channelization 1600 and return channelization 1650, respectively. The feeder link channelizations can be based on 250 MHz (forward) and 125 MHz (return). On the forward link, there can be 27-30 GHz on each polarization orientation (e.g., LHCP, RHCP) with a total usable bandwidth of up to 2×12×¼ GHZ=6 GHz. On the return link, there can be 17.8-18.6 and 18.8-19.3 GHz on each polarization orientation with a total usable bandwidth of up to 2×10×⅛ GHZ=2.5 GHz.

The user link physical layer can be based on the 5G NR air interface release 17/18. The following table provides a general overview of exemplary features for both the forward and return directions.

| | Forward Link | Return Link |
|---|---|---|
| Multiple Access | CP-OFDM | DFT-S-OFDM |
| Bandwidth per carrier | 250 MHz | 125 MHz |
| Filter Roll-off | Approx. 5% | Approx. 5% |
| Inter carrier aggregations | Up to two | Up to two |
| Maximum # of traffic RBs per carrier | 165 | 165 |
| Number of subcarriers per RB | 12 | 12 |
| Traffic channel subcarrier spacing | 120 kHz | 60 kHz |
| Traffic channel subcarrier modulation | QPSK, 16QAM, 64QAM | Pi/2-BPSK, QPSK, 16QAM, 64QAM |
| Traffic channel FEC | NR LDPC, rate compatible BG1: Info. up to 8448 bits BG2: Info. up to 3840 bits Code block concatenations (multiple code block transmissions) in a burst Support HARQ CC and IR combining | NR LDPC, rate compatible BG1: Info. up to 8448 bits BG2: Info. up to 3840 bits Code block concatenations (multiple code block transmissions) in a burst Support HARQ CC and IR combining |
| Traffic channel SNR range | −9 dB to 18 dB | −9 dB to 18 dB |
| ACM/Power Control | ACM/Duty Cycling | ACM/Power Control |
| MCS peak Spectral Efficiency (SE) | Approx. 4 bits/symbol or higher (64 QAM R4/5) | Approx. 4 bits/symbol or higher (64 QAM R4/5) |
| Radio frame length | 10 ms | 10 ms |
| Radio subframe length | 1 ms | 1 ms |
| Slot length | 125 us | 250 us |
| Number of OFDM symbols per slot | 14 | 14 |
| Useful symbol duration | 8.33 us | 16.67 us |

Figure 17A:
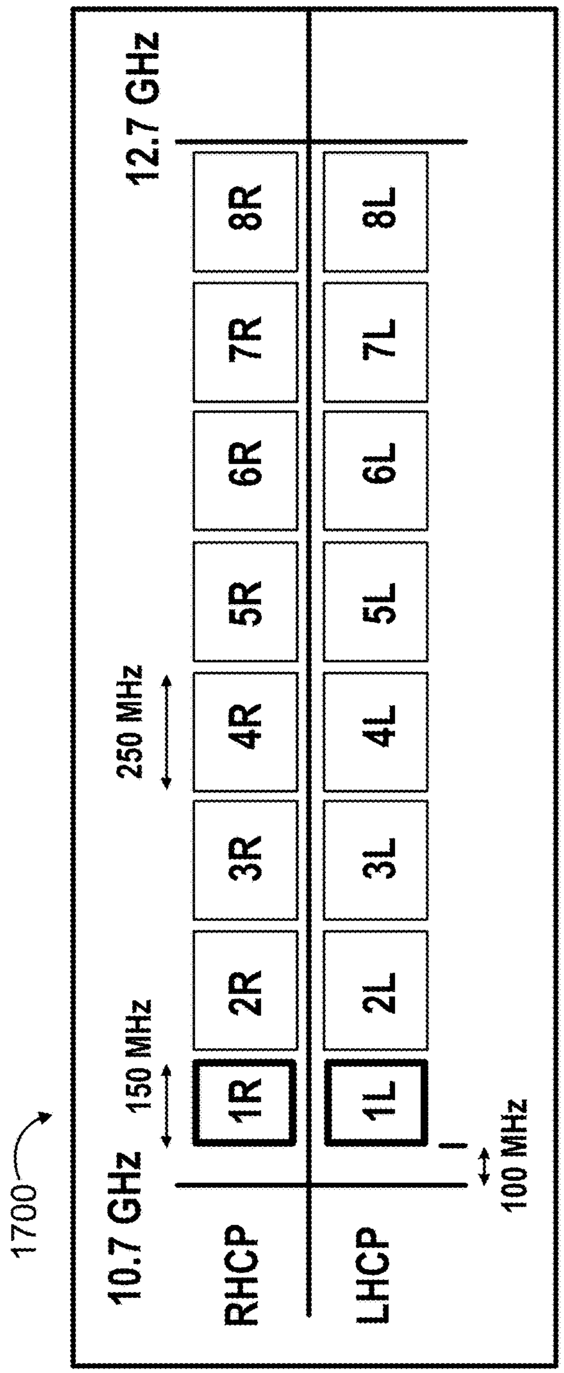
FIGS. 17A and 17B show an example baseline user link forward channelization and return channelization, respectively.
Figure 17B:
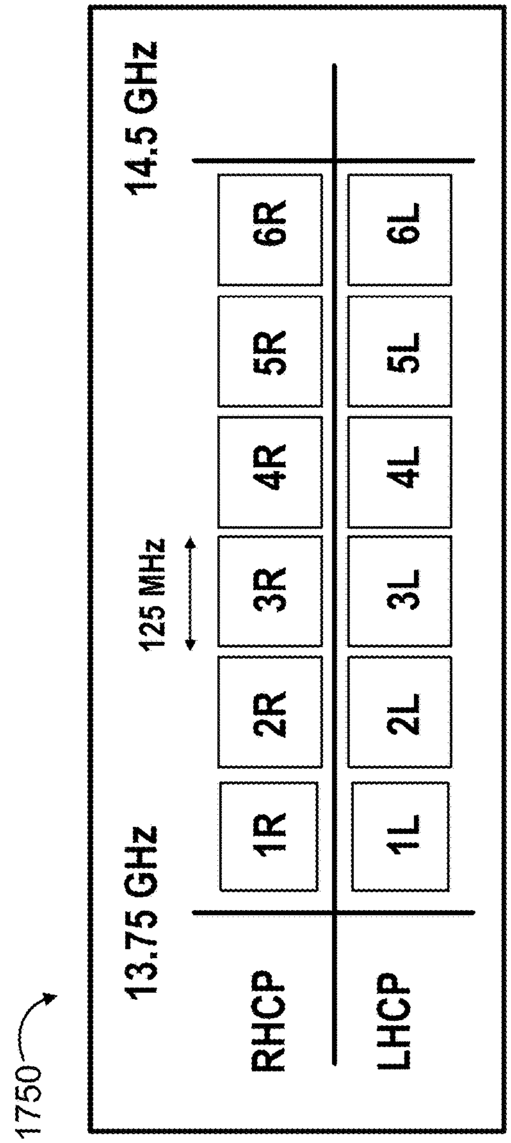

FIGS. 17A and 17B show an example baseline user link forward channelization 1700 and return channelization 1750, respectively. The user link channelizations can be based on 250 MHz (forward) and 125 MHz (return). On the forward link, there can be 8×250 MHz channels in each polarization orientation (e.g., LHCP, RHCP). Each 250 MHz channel will be occupied with a single wideband OFDM carrier. The 100 MHz range from 10.7 GHz to 10.8 GHz may not be supported where implementing hardware filtering in satellite user link arrays is specified to prevent emissions in the 10.6 GHz to 10.7 GHz Radio Astronomy Band. On the return link, there can be 6×125 MHz channels in each polarization orientation. Each 125 MHz channel can be received by transmissions with different bandwidth from multiple terminals.

The following table summarizes example forward physical layer channels and signals, as adopted from NR standards.

| PHY channels/Signals | Modulation | FEC |
|---|---|---|
| PDSCH/DM-RS | QPSK, 16QAM, 64 QAM | LDPC BG 1 and 2 |
| PDCCH/DM-RS | QPSK | Polar Code |
| PBCH/DM-RS | QPSK | Polar Code |
| PSS | m-sequence, BPSK | N/A |
| SSS | Gold-sequence, BPSK | N/A |
| PTS, CSI-RS | Gold-sequence, QPSK | N/A |
| PRS | Gold-sequence, QPSK | N/A |

In the above table, “PDSCH/DM-RS” is the physical downlink shared channel/demodulation reference signal, “PDCCH/DM-RS” is the physical downlink control channel/demodulation reference signal, “PBCH/DM-RS” is the physical broadcast channel/demodulation reference signal, “PSS” is the primary synchronization signal, “SSS” is the secondary synchronization signal, “PTS” is the phase tracking signal, “CSI-RS” is the channel state information reference signal, and “PRS” is the positioning reference signal. A synchronization signal block (SSB), which consists of the PSS PBCH and SSS, can be used for the acquisition burst. PBCH carries the system information needed for UTs-to-RACH (random access channel) communications and login to the system.

The following table summarizes example return physical layer channels and signals, as adopted from NR standards.

| PHY channels/ Signals | Modulation | FEC |
|---|---|---|
| PUSCH/DM-RS/ PT-RS | Pi/2-BPSK, QPSK, 16QAM, 64 QAM/Gold (Pi/2-BPSK) and ZC sequence (Chirp) | LDPC BG 1 and 2 |
| PUCCH/DM-RS | BPSK, QPSK/ZC sequence, Chirp | Block, Polar code |
| PRACH Preamble | ZC sequence based, Chirp | N/A |
| SRS | ZC sequence based, Chirp | N/A |

In the above table, “PUSCH/DM-RS/PT-RS” is the physical uplink shared channel/demodulation reference signal/ phase tracking reference signal, “PUCCH/DM-RS” is the physical uplink control channel/demodulation reference signal, “PRACH” is the physical random access channel, “SRS” is the sounding reference signal, “ZC” sequence is the Zadoff-Chu sequence used for signal processing, and “LDPC” is the low-density parity-check method for error correction. The PHY layer can support delay-efficient, two-step PRACH transmission. In the two-step PRACH transmission, a UT transmits a PRACH preamble/PUSCH (e.g., MsgA), and the UT receives the PDCCH/PUSCH bursts (e.g., MsgB) as a response from the network.

High capability terminals are assumed to receive two channels simultaneously to increase the downlink peak user throughput by a factor of two (e.g., above 1.4 Gbps). Similarly, the peak user PHY throughput in the return link can be more than 540 Mbps with two carrier aggregations, with 39 dBW of EIRP on each carrier (total 42 dBW). Minimum capability terminals are assumed to operate in a half-duplexing mode (i.e., they cannot transmit and receive at the same time), and their peak throughput is expected to be about 40% of full-duplexing mode throughput: 120 Mbps (downlink) and 23 Mbps (uplink).

The following table summarizes feeder link (Ka-band) impairment and mitigation techniques for use in channel impairment and interference management.

| | Impact | Mitigation methods |
|---|---|---|
| Rain and Scintillation | Signal power attenuation, resulting in SNR drop. Typically, no more than 10 dB of rain fade and 0.5 dB attenuation of scintillation. | Employ power control, ACM with robust MCS operating as low as SNR of −2 dB, and margin of 0.5~1.0 dB to accommodate any ULPC/ACM error and fast attenuation.<br>During typical rain fade, the feeder link can maintain a minimum throughput of 50% of the clear sky value and a mean throughput of 75% of the clear sky value. |
| Doppler | Up to 20 ppm of frequency offsets and timing drift | Pre-compensation better than 0.1 ppm, and the receiver aperture will be wide enough to accommodate any residual frequency and timing errors. |

-continued

| | Impact | Mitigation methods |
|---|---|---|
| Co-channel interference from other LEO constellations | Although it is expected to be a rare event (<0.01%), the SNIR can drop by 19 dB (4.75 dB/sec). | Employ fast in-line interference event detection (may consider using other LEO satellite position information for proactive mitigation), and ACM to avoid CRC errors. Will consider using burst mode receivers to avoid any tracking loop lock loss and recovery issue and associated packet errors.<br>During such in-line event where the SINR can drop as high as 19 dB, the average throughput during 3-4 second in-line event is expected to be no less than [35%] of throughput without the interference. |

The following table summarizes user link (Ku-band) impairment and mitigation techniques for use in channel impairment and interference management.

| Channel Impairment | Impact | Mitigation methods |
|---|---|---|
| Rain and Scintillation | Signal power attenuation, resulting in SNR drop. Rain fade typically varies between 0.1 dB~3 dB, and scintillation 0.1~0.2 dB. The actual amount of fade/attenuation depends on UT location, season, and elevation angle. | Utilize power control, HARQ, ACM with robust MCS and margin of 0.4 dB to accommodate any ULPC/ACM error.<br>During typical rain fade, the user link can maintain a minimum throughput of 50% of the clear sky value and a mean throughput of 75% of the clear sky value. |
| Doppler | Up to 22 ppm of frequency offsets and timing drift | Pre-compensation better than 0.1 ppm, and the receiver aperture will be wide enough to accommodate any residual frequency and timing errors. |
| Co-channel interference from other LEO constellation | Although it is a rare event (probability less than 1%), the I/N can increase by 10 dB (0.7 dB/sec) due to co-channel interference from other LEO system satellites. | Employ fast in-line interference event detection, proactive re-routing, sidelobe suppression, ACM, power control and HARQ to avoid packet errors. Use a burst mode receiver to avoid any tracking loop lock loss and recovery issue and associated packet errors. |

The following table shows an expected throughput during an in-line interference event relative to interference free scenarios for different SNRs for various interference-to-noise (I/N) scenarios. The normalized throughput (bits/sec/Hz) is derived from a Shannon capacity with 2.5 dB margin, without any adjustment for protocol overheads. As the most robust MCS is designed to support SINR around-9 dB, the normalized throughput will be much lower than the values in the table when SINR becomes below-9 dB.

| | | | | | | | | | | |
|---|---|---|---|---|---|---|---|---|---|---|
| **No Interference** | | | | | | | | | | |
| SNR (dB) Interference free | −9 | −6 | −3 | 0 | 3 | 6 | 9 | 12 | 15 | 18 |
| Normalized throughput (bps/Hz) | 0.10 | 0.19 | 0.36 | 0.64 | 1.09 | 1.70 | 2.45 | 3.31 | 4.23 | 5.19 |
| Throughput relative to interference free (%) | 100 | 100 | 100 | 100 | 100 | 100 | 100 | 100 | 100 | 100 |
| **I/N = 0 dB** | | | | | | | | | | |
| SNR (dB) Interference free | −12.0 | −9.0 | −6.0 | −3.0 | 0.0 | 3.0 | 6.0 | 9.0 | 12.0 | 15.0 |
| Normalized throughput (bps/Hz) | 0.05 | 0.10 | 0.19 | 0.36 | 0.64 | 1.08 | 1.69 | 2.45 | 3.31 | 4.23 |
| Throughput relative to interference free (%) | 29.3 | 51.7 | 53.1 | 55.5 | 59.2 | 63.9 | 69.1 | 74.0 | 78.1 | 81.5 |
| **I/N = 5 dB** | | | | | | | | | | |
| SNR (dB) Interference free | −15.2 | −12.2 | −9.2 | −6.2 | −3.2 | −0.2 | 2.8 | 5.8 | 8.8 | 11.8 |
| Normalized throughput (bps/Hz) | 0.02 | 0.05 | 0.09 | 0.18 | 0.34 | 0.62 | 1.05 | 1.65 | 2.40 | 3.25 |
| Throughput relative to interference free (%) | 14.2 | 25.3 | 26.4 | 28.4 | 31.7 | 36.6 | 42.9 | 49.9 | 56.7 | 62.7 |
| **I/N = 10 dB** | | | | | | | | | | |
| SNR (dB) Interference free | −19.4 | −16.4 | −13.4 | −10.4 | −7.4 | −4.4 | −1.4 | 1.6 | 4.6 | 7.6 |
| Normalized throughput (bps/Hz) | 0.01 | 0.02 | 0.04 | 0.07 | 0.14 | 0.27 | 0.49 | 0.86 | 1.39 | 2.08 |
| Throughput relative to interference free (%) | 9.4 | 9.7 | 10.2 | 11.2 | 12.9 | 15.8 | 20.1 | 25.9 | 32.8 | 40.1 |

Another physical layer consideration is synchronization. A synchronization reference point can be defined at the satellite. For example, the satellite can derive system timing and frequency synchronization reference from the global navigation satellite system (GNSS). Similarly, the ground nodes and user terminals can be equipped with a GNSS receiver. The timing and frequency reference for ground nodes and user terminals can be based on timing and frequency derived from the GNSS receiver and the knowledge of their position relative to the satellites. Satellites can periodically broadcast satellite ephemeris data to the user terminals.

Embodiments can also support using other sources for system timing and frequency synchronization reference. The satellite motion can introduce Doppler effects to the fixed terminals in the magnitude of 20 ppm at an elevation angle of 20 degrees. The Doppler from the motion of aero terminals can be as high as 1.7 ppm. The pre-Doppler/delay compensation, using satellite ephemeris and relative and positions of user terminals and satellites, will significantly reduce the timing and frequency uncertainty introduced by the motion of the LEO satellites to no more than 0.1 ppm, such that the receiver only need to handle residual Doppler.

Another physical layer consideration is beam hopping. The following table shows exemplary beam hopping parameters that can support flexible and efficient beam hopping for user link traffic channels and access channels.

| | Communications | | System Access | |
|---|---|---|---|---|
| | | | Downlink | Uplink |
| | Downlink | Uplink | Acquisition | System Access |
| Applicable Physical channels | PDSCH, PDCCH | PUSCH, PUCCH | SBS (PSS/SSS/PBCH (MIB), PDCCH/PDSCH (SIB1)/PRS | PRACH, PUSCH |
| Dwell Resolution | 250 us | 250 us | [0.5~1] ms (acquisition) | [0.5~1] ms |
| Hopping cycle duration (cell revisit time) | 5 ms | 5 ms | [150~300] ms (acquisition) | [150~300] ms |
| Max. no. of hops per hopping cycle | 20 | 20 | [300] (acquisition) | [300] |

The dwell duration for individual cells and downlink/uplink allocation will be dynamically scheduled by MAC, based on instantaneous traffic demand. It is expected that burst transmission and arrival time uncertainty due to synchronization errors and beam switching time is within CP (Cyclic Prefix) duration. Terminals that are semi or coarsely synchronized (timing error more than CP duration but less than 8 us downlink and 16 us in uplink) may have to de-puncture (neutralize) soft bits associated with the first or the last OFDM symbol received during the dwell period. Similarly, the satellite may choose not to send or use the first or last OFDM symbol at the expense of capacity reduction of around 3.5% (downlink) to 7% (uplink).

PRACH opportunities for each cell are 3.3 opportunities/sec and the PRACH receiver can detect more than 10 preambles for each opportunity, resulting in more than 33 RACH opportunities per second. Assuming 50 users in a cell and RACH request rate of 1/120 seconds from a user, the RACH load is 50/120 requests per second, and the resulting RACH utilization is (50/120)/33=1.2%. As the collision probability is less than 1.2%, random access channel can easily support the random-access completion of all UTs within a satellite coverage within 5 seconds and at least 20% of UTs within 1 second.

The physical layer can be designed to support integrated LEO/GEO operation (e.g., as described above with reference to FIG. 7). Although the user terminal physical layer may treat the reception of signals from LEO and GEO separately (e.g., with two separate modems), the receiver processing can be done to meet any timing requirements from the upper layer to support seamless operation of LEO and GEO operation. Embodiments include a flexible air interface to accommodate envisaged coordinated operations using LEO and GEO satellite paths for any physical layer throughput or reliability enhancements.

Layer 2

This following section addresses the service-link Radio Link Control (RLC), Medium Access Control (MAC), and scheduler at the satellite. Flow Control between the centralized units (CUs) and distributed units (DUs) is briefly discussed and assumes an F1 (CU-DU) interface and functionality and an NR user plane protocol. Packet processing performed by MAC and RLC layers in forward and return directions is also described. In some implementations, the packet data processing can follow 5G-NR frameworks and can interface with a 5G core network. In such implementations, the service link physical layer is assumed to be based on 5G-NR as well.

As described herein, each satellite can include a DU implementation that includes MAC and RLC entities. Embodiments of the satellite-resident MAC entities can provide several functions, including: facilitating data transfer of different logical channels including broadcast, common, paging and multicast channels; multiplexing and/or demultiplexing of MAC service data unit signals from different logical channels (radio bearers) to and/or from the physical layer; dynamic scheduling of user terminals and their associated logical flows; handling retransmission (e.g., using hybrid automatic repeat request, HARQ); and performing power control link adaptation functions. Embodiments of the satellite-resident RLC entities can provide several functions, including handling transfer of PDPCP PDU and RRC control messages, handling segmentation and reassembly of packets, and providing retransmission and recovery mechanisms (when configured in acknowledged mode, "AM" or "AM mode"). Corresponding RLC and MAC entities can also reside at the user terminals with some difference in their respective functions, specifically at the MAC.

Figure 18:
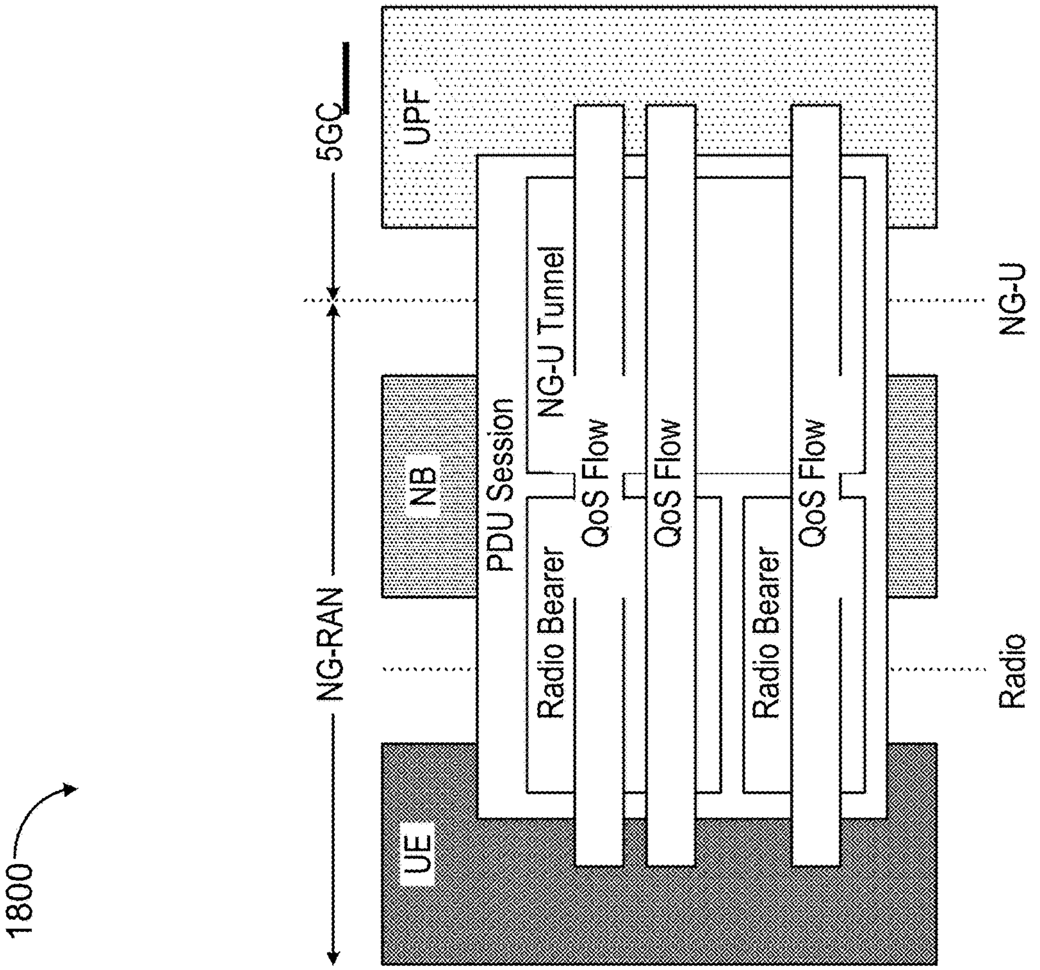
FIG. 18 shows an example QoS architecture, which is consistent with 3GPP-defined architectures.

One Layer 2 function is quality or service (QOS) support. FIG. 18 shows an example QoS architecture 1800, which is consistent with 3GPP-defined architectures. Within a PDU session, at the NAS layer, the QoS flow can be the finest granularity in specifying packet forwarding treatment and can be characterized by a 5G QoS identifier (5QI). The UPF maps IP packets to the QoS flow and tags the packet with a QoS flow identifier (QFI). The NG-RAN (or SRAN), and specifically the CU SDAP, maps the QoS flow to the appropriate radio bearer. Multiple QoS flows may be mapped to the same radio bearer and will experience the same treatment. This is done if the QoS attributes are similar, or if there are limitations on the number of radio bearers that can be set up; or to limit the overall processing requirements on the satellite, such as by reducing the number of radio bearers.

Each user terminal can have multiple PDU sessions, and packets associated with those PDU session can map to different radio bearers. In other words, a single radio bearer would not carry traffic from different PDU sessions. QFI is used to map packet to the appropriate radio bearer (e.g., data radio bearer, DRB) that reflects the flow's QoS characteristics.

The scheduler can allocate resources based on the radio bearer attributes. The radio bearer attributes reflect the QoS flow attributes or are derived therefrom. For example, setting up the radio bearer attributes from the QoS flows may involve GBR aggregation. A radio bearer can reflect the QoS attributes of the QoS flow's 5QI. An example approach for 5QI-to-QoS characteristics mapping can be found in 3GPP TS 23.501. For example, the QoS attributes can include:

resource type (GBR, non-GBR, or delay critical GBR), default priority level, packet delay budget (PDB), packet error rate, guaranteed flow bit rate (GFBR) for both uplink and downlink, and maximum flow bit rate (MFBR) for both uplink and downlink. GFBR and MFBR apply only to GBR flows.

Such QoS parameters can provide all the salient information used by the MAC layer, RLC, and scheduler for either configuring or handling packets associated with a specific radio bearer. Regarding the MAC and RLC, embodiments include a 5G-based RLC/MAC. RLC and MAC run between the user terminals and the satellite. AM mode may be configured to provide additional reliability when desired. RLC mode selection is based on traffic flow and the desired target packet error rate. RLC AM configuration applies to non-GBR flows with low FER target (e.g., below $10^{-3}$). For example, configurations operate with target $10^{-3}$ frame error rate over the service link, and with HARQ, the frame error rate can be even lower. Therefore, 5QI mapping to a packet error rate of 106 may rely on operating with RLC AM mode. GBR flows may also be mapped to RLC AM rate, if they have a low packet error rate and are delay tolerant. For example, "5QI 4" maps to a packet error rate of 106 and has a packet delay budget of 300 milliseconds. Both unacknowledged mode (UM) and AM modes provide segmentation and reassembly capabilities. Mapping to RLC AM or UM mode can be predefined or based on a set of rules.

Regarding the scheduler, embodiments of the scheduler can support different traffic types for different applications, services, etc. The following table shows examples of different traffic types supported by the scheduler and example applications using those services. The examples reflect the QoS characteristics of a wide range of services.

| Type | Delay Sensitive | Example application |
|---|---|---|
| Non-GBR | Delay tolerant | Email, file transfer etc. |
| Non-GBR | Delay sensitive | Signaling, interactive services: web browsing, gaming. |
| GBR | Delay tolerant | Streaming |
| GBR | Delay sensitive | (VOIP/Video conferencing etc.) |

Embodiments of the scheduler allocate resources for the radio bearers and the QoS characteristics of its associated flows. This can apply also to multicast bearers. Embodiments can schedule group data flows into three main categories. Within each category, additional treatment and configuration can be applied. A first category can be a "strict priority" scheduler that allocates resources for signaling radio bearers, radio bearers carrying signaling traffic, RLC status PDU, and MAC control messages. The flows assigned to this scheduler carry signaling packets and are delay sensitive. A second category can be a "GBR scheduler," which can rely on a credit-based scheduler to track the resources given to the specific bearer so that guaranteed rates are met. In addition to the GBR rate, delay budget can be considered, while also trying to use the channel most efficiently in order to reduce the overhead associated with each transmission including processing, control channel signaling, and HARQ feedback. Use of semi-persistent scheduling and configured (uplink) grants can offload dynamic slot allocation and related processing at the scheduler. This can also reduce overhead associated with signaling of downlink and uplink grants on PDCCH. A third category can be a "weighted fairness" type of scheduler. For non-GBR traffic, such a scheduler can be used to provide throughput/resource fairness and to allocate resources to GBR flows beyond the GBR and up to the MBR.

Several features can be included in the uplink schedulers in the user terminals for providing desired QoS. One such feature is that the user terminal can continuously report backlog for its flows using a logical channel group. A logical channel group may contain multiple flows with similar QoS requirements. Another feature is that the uplink scheduler can allocate terminals according to logical channel group priorities and QoS requirements. Another feature is that uplink allocation grants can be for the UT and may not be flow specific. The user terminal (uplink) scheduler can pick the flows based on a set of rules and RRC configuration that comes from the SRAN. The configuration can include the flow priority and prioritized data rate. Another feature is that the user terminal follows a strict priority in selecting a flow; once a certain allocation rate is reached for a flow, its priority can drop with respect to the other flows, and other flows can be selected.

Figure 19A:
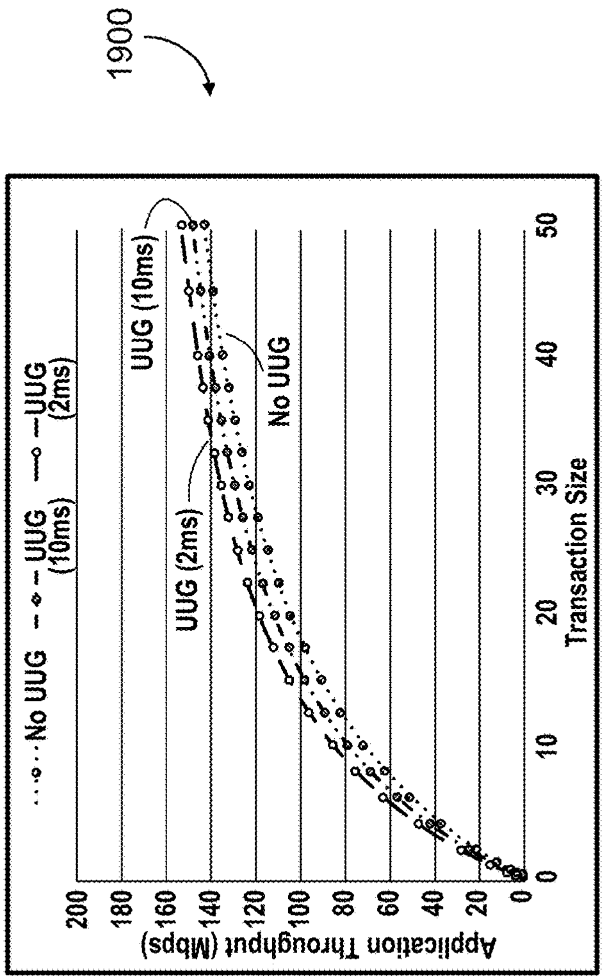
FIGS. 19A and 19B show two plots illustrating an example impact of UUG on application layer throughput TCP and congestion window growth, respectively.
Figure 19B:
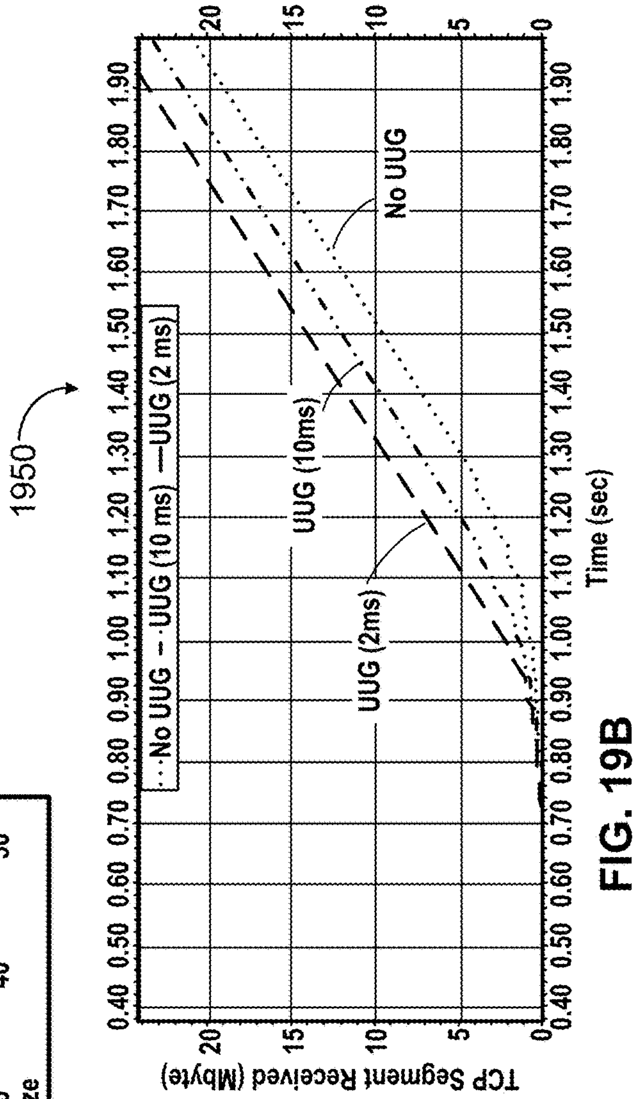

Return link resource allocation can be primarily on-demand and can use the user terminals' backlog reporting for the different type of flows. However, to provide better application layer performance, embodiments can include an unsolicited uplink grant (UUG) feature. According to this feature, a user terminal can be provided with uplink grants from an available pool of resources without an explicit request for resources from the user terminal. Such unsolicited uplink grants are used by user terminals to transmit acknowledgements (e.g., TCP ack) without waiting for more than a RTT to get grants and then transmit an acknowledgement. This can significantly improve the application layer throughput. FIGS. 19A and 19B show two plots 1900 and 1950 illustrating an example impact of UUG on application layer throughput TCP and congestion window growth, respectively.

Figure 20A:
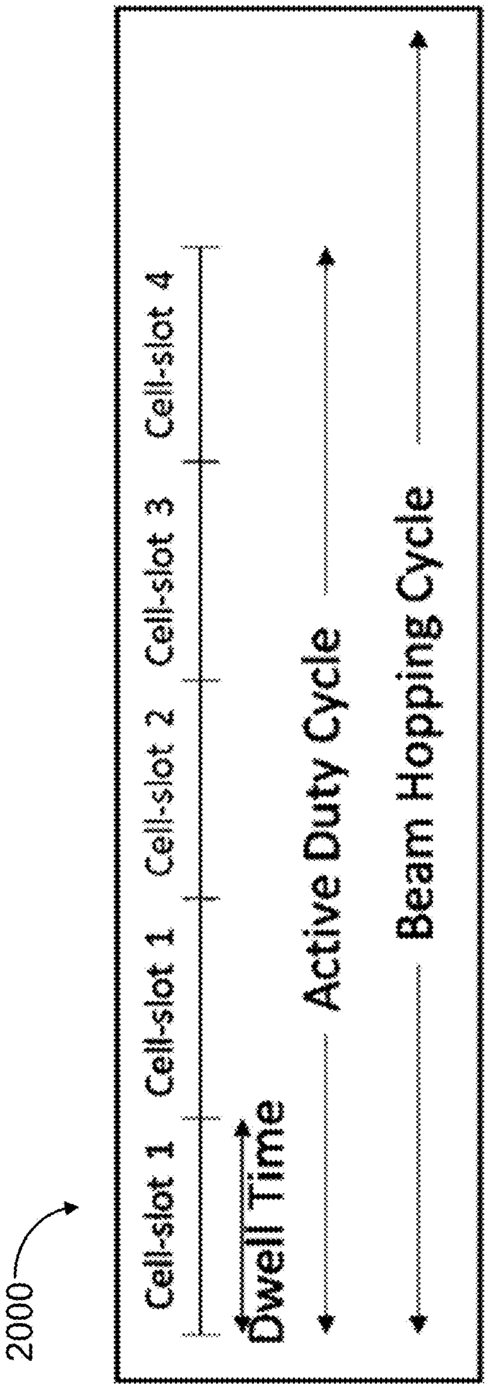
FIG. 20A shows an example timing relationship of different cycles associated with beam scheduling, hopping, and duty cycle.

Some other features and aspects of the scheduler can relate to beam hopping. FIG. 20A shows an example timing relationship 2000 of different cycles associated with beam scheduling, hopping, and duty cycle. For example, as illustrated, each beam hopping cycle can be longer than each active duty cycle, which can be longer than each cell slot dwell time. Cell demand and load can drive a "cell selection" as part of the scheduler with special consideration to GBR demand, while ensuring a minimum scheduling opportunity for lightly loaded cells due UT synchronization, cell acquisition, and/or other requirements.

Figure 20B:
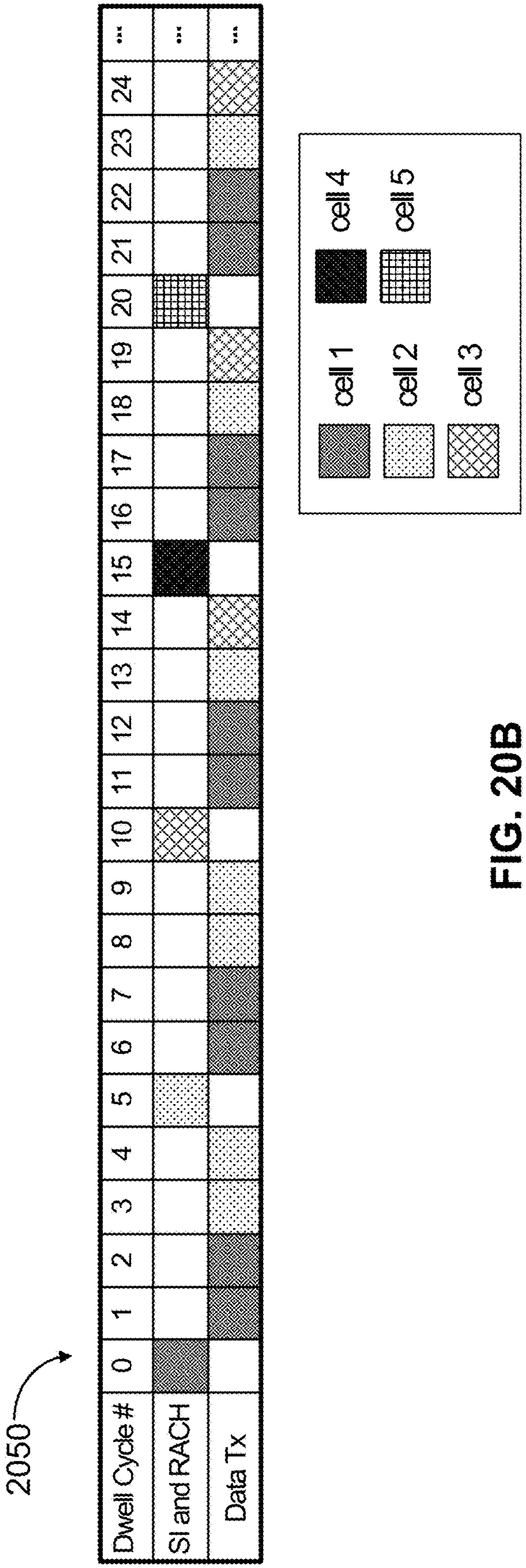
FIG. 20B shows an example of a cell-slot schedule in which the schedule is semi-static. The illustrated example uses 5 cells assigned to a beam.

In addition to the cell-slot demand, the beam hopping scheduler must consider the satellite beam hopping capability, how much in advance the hopping cycle can be changed, and/or whether the cell-slot can be chosen on demand. For example, FIG. 20B shows an example of a cell-slot schedule 2050 in which the schedule is semi-static. The illustrated example uses 5 cells assigned to a beam. The schedule shows the cell assigned to each dwell cycle. In this case, each cell is visited at least once for every five dwell cycles for the purpose of system information and to provide RACH opportunities (SI/RACH periodicity value used is just for illustration purpose). This cycle represents a minimum idle-mode cycle. The cell selection for the purpose of data transmission can follow a different pattern and can be based on the demand in the different cells, such as with cells 1 and 2 getting more allocations as compared to cells 3, 4, and 5. The activation of the cell can happen at different times in the forward and return directions. This follows the timing relationship (e.g., a fixed timing relationship) between the downlink and uplink burst used, for example, to provide uplink allocation.

Some other features and aspects of the scheduler can relate to half-duplex operation. Embodiments of the scheduler can support half-duplex implementations for user terminals that use both GEO and LEO satellite communications. In addition to half-duplex operation and accounting for blocking, system and parameter configuration can be optimized for maximizing transmission opportunities and throughput. For example, transmit-receive (Tx-Rx) offset configuration can be optimized for each beam and for each contact and can account for the roll/pitch profile and the beam delay spread of the satellites.

Figure 21:
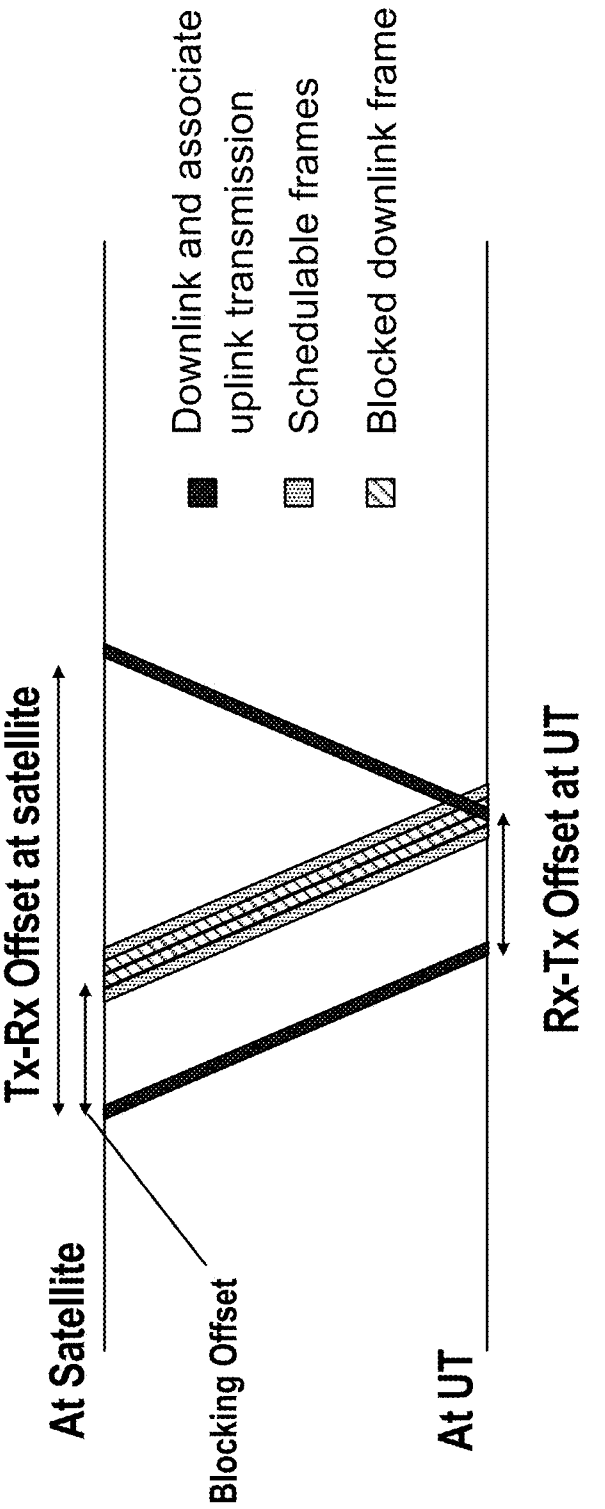
FIG. 21 shows an example of a half-duplex timeline illustrating half-duplex blocking and impact of an uplink transmission on a downlink transmission.

FIG. 21 shows an example of a half-duplex timeline 2100 illustrating half-duplex blocking and impact of an uplink transmission on a downlink transmission. All user terminals can be treated as if they are collocated based on cell location, which can lessen the burden on the satellite scheduler. Timing varying service link delay is used by the scheduler for this calculation. Embodiments can rely on the Tx-Rx configuration being the same for all cells associated with a specific beam. Beam hopping schedules can also factor in the impact of half-duplex operations when assigning slots to the different cells. The alignment of the slots can impact performance, as the half-duplexing may result in a different assignment than there would be if only accounting for the number of resources that each cell gets in a beam hopping period.

Another Layer 2 function is CU-DU flow control. Embodiments rely on an "F1" interface to transfer PDCP packets between the CU and the DU. Some relevant aspects of the F1 interface are defined in 3GPP TS 38.425. The F1 interface includes two components: F1-C, which manages the control plane; and F1-U, which is dedicated to the user plane (handling user data transmissions). The CU-DU flow control may be primarily concerned with the F1-U component and can include the following (the information below is per radio bearer): provision of F1-U interface sequence numbers, a retransmission mechanism between the CU and DU, information on PDCP packet delivery and whether or not those packets are delivered to lower layers of the user equipment, information on PDCP packets to be discarded, information on the desired buffer size in the DU and data rate in bytes (accounting for longer potential CU-DU delays in certain embodiments described herein can involve special treatment for this estimate), use of assistance information and CU-DU RTT delay to allow the CU to make better decisions and to assist the DU in its buffer management, and flow control and operation information that is specific to the radio bearer and to whether it is using RLC AM or UM mode.

Figure 22:
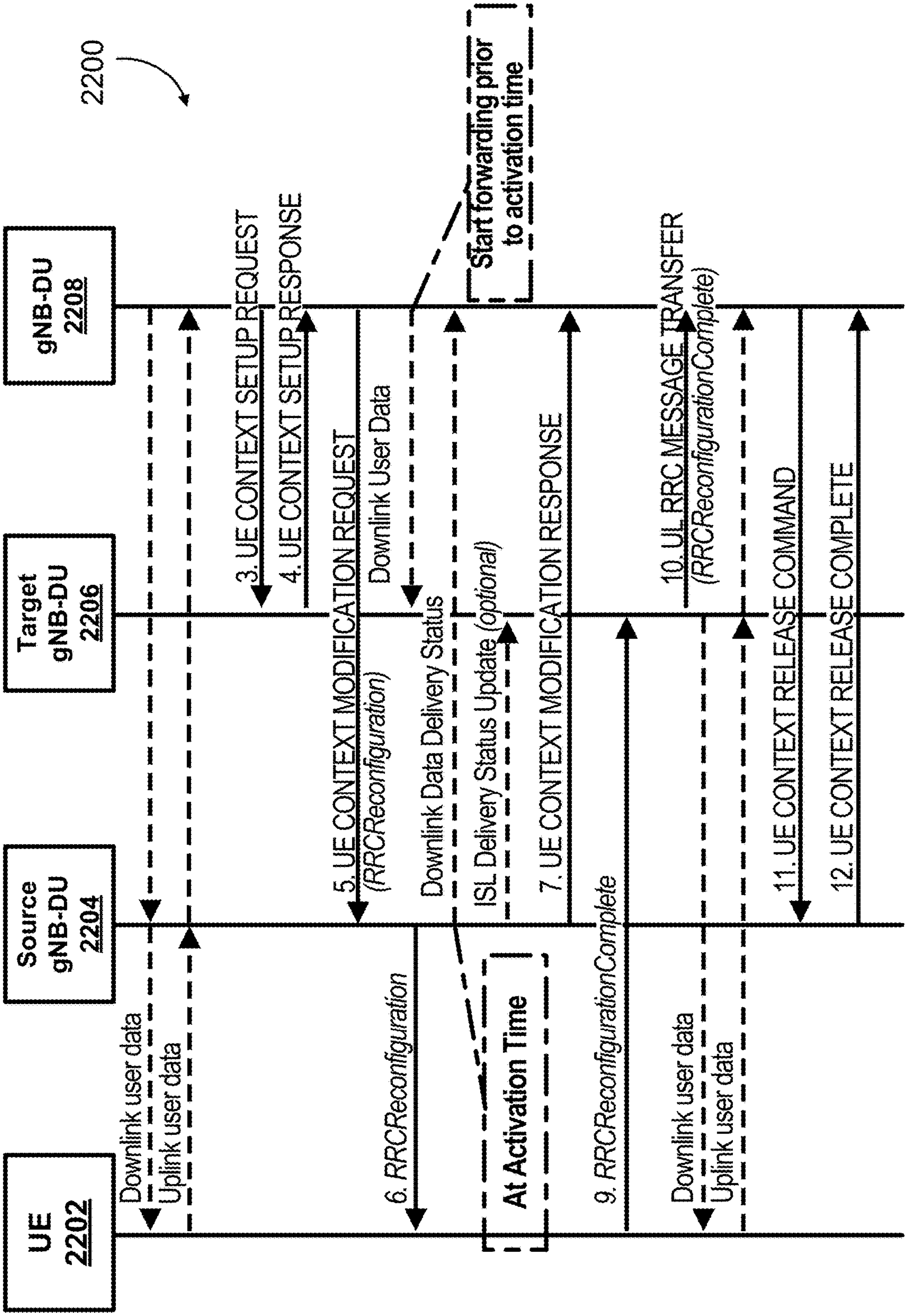
FIG. 22 shows a call flow diagram for an example high-level interaction between a user equipment (UE), a CU, a source DU (on a source satellite), and a target DU (on a target satellite).

Another Layer 2 function is facilitating lossless satellite handover. During a satellite handover, all the user terminals in a cell are assigned to a different satellite. FIG. 22 shows a call flow diagram 2200 for an example high-level interaction between a user equipment (UE) 2202, a CU 2208, a source DU 2204 (on a source satellite), and a target DU 2206 (on a target satellite). The call flow diagram 2200 includes a RRC reconfiguration message carrying a handover message. This call flow enhances Inter-gNB-DU mobility call flow. The call flow shows a proprietary optional ISL delivery status message to expedite the delivery of the latest PDCP delivery information to a target satellite in the context of inter-satellite links. The baseline is to relay the updated information from CU-UP after a source satellite to POP to target satellite delay.

Another Layer 2 function is facilitating link adaptation and power control. In the forward direction, the most efficient modulation and coding scheme (MCS) can be selected to meet the desired target FER of $10^{-3}$ for a first transmission. The MCS selection can be based on user terminal-reported forward-link channel quality. Also, link adaptation can be used when selecting aggregation level of downlink control signaling (e.g., as needed for uplink and downlink grants). In the return direction, a combination of uplink power control and MCS selection can be used to maximize user channel efficiency and meet desired target FER, while ensuring compliance with regulatory requirements associated with transmit power per Hz.

Embodiments of the user-link air interface power control can include an open-loop and a closed-loop component. The open-loop power control ensures a desired initial power level at initial access and during handover time. Based on the forward signal level, the UT adjusts its initial transmit power to be received at the satellite with a desired nominal level. System information provides satellite transmit power and the desired target nominal level for the UT's power level determination. The closed-loop power control adjusts UT transmit power level based on filtered received SINR and the desired operating point.

RRC Layer

Embodiments described herein can use RRC as the layer-3 control plane protocol between the SRAN and the user terminal (UT). The RRC layer can be implemented based on the 3GPP 5G NR RRC protocol but customized for the unique aspects of the architecture described herein. The RRC can be part of the control plane protocol stack illustrated in FIG. 3.

Embodiments of the RRC provide several features. One such feature of the RRC is customized system information broadcast. For example, embodiments of the RRC include a specially designed broadcast mechanism to efficiently conveys constellation ephemeris to UTs to facilitate quick initial acquisition of the constellation and accurate delay and Doppler compensation. Another feature of the RRC is latency-optimized connection establishment, maintenance, re-establishment, recovery, and release. For example, RRC signaling procedures can support piggy backed NAS layer signaling to minimize signaling latencies. Another feature of the RRC is configuration of various user plane protocol layers (PHY, MAC, RLC, PDCP, SDAP).

Another feature of the RRC is enhanced security and integrity protection for signaling and user data. For example, the RRC protocol is ciphered and integrity-protected end-to-end (between UT and SRAN). This can be implemented over and above independent end-to-end encryption of 5GC signaling carried over RRC connections. Integrity protection and ciphering can be provided by the PDCP layer for signaling radio bearers (SRBs) just as for data radio bearers (DRBs). Embodiments of the RRC can manage ciphering and integrity keys for signaling and data bearers in coordination with the 5GC core network, thus avoiding reliance on additional dedicated key provisioning in the SRAN. Security associations can be established automatically at connection setup and maintained across handovers and connection reestablishment.

Figure 23:
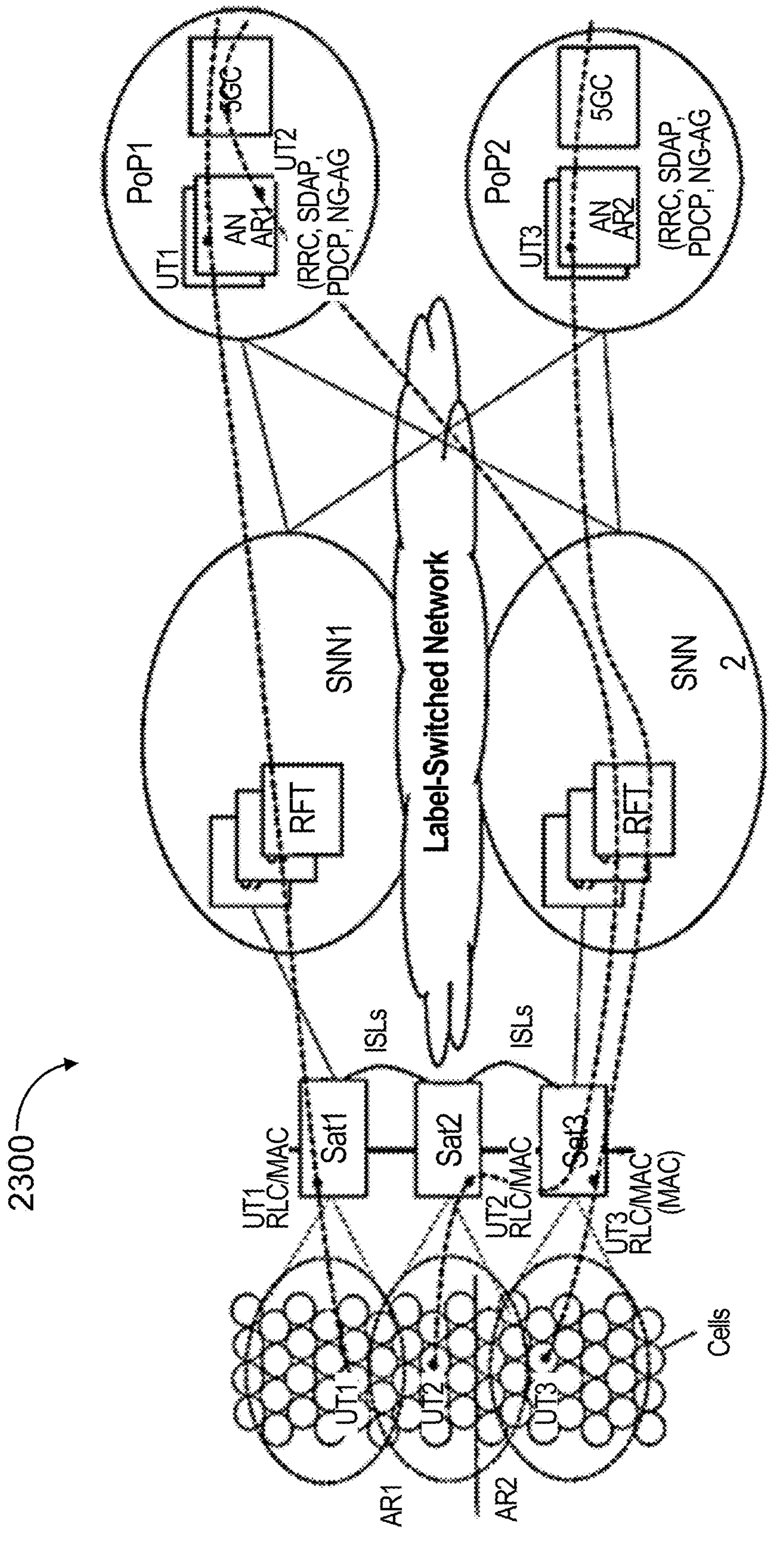
FIG. 23 shows an architecture including example data bearer paths and example locations of protocol entities.

Another feature of the RRC is establishment, modification, and release of signaling and data bearers. For example, embodiments of the RRC support the configuration of data radio bearers (DRBs) corresponding to PDU sessions using QoS parameters signaled by the 5GC. The RRC can configure the PDCP, RLC and MAC layers, accordingly, to support the corresponding flows. As described herein, embodiments of network architectures use a novel approach to dynamic label-switched routing infrastructure between the SRAN and the satellites (described below), which are connected through a constantly changing set of feeder links and ISLs (e.g., optical inter-satellite links, OISLs). When setting up data bearers, the RRC can also configure the appropriate label stack in the endpoints to ensure that the correct QOS-specific label-switched paths get used for each bearer. For example, FIG. 23 shows an architecture 2300 including example data bearer paths and example locations of protocol entities.

Another feature of the RRC is establishment of UT-UT sessions. For example, embodiments of the RRC provide special support for data bearers to support UT-UT communication. After registration and authentication with the 5GC, UT-UT sessions are set up like regular PDU sessions, but the SRAN then configures the UTs and satellite payloads to map these bearers to label switched paths that do not transit any GNs or the 5GC. The SRAN can provide the UT with necessary routing information identifying the current serving satellite and cell of the peer UT. The receiving satellite can then map this to the corresponding satellite-satellite label-switched path (LSP), which has previously been set up by the GRM's routing table updates. When the serving satellite of either peer UT changes, the SRAN updates the UT-UT routing information through RRC-level handover procedures. For UT-UT Lawful interception, the PDU data is routed to the SRAN also.

Figure 24:
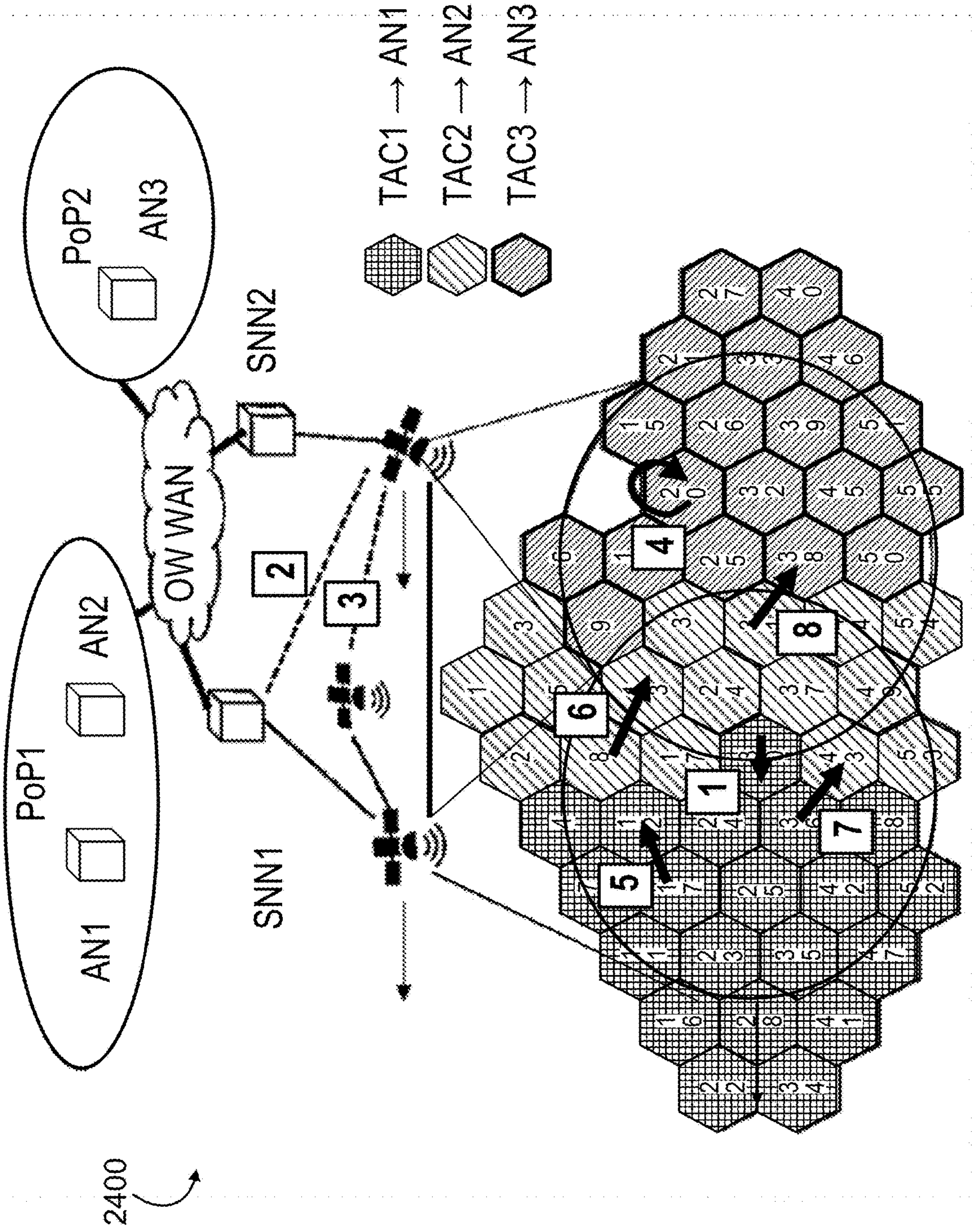
FIG. 24 illustrated a communication network environment in which several types of mobility scenarios can occur.

Another feature of the RRC is maintaining connection continuity constellation movement and UT movement using customized mobility procedures to achieve fast, efficient, and seamless handovers. FIG. 24 illustrated a communication network environment 2400 in which several types of mobility scenarios can occur. The scenarios are numbered 1-8 in approximate decreasing frequency of occurrence. As illustrated, a constellation of LEO satellites is moving in a leftward direction relative to the drawing page. UTs are distributed over a large number of cells, and the cells are assigned to three terminal area codes (illustrated as TAC1, TAC2, and TAC3). The satellites are illuminating two beams that cover the three TACs, thereby effectively forming three coverage areas: one corresponding to coverage only by a first beam, one corresponding to coverage only by a second beam, and one corresponding to overlapping coverage by the first and second beams.

In a first mobility scenario, "cell-wise satellite handoff" occurs in which a cell transitions between two satellites. In one implementation, such a scenario occurs for approximately 2.2 cells per second per satellite, or approximately once every 7 minutes per cell. Such a scenario can impact all UTs in a cell, as well as peer UTs (in UT-UT sessions). To address such a scenario, all UTs in a cell can be moved to the MAC scheduler in the new satellite. Scheduling can be suspended and resumed at activation time to minimize retransmissions. Peer UTs in UT-UT sessions can also be reconfigured.

In a second mobility scenario, a "feeder-link route change" occurs in which a serving satellite transitions between SNNs or there is a scheduled contact change. Such a scenario can impact all UTs served by a satellite. To address such a scenario, RLC/MAC contexts can remain in a same satellite, and only labels/routes can get updated. UTs need not be aware of the change.

In a third mobility scenario, an "ISL route change" occurs in which satellites move out of each other's fields of view, or there is a scheduled ISL contact change. Such a scenario can impact all UTs of at least some cells served by a satellite. To address such a scenario, RLC/MAC contexts can remain in a same satellite, and only labels/routes can get updated. UTs need not be aware of the change.

In a fourth mobility scenario, a "cell-wise frequency handoff" occurs in which frequency slot assignments of one or more cells change. Such a scenario can impact all UTs of a cell. To address such a scenario, there may be no context movement, but the UT, PHY and MAC may be reconfigured to use the new frequency-slot.

In a fifth mobility scenario, a "cell-slot handoff" occurs in which a UT moves between cells in the same TAC serviced by a same satellite. Such a scenario can impact specific UTs and any peer UTs (in UT-UT sessions). To address such a scenario, MAC context may be recreated and/or reconfigured in the same satellite. Peer UTs in UT-UT sessions may also be reconfigured.

In a sixth mobility scenario, a "UT-wise satellite handoff" occurs in which a UT moves between cells in the same TAC but serviced by a different satellite. This is similar to the cell-wise satellite handoff described above, but may only affect one UT. Such a scenario can impact specific UTs and any peer UTs (in UT-UT sessions). To address such a scenario, the RLC/MAC context may be moved to the new satellite, and peer UTs in UT-UT sessions may also be reconfigured.

In a seventh mobility scenario, an "anchor node handoff" occurs in which a UT moves between cells to a different TAC serviced by a different anchor node in a same POP. Such a scenario can impact specific UTs and any peer UTs (in UT-UT sessions). To address such a scenario, a standard 5G handover can be performed via Xn or N2 to a different AN in the same POP. The AMF and UPF can remain the same.

In an eighth mobility scenario, a "POP handoff" occurs in which a UT moves between cells to a different TAC serviced by a different anchor node in a different POP. Such a scenario can impact specific UTs and any peer UTs (in UT-UT sessions). To address such a scenario, a standard 5G handover can be performed via Xn or N2 to a different AN in a different POP. Potentially, the AMF and/or UPF may also be moved.

The first four mobility scenarios described above are conditions occurring due to natural dynamics of the LEO satellite constellation. In all these cases, reconfiguration can be handled in a manner completely transparent to the core network (e.g., the 5GC), without invoking any core network mobility procedures. For example, in the first mobility scenario above, the cells at the edge of the satellite footprint transition from the region of responsibility of one satellite to that of a neighbor satellite due to the movement of the footprint (e.g., at approximately 6 km/sec). On the average, 2.2 cells per second transition between satellites in this way, requiring all the UTs in each such cell to be handed over to the next satellite. The exact time of the satellite handover is known well in advance from the GRM, so the AN preconfigures the target satellite to serve the cell ahead of time using standard Inter-gNB-DU mobility procedures and updating necessary routing information in the satellites. The only interruption in service may occur during the UT's repointing, retuning, and acquisition of the new satellite (which may typically take much less than 20 ms). For UT-UT sessions, the peer UTs are informed of the change of the destination satellite.

The second and third mobility scenarios above may only reconfigure transit routing links between the UTs' serving satellite and the SRAN. UTs may not be affected by the reconfiguration, which takes place by updating routing tables in the satellites. The fourth mobility scenario above occurs due to a planned reconfiguration of cell-slots. As this is pre-planned, the new configuration can be conveyed to the UTs in the cell in advance, similar to the procedures used in the first mobility scenario. There may be no movement of UT contexts between nodes, and the only interruption in service may occur during the UT physical layer reconfiguration and acquisition of the new frequency-slot (which, again, may typically take much less than 20 ms).

While the first four mobility scenarios described above are due to constellation dynamics, the remaining four (i.e., the fifth through eighth mobility scenarios) occur due to movement of mobile UTs between cells. When a UT moves into a different cell, it signals the SRAN, which then triggers a specific handover procedure depending on the applicable mobility case. Among these UT-related mobility events, the most frequent is likely to be the fifth scenario, in which a UT moves into its neighboring cell, and the new cell is served by the same satellite and is part of the same tracking area (i.e., the same group of cells served by the same logical gNB). In this case, the anchor node AN (e.g., the logical gNB) performs the reconfiguration using RAN-level RRC procedures and without involving the core network.

The sixth mobility scenario is similar to the fifth, with the only difference being that the serving satellite changes. The RRC reconfiguration procedures are also similar. In both scenarios, the anchor node remains the same, such that the data traffic forwarding point in the core network and the SRAN is not changed. The only interruption in service is during the UT repointing to the new satellite (in the sixth scenario), physical layer reconfiguration, and acquisition of the new frequency-slot. User mobility between cells may invoke standard handover procedures (e.g., as defined in 5G standards), if the user moves between areas served by different anchor nodes and/or PoPs. Scenarios 7 and 8 are examples of such scenarios, where handover procedures, such as those described in 3GPP TS 23.502 Sec. 4.9.1 can be used to relocate the UT context to a different anchor node. In these cases, the UT does need to use a RACH procedure to access the new cell, but the interruption is minimized by the use of non-contention RACH opportunities.

Another feature of the RRC is UT location reporting. Whether a UT is camped on a CFS (frequency-slot in a cell) in idle state or is connected to the network, it is aware of the current cell in which it is located due to system information it receives in the CFS. A moving UT reports its current location (minimally, its cell location) to the SRAN through RRC procedures periodically and/or based on a movement threshold criterion. UTs may not be required to report their exact coordinates to the network for mobility management procedures. The air interface may allow for optional reporting of terminal GPS coordinates. When the UT is in idle mode, the SRAN can track its current cell location to contact it later using RAN-based paging (e.g., the "efficient paging" below). When the UT is in connected mode, the reported cell location can be used by the SRAN to trigger the appropriate handover procedure.

Another feature of the RRC is efficient paging at the cell level and support for data transfer between UT and the network via an external GEO system. Paging in the network can be implemented efficiently due to several features that provide for targeted paging of UTs in the cell or cells in which the UT is likely to be found. The SRAN can track the UT's cell location by means of location reports. Based on configurable inactivity criteria, the SRAN can suspend the UT's RRC connection and move the UT to an RRC inactive state in the SRAN while it remains CM-Connected in the AMF. In this state, the SRAN still maintains the UT's RRC context and can resume it through RAN-based paging when a trigger from the core network is received, as long as it remains within a group of cells served by the same anchor node (e.g., in the same TAC). This can be more efficient than core network-based paging (e.g., as defined in 5G specifications) at least because the UT is paged at the cell level, which tends to use fewer resources.

In RAN-based Paging, the SRAN can implement paging dilation. This can involve paging only in the target cell or TAC initially; in the event that no response is received, the paging can be expanded to additional surrounding cells. When a UT's RRC context is released, it enters an RRC idle state. In this state, the UT reports its current TAC to the core network, and paging can be handled by the core network, typically at the TAC level (i.e., in all the cells of the tracking area). However, even in core network-based paging, the SRAN supports optimized cell-level paging based on optional 5G-defined paging assistance information, such as paging attempt information and recommended cells and RAN nodes for paging, such as described in 3GPP TS 38.300. If the AMF supports paging assistance information, the SRAN can use that feature to implement targeted cell-level paging.

System Acquisition

Embodiments of unique network architectures are described herein. Assuming that a user terminal (UT) is a fixed UT, the UT may go through the following steps to access these network architectures. As a first step, the UT may acquire time and frequency reference and location information. This can involve obtaining GNSS synchronization and getting a 3D fix on location. The time may vary depending on GNSS receiver status and capabilities. As a second step, the UT may acquire antenna tilt and true north offset. For example, antenna tilt may be determined either from an internal sensor or from measured tilt data entered at installation. Antenna true north offset may be determined from internal sensors, heading data entered at installation, or from an antenna calibration procedure executed after acquiring the constellation. In the case of a post-acquisition calibration procedure, the process of acquiring the constellation could take considerably longer due to the heading uncertainty.

As a third step, the UT may acquire the forward link on a LEO satellite of the satellite constellation. For example, the UT executes a search sequence in a multi-dimensional search space (space, time, frequency, polarization) until a satellite forward link signal is identified. This can be performed with no stored ephemerides ("cold start") or with valid, loaded, or previously stored ephemerides ("warm start"). As a fourth step, the UT may acquire updated system broadcast information. If ephemeris for the initially acquired satellite is not available, the UT can track the satellite using signal strength or SNR during system information acquisition. The UT can acquire required system information, including updated constellation ephemerides, frequency plan, local and neighbor cell and satellite information, uplink and downlink parameters, synchronization parameters, etc. As a fifth step, the UT can select a cell for system access and complete the connection, authentication, registration, and bearer establishment process.

As noted with reference to the third step, the UT can be started up with no stored ephemerides ("cold start") or with valid, loaded, or previously stored ephemerides ("warm start"). In a cold start initial startup condition, it is estimated that GNSS acquisition and Time to First Fix (TTFF) involves approximately two minutes until the local oscillator disciplined and approximately ten minutes for GNSS lock to continue in parallel with forward link acquisition. The forward link acquisition can take approximately six minutes per full scan, which can involve: a spatial scan of 72 spatial hypotheses at 5° spacing azimuth and fixed 30° elevation, 8 frequency×2 polarization hypotheses, 300 ms beam hopping acquisition cycle time, and one acquisition beam hopping cycle per hypothesis. Additionally, it can take less than one second for acquiring system information and for network connection, authentication, and registration with the CN (e.g., including bearer setup, etc.). Because the target satellite is moving while the scanning process is ongoing, a full spatial scan might not result in a hit. Multiple cycles of full scans may be needed until a satellite is acquired.

In comparison, in a warm start initial startup condition, it is estimated that GNSS acquisition and Time to First Fix (TTFF) takes only approximately two seconds. The forward link acquisition (with no heading uncertainty) can take approximately five seconds with a 300 ms beam hopping acquisition cycle time and one acquisition beam hopping cycle per hypothesis. As in the cold start condition, it can take less than one second for acquiring system information and for network connection, authentication, and registration with the CN (e.g., including bearer setup, etc.). If needed (e.g., if heading uncertainty exists), antenna true north offset calibration can take minutes (up to tens of minutes), but this can be performed in the background while service is available. Based on the above, warm start should complete in approximately 3-5 seconds with no azimuth uncertainty, and in less than 30 seconds if azimuth searching is needed.

Routing Framework

Embodiments described herein use a novel dynamic label-switched routing infrastructure between the SRAN and the satellites (e.g., the LEO constellation), which are connected through a constantly changing set of feeder links and ISLs (e.g., OISLs). The label-switched routing layer can provide efficient and seamless connectivity between protocol entities in the satellite payload and those in the SRAN. The routing layer is used to carry both user plane and control plane protocols, as illustrated in FIGS. 2 and 3.

Figure 25:
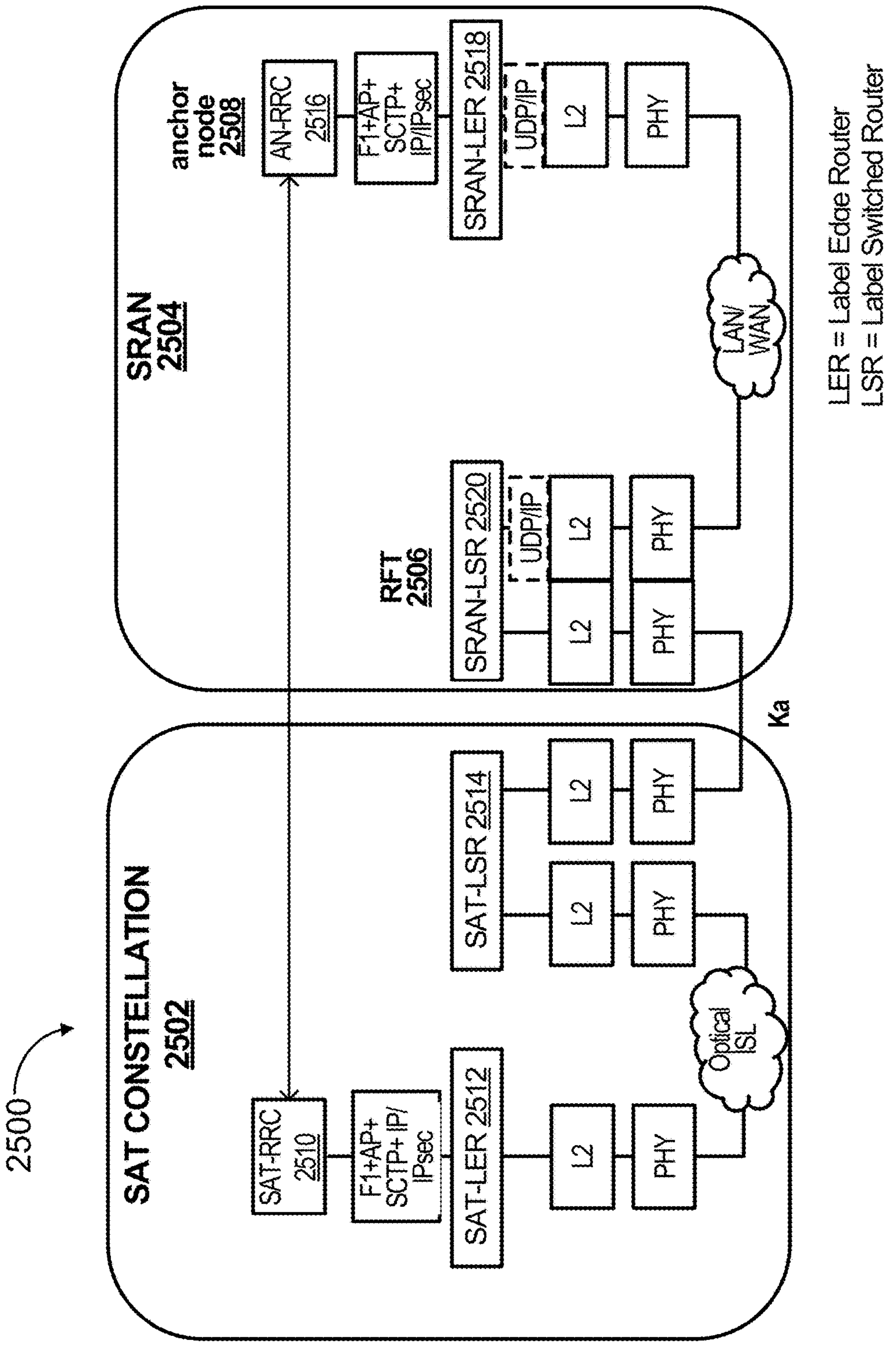
FIG. 25 shows an illustrative protocol stack that uses the routing layer in the CU-DU control plane communication path, in accordance with the label-switched routing infrastructure described herein.

FIG. 25 shows an illustrative protocol stack 2500 that uses the routing layer in the CU-DU control plane communication path, in accordance with the label-switched routing infrastructure described herein. As illustrated, the protocol stack 2500 exists in the context of a satellite constellation 2502, such as the LEO constellations described herein, and a SRAN 2504, such as the SRANs described herein. The SRAN 2504 includes at least a RFT 2506 and an anchor node 2508 (illustrated as an anchor node, AN), such as described with reference to FIGS. 10 and 11. As illustrated, the protocol stack 2500 can include (e.g., in order from top to bottom) an RRC layer, an interface layer, a label-based routing layer, an L2 layer, and a PHY layer.

Features of embodiments of the RRC layer, interface layer, L2 layer, and PHY layer are described above. A satellite-side RRC (SAT-RRC) 2510 and an anchor-router-layer-side RRC (AN-RRC) 2516, both in the RRC layer, can be considered as end points of communications between the satellite constellation 2502 and the SRAN 2504. SAT-RRCs 2510 and AN-RRCs 2516 are connected to corresponding sides of label-switched paths (LSPs) via respective instances of interfaces (i.e., the interface layer), including respective F1 access point, SCTP, IP/IPsec, and/or other interfaces. The LSPs are effectively interconnections of a label-switched routing "cloud" that interconnect the satellites of the satellite constellation 2502 with the SRAN 2504 nodes.

LSPs can act as virtual circuits that connect one node in the label-switched routing cloud with another. The endpoints of the LSPs are label edge routers (LERs) and the intermediate nodes through which an LSP passes are transit label-switched routers (LSRs). As illustrated, there can be a satellite-side LER (SAT-LER) 2512, a satellite-side LSR (SAT-LSR) 2514, a SRAN-side LER (SRAN-LER) 2518, and a SRAN-side LSR (SRAN-LSR) 2520. In some embodiments, the SRAN-LER 2518 is in the anchor node 2508, and the SRAN-LSR is in the RFT 2506.

Referring back to FIG. 2, an LSP is shown interconnecting the satellite constellation 204 and the SRAN 206. The user plane data in a GTP-U tunnel associated with a specific UT can be routed over the LSP between the anchor node 206-2 endpoint (e.g., the CU-UP node in the 5G RAN context) and the satellite payload processor containing the RLC-MAC contexts (e.g., the DU node in the 5G RAN context) for the UT. Similarly, referring back to FIG. 3, an LSP is shown interconnecting the satellite constellation 304 and the SRAN 306. End-to-end control plane messages associated with a specific UT can be routed over the LSP between the anchor node 306-2 endpoint (e.g. the CU-CP node in the 5G RAN context) and the satellite payload processor. The messages can be carried as PDCP PDUs within F1-AP DL/UL RRC Message Transfer messages.

Returning to FIG. 25, the AN-RRC 2516 also communicates with a corresponding cell-specific RRC control function in the payload (implemented by SAT-RRC 2510) using an LSP. The CU-CP uses this path to configure UT contexts in the DU and to transfer UT contexts between DUs, among other things.

As illustrated (and further in FIGS. 2 and 3), the routing layer has a data plane and a control plane component. Embodiments of the data plane component function can be based on Multiprotocol Label Switching (MPLS). Label-based routing, such as MPLS, differs from other type of routing (e.g., conventional IP routing) in several ways. One difference is that label-based routing assigns labels to data packets at the entry point of the routing (e.g., the label-switched routing cloud). The labels contain information that dictates the packet's path through the network. Aspects of this routing for particular contexts are described with reference to FIG. 6. Another difference is that, instead of making routing decisions at each hop based on the packet's destination IP address, label-based routers use the labels to determine the packet's path (the label indicates which outbound link to use for forwarding the packet). Such a label-based routing approach can tend to be faster and more efficient than conventional IP routing approaches at least because the simple lookup of the label avoids complex routing table lookups at each hop. The use of labels can also tend to ensure more predictable network paths (LSPs) through the label-switched routing cloud.

In embodiments described herein, the label-based routing is implemented with particular features. For example, embodiments perform label-based routing of data packets received on an input interface based on a label stack in the header of each packet. Each label in the label stack identifies a next hop node to which to route the packet. When an LSR is reached (e.g., a SAT-LSR 2514 or a SRAN-LSR 2520), the LSR can pop the topmost label in the stack and route the packet to the neighbor node identified by the popped label. The label may also contain additional information that helps the LSR direct the packet to the correct link or queue. The LSR maintains a neighbor link table that identifies the link to use for each neighbor.

Occasionally, the LSR may need to take additional actions, such as rerouting around a failed link, or load balancing across a set of aggregated interfaces. The ingress LER performs the label attachment function. Label attachment consists of adding a stack of labels associated with the LSP to be used based on at least the destination of the packet. In some implementations, the labels are based further on the type of traffic (e.g., different traffic types are routed through the label-switched routing cloud via different LSPs). The LER can maintain an LSP routing table that identifies the traffic type, destination, and label stack to be used for each LSP. The egress LER can pop the last label in the stack and pass the packet up to the IP layer, which delivers the packet to the client application based on transport layer headers (e.g., UDP, SCTP).

The control plane component of the routing layer is responsible for maintaining the LSP routing tables used by the LERs and the neighbor link tables used by the LSRs. Unlike in conventional label-based approaches, the calculation of label-switched routes in embodiments herein is performed by the global resource manager (GRM) (e.g., by a route determination function (RDF)), which is a centrally located entity. Each node involved in implementing the routing layer has a resource management entity that interfaces with the GRM to maintain the necessary control information.

Figure 26:
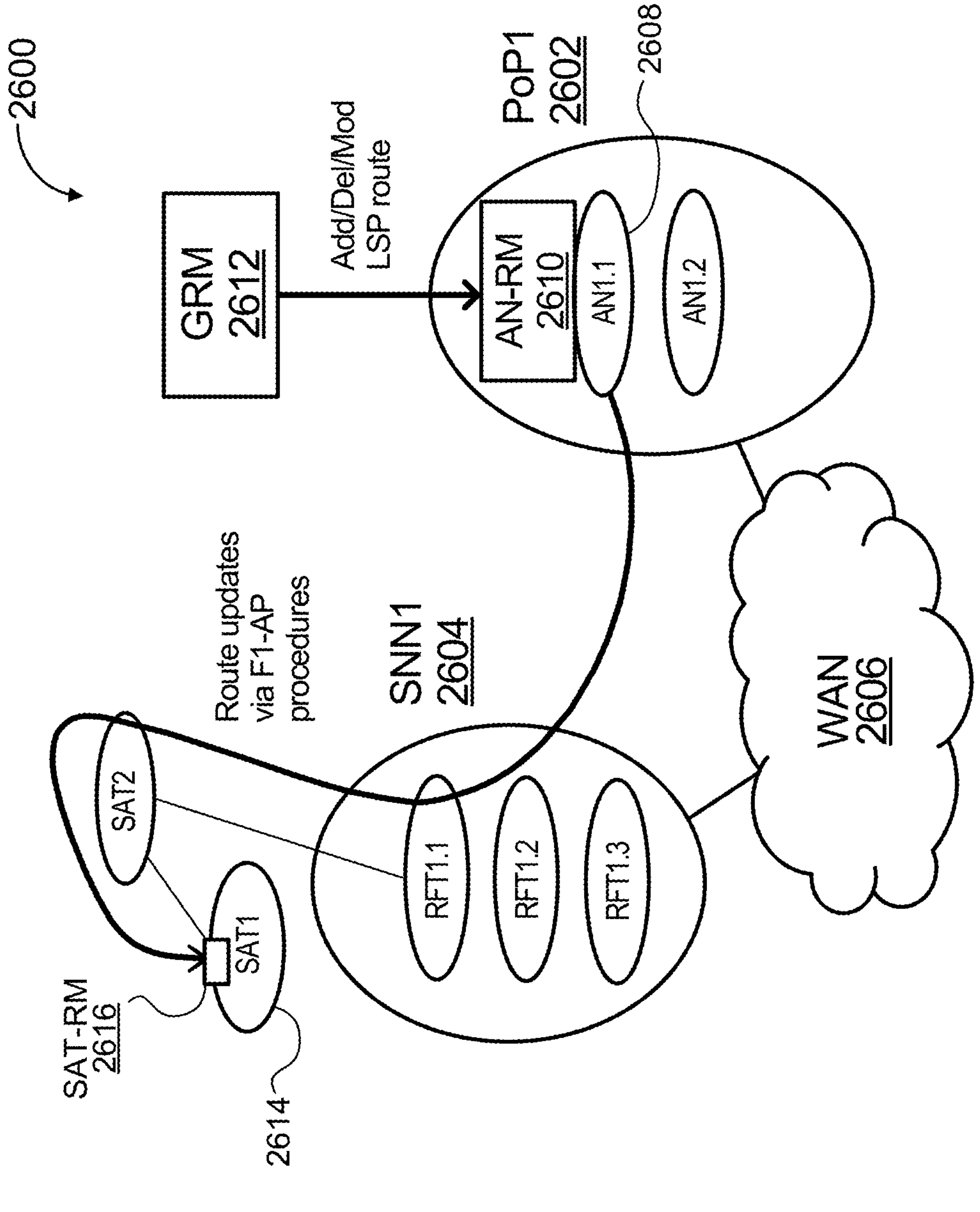
FIG. 26 shows a simplified partial routing architecture demonstrating that the GRM configures LSPs and routes into the corresponding endpoint anchor node of each LSP.

FIG. 26 shows a simplified partial routing architecture 2600 demonstrating that the GRM configures LSPs and routes into the corresponding endpoint anchor node of each LSP. The architecture 2600 is shown as including a POP 2602 (POP1) and a SNN site 2604 (SNN1) connected by a WAN 2606. The POP 2602 includes instances of anchor nodes 2608 (e.g., AN1.1, AN1.2). Each anchor node 2608 instance has a corresponding anchor node resource manager (AN-RM) function 2610 that interfaces with the GRM 2612 (e.g., an RDF function). The GRM 2612 configures LSPs and routes into the corresponding endpoint anchor router 2608 of each LSP.

The AN-RM function 2612 takes care of updating the LSP routes in a satellite-side resource manager (SAT-RM) function 2616 located in the satellite 2614 endpoints. This communication occurs through the routing layer infrastructure using the F1-C interface between the CU and DU (e.g., gNB-CU Configuration Update and UE Context Modification for cell-level and UT-specific routes, respectively). SNN sites 2604 do not need to maintain LSP route tables because they act solely as transit nodes.

Figure 27:
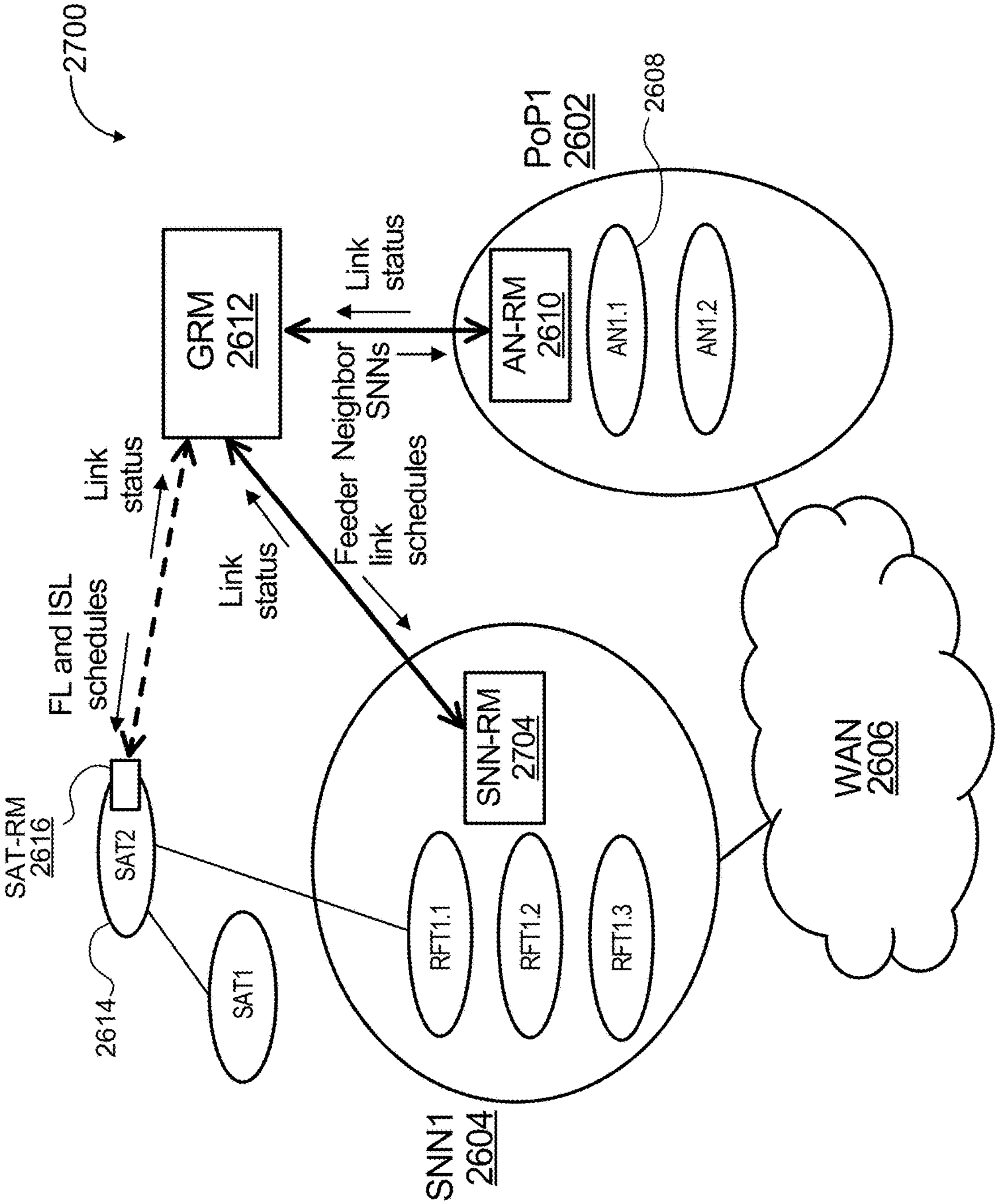
FIG. 27 shows another simplified partial routing architecture demonstrating that the GRM can be responsible for configuring and maintaining backhaul links.

FIG. 27 shows another simplified partial routing architecture 2700 demonstrating that the GRM 2612 can be responsible for configuring and maintaining backhaul links. Embodiments of the GRM 2612 configure the SNN sites 2604 with the schedule of feeder link contacts via direct communication with an SNN resource manager (SNN-RM) 2704 using the WAN infrastructure 2606. In turn, the SNN-RM 2704 can update the GRM 2612 with feeder link and RFT status changes that may impact backhaul topology.

Embodiments of the GRM 2612 configure the SAT-RM 2616 in each satellite payload processor with the schedules of feeder link and ISL contacts using the TT&C infrastructure via the SOC. In turn, the SAT-RM 2616 updates the GRM 2612 with ISL status changes that may impact backhaul topology. The GRM 2612 configures the anchor nodes 2608 with neighbor SNN site 2604 relationships, and the AN-RMs 2610 update the GRM 2612 with status changes of anchor node 2608 nodes or anchor node-to-SNN links that might impact backhaul topology. In response to the status updates, the GRM can recompute affected routes and update the associated endpoint anchor nodes 2608 with the new routes.

Figure 28:
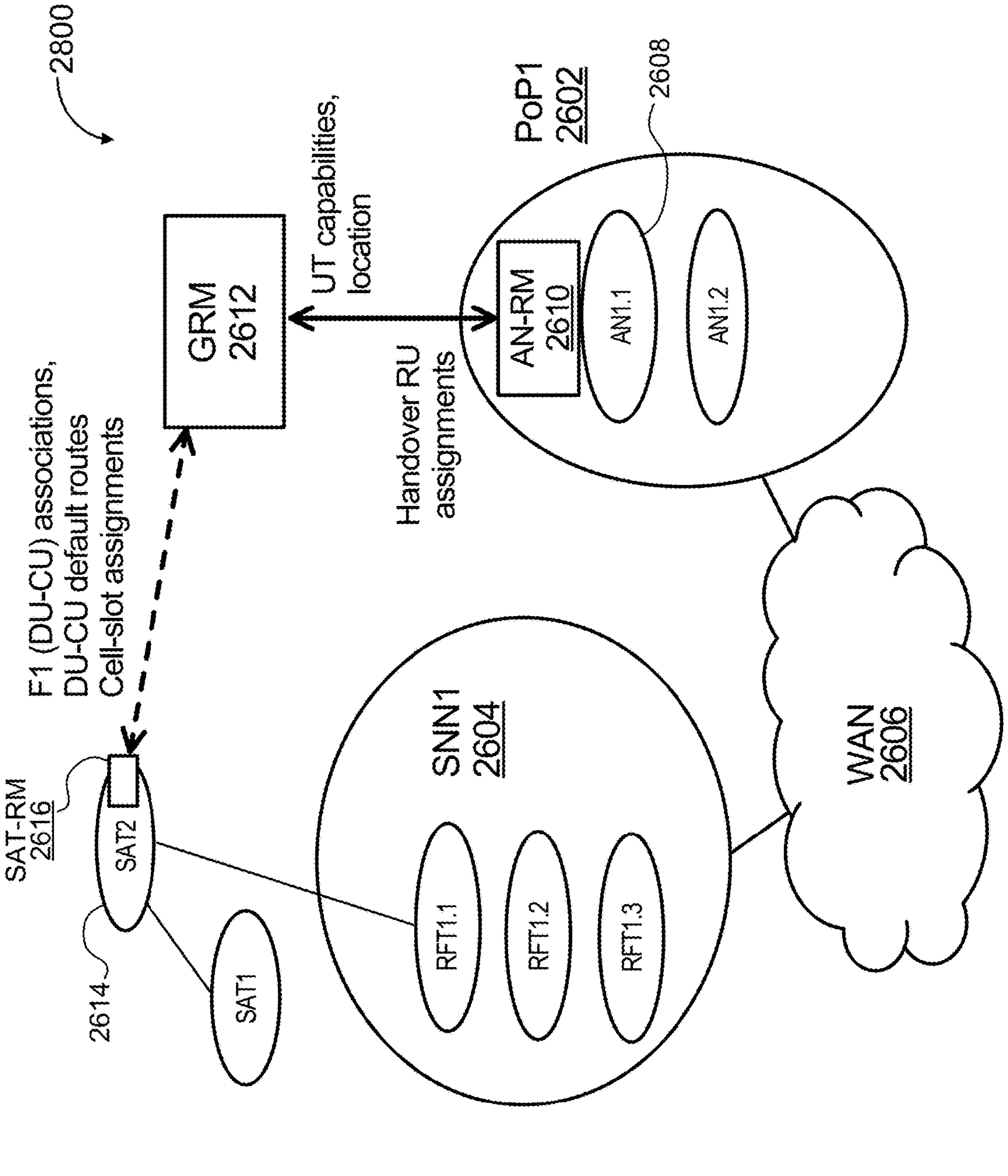
FIG. 28 shows another simplified partial routing architecture demonstrating that the GRM can be responsible for configuring cell- and user-level associations that are dependent on changing backhaul topology.

FIG. 28 shows another simplified partial routing architecture 2800 demonstrating that the GRM 2612 can be responsible for configuring cell- and user-level associations that are dependent on changing backhaul topology. Similar to FIG. 26, the architecture 2800 is shown as including a POP 2602 (POP1) and a SNN site 2604 (SNN1) connected by a WAN 2606. The POP 2602 includes instances of anchor nodes 2608 (e.g., AN1.1, AN1.2). Each anchor node 2608 instance has a corresponding anchor node resource manager (AN-RM) function 2610 that interfaces with the GRM 2612 (e.g., a user routing area function). The GRM 2612 is responsible for interfacing with the SAT-RM 2616 and AN-RM 2610 functions to configure cell- and user-level associations that are dependent on changing backhaul topology. In particular, the GRM 2612 configures DU-CU associations in the satellite payload. This can involve configuring DU instances associated with a CU (e.g., the anchor node 2608 instance) in the payload processor of a satellite, and establishing the F1 connection between DU and CU before any cells anchored by that CU can begin to be served by that satellite. The DU-CU configuration also includes the route to be used to initiate F1 connection establishment.

Some conventional label-based routing approaches (e.g., conventional MPLS) create routes based on IGP routing information and status updates from routers and distributed via a label distribution protocol. In embodiments described herein, the routing is both mostly deterministic and highly dynamic, which calls for a very different route generation and distribution approach. In embodiments described herein, the GRM 2612 (see FIG. 26) creates LSP routes based on known types of inter-node communications relied on by the air interface. For example, default LSP routes are required on a per-cell basis to support bidirectional traffic between the payload processor in the satellite responsible for each cell (DU instance) and the associated anchor node (CU instance). These LSP routes are used by default for UT-associated data and control traffic (F1-U and F1-C) as well as for CU-DU control and configuration. In some implementations, the GRM configures default cell-level LSP routes in the payload processor while configuring the DU parameters to bootstrap CU-DU connection establishment.

In some embodiments, the GRM 2612 can also create UT- and VC-specific LSP routes for virtual connections (VCs) with non-default routing policies. The GRM 2612 can configure these ahead of time in the anchor node responsible for the corresponding subscribers so that they are available to be used when those PDU sessions are activated. This can involve identifying subscribers and PDU sessions that are accessible to both the SRAN and the GRM. Normally, subscriber permanent identities may not be known to the 5G RAN by design due to privacy considerations. Embodiments of the GRM 2612 may need to create on-demand LSP routes when UTs register for UT-UT communication. If the identities of the UTs are known beforehand, these routes can be created ahead of time. For example, multiple LSP routes may be needed between the same pair of endpoints to support different classes of traffic (e.g., delay-sensitive vs. bulk); the GRM 2612 can use different metrics to compute optimal routes for the LSPs of the different traffic classes (e.g., latency vs. capacity).

Embodiments of the GRM 2612 determine label-switched routes for the LSPs primarily based on the schedules of feeder link contacts and ISL contacts generated by the GRM 2612 (see FIG. 27). Notably, in embodiments described herein, routes in the routing table are time-restricted because all of the links are temporary. Thus, the routes for any LSP are necessarily changing over time, and the LSP routing table contains both current and future routes for the same LSP. The GRM 2612 can update the anchor nodes with route changes ahead of time and the AN-RM 2610 (see FIGS.

26-28) can propagate the route updates to the corresponding SAT-RM 2616 (see FIGS. 26-28) endpoints via F1-AP procedures. SNN nodes do not need to be updated with route changes.

Figure 29:
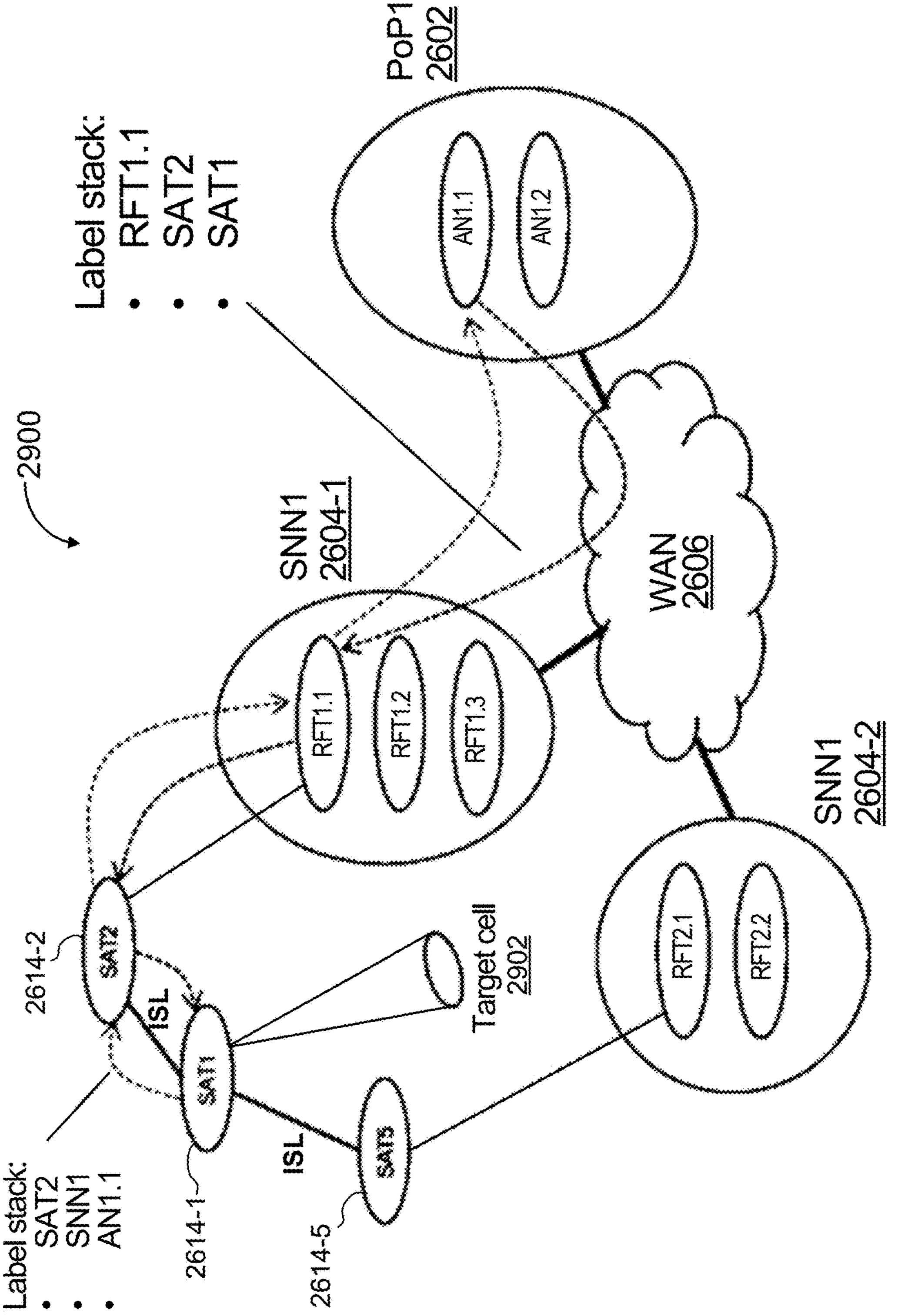
FIG. 29 shows another simplified partial routing architecture as context for a packet-based routing example for UT-POP sessions.

For added clarity, several examples are described, according to the novel packet-based routing approach herein. FIG. 29 shows another simplified partial routing architecture 2900 as context for a packet-based routing example for UT-POP sessions. Similar to FIGS. 26-28, the architecture 2900 is shown as including a POP 2602 (POP1) and SNN sites 2604 (SNN1 2604-1 and SNN2 2604-2) connected by a WAN 2606. The POP 2602 includes instances of anchor nodes (e.g., AN1.1, AN1.2). The resource manager functions and GRM are not explicitly shown. The SNN sites 2604 are in communication with satellites 2614 (SAT1 2614-1, SAT2 2614-2, SAT5 2614-5) of a satellite constellation. In particular, one of the RFTs in SNN1 2604-1 (RFT1.1) is in communication with SAT2 2614-2, one of the RFTs in SNN2 2604-2 (RFT2.1) is in communication with SAT5 2614-5, SAT2 2614-2 and SAT5 2614-5 are in communication with each other via SAT1 2614-1 (i.e., via ISLs), and SAT1 2614-1 is illuminating a target cell 2902. It is assumed that the satellites 2614 are LEO satellites and that the satellites 2614.

The illustrated example uses UT-POP traffic for a UT located in a cell (target cell 2902) that is anchored at AN1.1 in PoP1 2602 and is currently being served by satellite SAT1 2614-1. In the forward direction, SAT1 2614-1 receives a message from the UT and constructs the corresponding F1-U (or F1-AP) message, adding a routing header containing the label stack. This can be a PDU session-specific, UT-specific, or cell-default route. The illustrated route is {SAT2, SNN1, AN1.1}. The DU in a satellite receives the default DU-CU route label stack as part of DU-CU association configuration or a cell-level configuration update from the CU. This is the default route label stack used for UT-AN communication.

UT-specific or PDU session-specific routes can be configured in the DU via a F1-AP UE context update procedure. For example, SAT1 2614-1 looks up the ISL link for SAT2 2614-2 and forwards the packet to SAT2 2614-2. SAT2 2614-2 pops the top label, such that the remaining stack is {SNN1, AN1.1}. Accordingly, SAT2 2614-2 finds that the next hop is SNN1. It can look up the present feeder link to SNN1 and can forward the packet to SNN1. As illustrated, the present feeder link between SNN1 2604-1 and SAT2 2614-2 at the time of the transaction is RFT1.1, so that RFT1.1 effectively becomes the next hop. A load-balancing index in the label can be used to select a feeder link channel. RFT1.1 in SNN1 2604-1 pops the top label, such that the remaining stack is {AN1.1}. Accordingly, RFT1.1 finds the next hop is AN1.1 in POP1 2602. It looks up the transport address of AN1.1 and forwards the packet to it. If this is a user data packet, the load-balancing index in the label can identify the specific CU-UP instance. AN1.1 (CU-CP or CU-UP instance) can pop the top label, such that the remaining stack is { } (i.e., empty, or null). Accordingly, AN1.1 can know that this is the end node. It can remove the routing header and passe the packet to upper layers.

For traffic in the reverse direction, AN1.1 (CU-CP or CU-UP instance) has the label stack for this cell/UT/PDU session in the corresponding UT context. This has been obtained previously from GRM 2612. The label stack to be used in this case is {SNN1, SAT2, SAT1}. Based on current knowledge of the current RFT-satellite assignments shared by the SNN with the POPs, the anchor node can update this to {RFT1.1, SAT2, SAT1}. AN1.1 can construct a corresponding F1-U or F1-AP message with the routing header and send it to RFT1.1. RFT1.1 can pop the top label to confirm that the next hop is SAT2 2614-2 and can forward the packet to SAT2 2614-2, accordingly. A load-balancing index in the label can be used to select a feeder link channel. SAT2 2614-2 can pop the top label to find the next hop is SAT1 2614-1, can look up the ISL link for SAT1 2614-1, and can forward the packet to SAT1 2614-1 over the appropriate ISL. SAT1 2614-1 can pop the top label to find it is the end node. It can remove the routing header and pass the packet to upper layers, where the F1-U or F1-AP terminates. The upper layer handles the packet by delivering it to the UT or processing the control message locally.

Another example routing case is for UT-to-UT sessions. This routing case can be similar to the previous one, except that the route may not involve any SNNs or feeder links (i.e., only satellites and ISLs). UT-UT session routes are inherently UT-specific routes that are configured into the UE contexts of each participating UT at the corresponding DUs through F1-AP configuration update procedures once both endpoints have registered with the central UT-UT registration server. The control plane path for this signaling uses the UT-AN routing infrastructure described previously. In addition to the DU-to-DU label stack used to route the traffic for a UT-UT session, the satellite DU can also use a DU-CU label stack to route session control signaling and lawful intercept traffic.

Another example routing case is for multicast sessions. Traffic on a multicast session is unidirectional (i.e., only in the forward direction). It flows from the multicast gateway (MCG) in the core towards the POPs, and via the satellites to the UTs participating in the multicast session. The traffic is carried over multiple unicast PDU sessions up to the POP, where they are combined at the CU-UP level into a single multicast bearer per multicast session per cell. Additional features are described and illustrated with reference to FIGS. 8 and 9. The anchor node can be configured with the label stack for each multicast bearer when the bearer is set up. This can occur when the first UT in a given cell joins the multicast session. Then, the routing of multicast traffic over the satellite backhaul can work the same way as for forward link unicast traffic.

In some conventional label-based routing approaches, the routing label identifies its LSP and/or a table entry. In the label-based routing approaches described herein, the routing label identifies the next hop neighbor. Such an approach can tend to avoid large tables and to eliminate the need to update tables in transit nodes as the topology of transit links continually changes (which, as described herein, it a concern not addressed in many conventional approaches). Accordingly, the LSP can then look up a very small neighbor table. For example, the routing label is a 32-bit label with fields that contain a next-hop node type and identifier, a load-balancing hash/index, a priority and congestion indicator, and a flag to indicate the last label in the stack.

In embodiments described herein, the central GRM is tasked with tracking scheduled backhaul topology changes and updating system wide LSP routes proactively. Additionally, the GRM can handle on-demand route creation triggered by the establishment of UT-UT sessions and PDU sessions, as well as route updates due to cell transitions between satellites, UTs moving between cells, and/or UT blockage mitigation. As described herein, feeder link and ISL setups and teardowns and the transitioning of cells between satellites can occur continually, and a large number of affected LSP routes can be affected by these constant topology changes. As such, embodiments of the GRM continually update all satellites and SNNs with link schedules, and all anchor nodes with updated routes through direct interfaces to those nodes. These interfaces are described above and further as follows.

For example, embodiments of the GRM interface with the anchor nodes via a GRM-AN interface. Such an interface can be via the WAN infrastructure to each AN-CU instance and can be used to configure and update LSP routes at the cell, UT, and PDU session levels. The GRM-AN interface can also be used to obtain status and load updates on anchor nodes and AN-SNN links. The GRM-AN interface can also provide UT mobility events to the GRM that require the GRM to generate updated routes for a UT, such as blockage reports (triggering a satellite handover) and UT location updates.

Embodiments of the GRM can also interface with the SNN sites via a GRM-SNN interface. Such an interface can be via the WAN infrastructure to each SNN-RM and can be used to configure feeder link contacts. The GRM-SNN interface can also be used to obtain status and load updates on RFTs and feeder links. Embodiments of the GRM can also interface with the satellites via a GRM-SAT interface. Such an interface can be via the TT&C channel to each SAT-RM and can be used to configure ISL and feeder link contacts, cell-AN associations, and default routes. The GRM-SAT interface can also be used to obtain status and load updates on ISLs.

As described herein, initial LSP routes (e.g., all such routes) can be determined by the GRM from feeder link and ISL schedules. However, there can also be unexpected link outage and/or restoration events, and the GRM is configured to react to such events. The SAT-RM in the satellite and the SNN-RM in the SNN sites can convey link outage and restoration events to the GRM so that the GRM it can recalculate affected routes. To minimize packet loss due to failed links until the GRM can calculate and distribute new routes, embodiments can also support fast local rerouting for ISL failures. This can be done by providing each transit satellite node with a local fallback sub-route to be used in case of failure of a direct ISL link to a neighbor. An LSR that finds a failed ISL output interface can temporarily use the fallback route until the GRM provides an updated route that no longer uses the failed link.

Figure 30B:
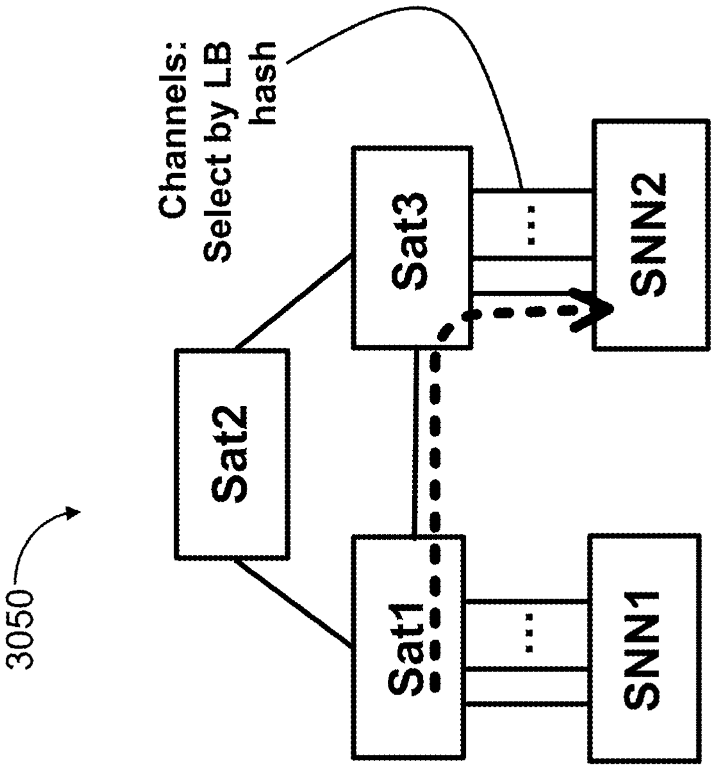
FIG. 30B shows an example routing diagram in which dynamic routing exploits multilink interfaces to handle load balancing.
Figure 30A:
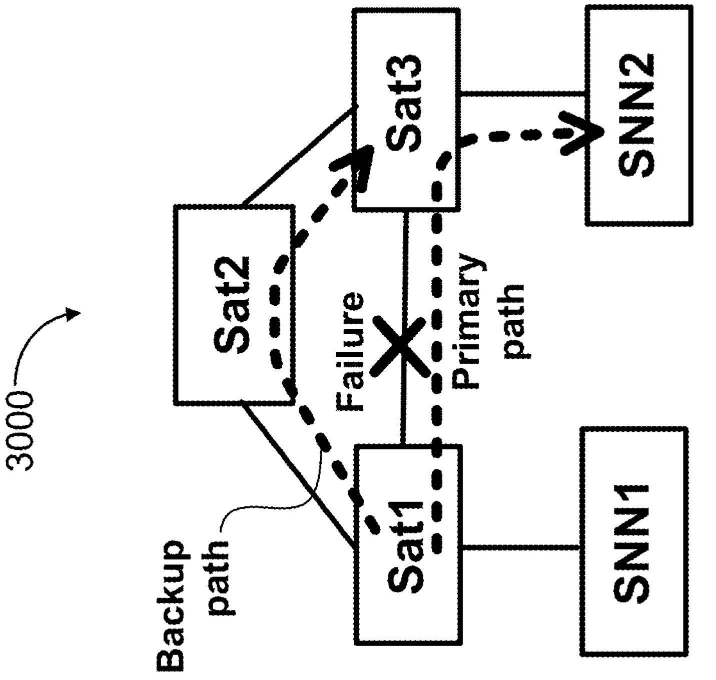
FIG. 30A shows an example routing diagram in which dynamic routing uses a fallback sub-route to respond to a link failure.

FIG. 30A shows an example routing diagram 3000 in which dynamic routing uses a fallback sub-route to respond to a link failure. As illustrated, an intended LSP route goes from SAT1 to SNN2 via SAT3. However, it is assumed that the ISL from SAT1 to SAT3 fails. Accordingly, when SAT1 sees that the next hop label points to SAT3, it can push a sub-route {SAT2, SAT3} onto the stack. SAT1 can then forward the packet to SAT2, which will pop the top label from the sub-route and forward the packet to SAT3, accordingly. This effectively bypasses the failed ISL.

FIG. 30B shows an example routing diagram 3050 in which dynamic routing exploits multilink interfaces to handle load balancing. As described herein, feeder links consist of a number of parallel communication channels (e.g., 16×250 MHz channels for a Ka uplink), rather than a single point-to-point link. Embodiments of the routing layer described herein can handle such multilink output interfaces by using a load-balancing algorithm to select one of the links in the bundle for a specific packet. To minimize out-of-order packets for a flow, the router can hash a suitable identifier provided by the sender and placed in the label (e.g., LB field) to select an available and in-service link. This load balancing scheme can be fault-tolerant because, upon the failure of a link, the algorithm can hash to a different available link.

PDCP and SDAP Layers

As described above, embodiments of SRANs described herein include anchor nodes and SNN sites. As illustrated in FIG. 2, for example, the anchor node user plane hosts SDAP and PDCP, and the RLC/MAC/PHY stack resides in the satellite payload. The split of SDAP/PDCP in the anchor node and the RLC/MAC/PHY stack in the satellite payload can be based on an ORAN split configuration in which the anchor node effectively becomes the ORAN CU, and the satellite payload effectively becomes the ORAN DU. Aspects of the RLC/MAC/PHy stack (i.e., DU functions) are described in detail above. Additional aspects of the SDAP/PDCP (i.e., CU functions) are described in this section.

Figure 31:
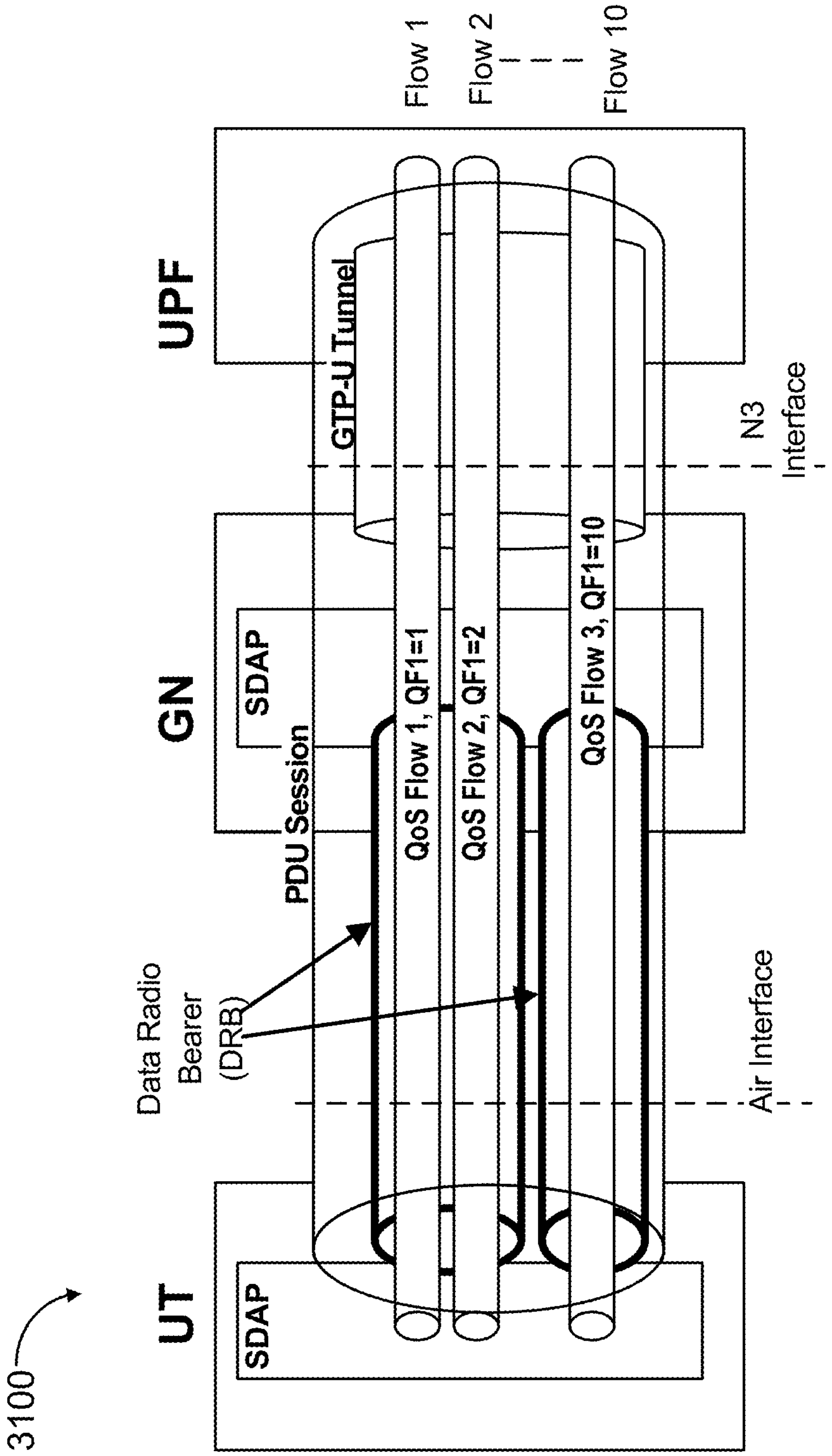
FIG. 31 shows an example architecture for mapping QoS flows to data radio bearers (DRBs) in SDAP.

Turning first to the service data adaption protocol (SDAP), QOS flows in the types of networks described herein (e.g., 5G networks) do not inherently have a one-to-one mapping with the radio bearers. 3GPP specifications define an additional SDAP layer above the PDCP layer to map one or more QoS flows to the radio bearer (DRB). FIG. 31 shows an example architecture 3100 for mapping QoS flows to data radio bearers (DRBs) in SDAP. A single PDU session can carry one or more QoS flows. In the illustrated example, QoS Flow 1 and QoS Flow 2 are mapped into a same first DRB, and QoS Flow 10 is mapped into a second DRB. Within a PDU session, each QoS flow is identified by a QoS Flow Identifier (QFI). Each QoS Flow can include 5QI, ARP, and GBR or Non-GBR traffic. Implementations can use one N3 GTP-U tunnel per PDU Session.

Turning to packet data convergence protocol (PDCP), the PDCP layer provides service to the SDAP and RRC layers, including transfer of user and control plane data, ciphering and integrity protection, and header compression. Regarding ciphering and integrity protection, embodiments can use AES-256 encryption. The PDCP Sequence Number (SN) can be either 12 bits or 18 bits. The 18-bit sequence is especially useful for GEO compatibility of the air interface and/or when WAN infrastructure delays are on the order of hundreds of milliseconds. According to 5G standards, the maximum size of the PDCP service data unit (SDU) is 9,000 bytes for both data and control, which permits carriage of 9000 bytes jumbo frames. To prevent packet loss during handover, PDCP status reporting can be enabled.

Figure 32:
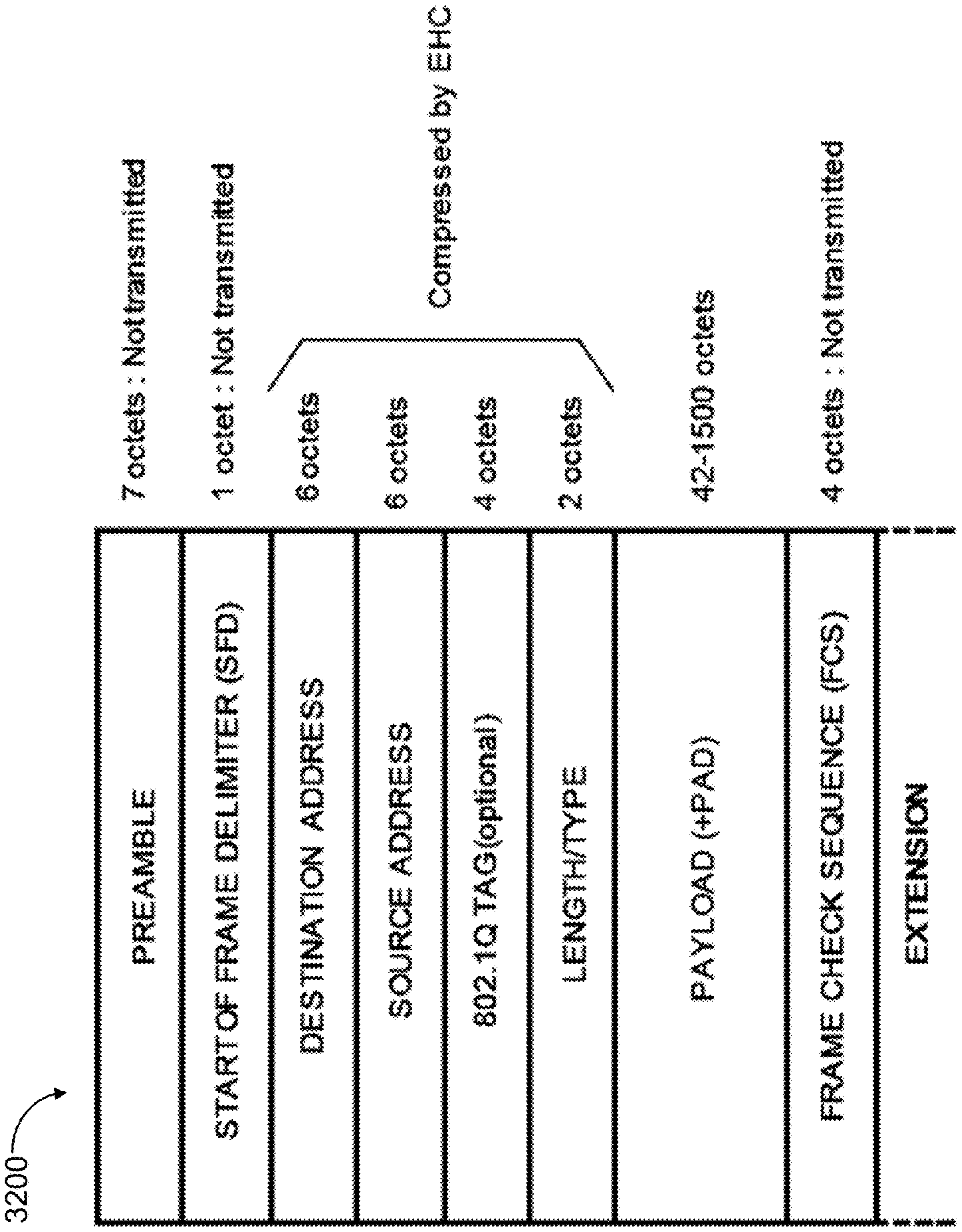
FIG. 32 shows an example of an Ethernet packet format with EHC-compressed bytes.

Regarding header compression, for Ethernet-type PDU sessions, PDCP provides Ethernet header Compression (EHC) to compress the Ethernet header. FIG. 32 shows an example of an Ethernet packet format 3200 with EHC-compressed bytes. PDCP can also support robust header compression according to profiles. The following table provides an example list of PDCP-supported robust header compression protocols and profiles. The reference column provides references to Internet Engineering Task Force (IETF) Request for Comments (RFC) identifiers (e.g., RFC 5795, released in March 2010).

| Profile Identifier | Usage | Reference |
|---|---|---|
| 0x0000 | No compression | RFC 5795 |
| 0x0006 | TCP/IP | RFC 6846 |
| 0x0101 | RTP/UDP/IP | RFC 5225 |
| 0x0102 | UDP/IP | RFC 5225 |
| 0x0103 | ESP/IP | RFC 5225 |
| 0x0104 | IP | RFC 5225 |

At the SDAP/PDCP (i.e., CU-related) level, embodiments additionally support network slicing and virtual connections (VCs). Network slicing is a mandatory 5G feature which allows network resources to be dedicated to each of several network slices. Inside each slice, a 5G QoS Indicator (5QI) can be applied to different flows. Each slice can carry one or more virtual connections (i.e., PDU Sessions) among the 15 virtual connections a UT can have. Each virtual connection can support up to 10 QoS Flows. An example of such a virtual connection is illustrated by FIG. 31 above.

Figure 33:
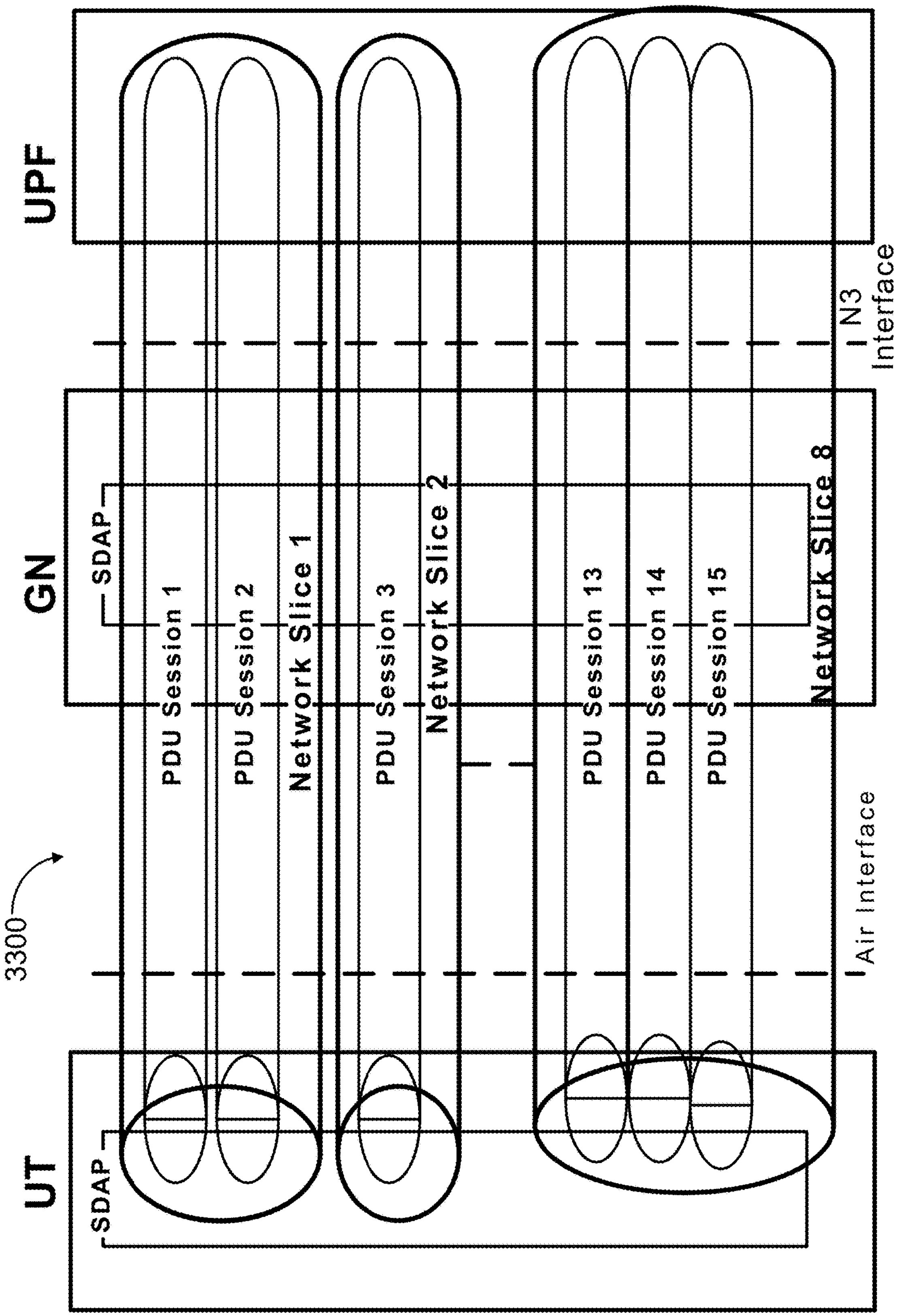
FIG. 33 shows an architecture 3300 similar to the architecture of FIG. 31, which relates several network slices to several virtual connections.

FIG. 33 shows an architecture 3300 similar to the architecture 3100 of FIG. 31, which relates several network slices to several virtual connections (indicated as PDU sessions). As illustrated, this is facilitated in part by SDAP functions in both the SRAN ("GN") and the UT. As shown, multiple virtual connections can be inside of each network slice.

In some embodiments of the network architectures described herein, each UT can support a maximum of eight slices, which can be standardized slices, non-standardized slices, or a mixed of standardized slices and non-standardized slices. Standardized slices are defined by 3GPP standards. For example, 3GPP currently defines five standardized slice types (SST) as shown in the following table.

| Slice | SST |
|---|---|
| eMBB | 1 |
| URLLC | 2 |
| MIoT | 3 |
| V2X | 4 |
| HMTC | 5 |

"SST" is an 8-bit value, where values 0-127 are reserved for standardized slices, and values 128-255 are reserved for non-standardized SST. In some embodiments, the slices in a UT (e.g., 8 slices) will be purposed based on needs of different business cases, such as business-to-customer, military, government, etc. To accommodate these cases, network slicing using non-standardized SST values can be used. A service provider share concept can be used to schedule and provide radio resource slicing from a SRAN perspective.

Figure 34:
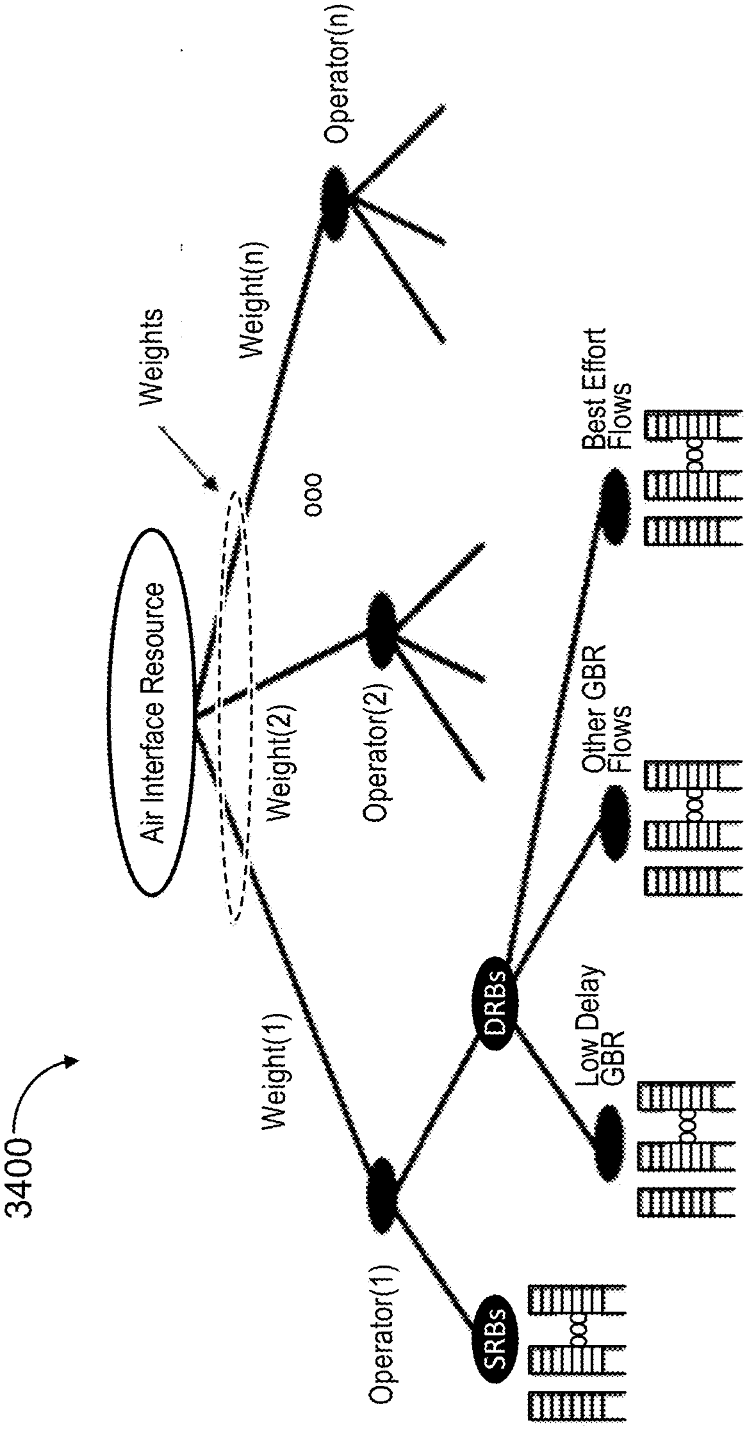
FIG. 34 illustrates an example architecture for hierarchical scheduling for radio resource slicing across service providers.

FIG. 34 illustrates an example architecture 3400 for hierarchical scheduling for radio resource slicing across service providers. As illustrated, an air interface resource can assign different weights for different operators, and network resources (e.g., bandwidth) can be allocated according to the weights. For each operator, within the allocated resources, different flows can be assigned to different radio bearers. For example, a signaling flows can be assigned to a signaling radio bearers (SRBs) and data flows can be assigned to data radio bearers (DRBs). In some implementations, different categories of flows are assigned to different flows. For example, low-delay GBR flows are assigned to a first one or more DRBs, other GBR flows are assigned to a second one or more DRBs, and best effort flows are assigned to a third one or more DRBs.

Reference User Terminals

Descriptions herein refer to user terminals. In some embodiments, "reference" user terminals (RUTs) are designed to verify and validate end-to-end system goals, constraints, etc. The RUT supports the same architecture and functional interfaces as a production user terminal for a fixed environment. In some implementations, variants of RUTs are designed to represent variants of production user terminals, such as to be representative of a mobile environment (aero, maritime, and land).

Figure 35:
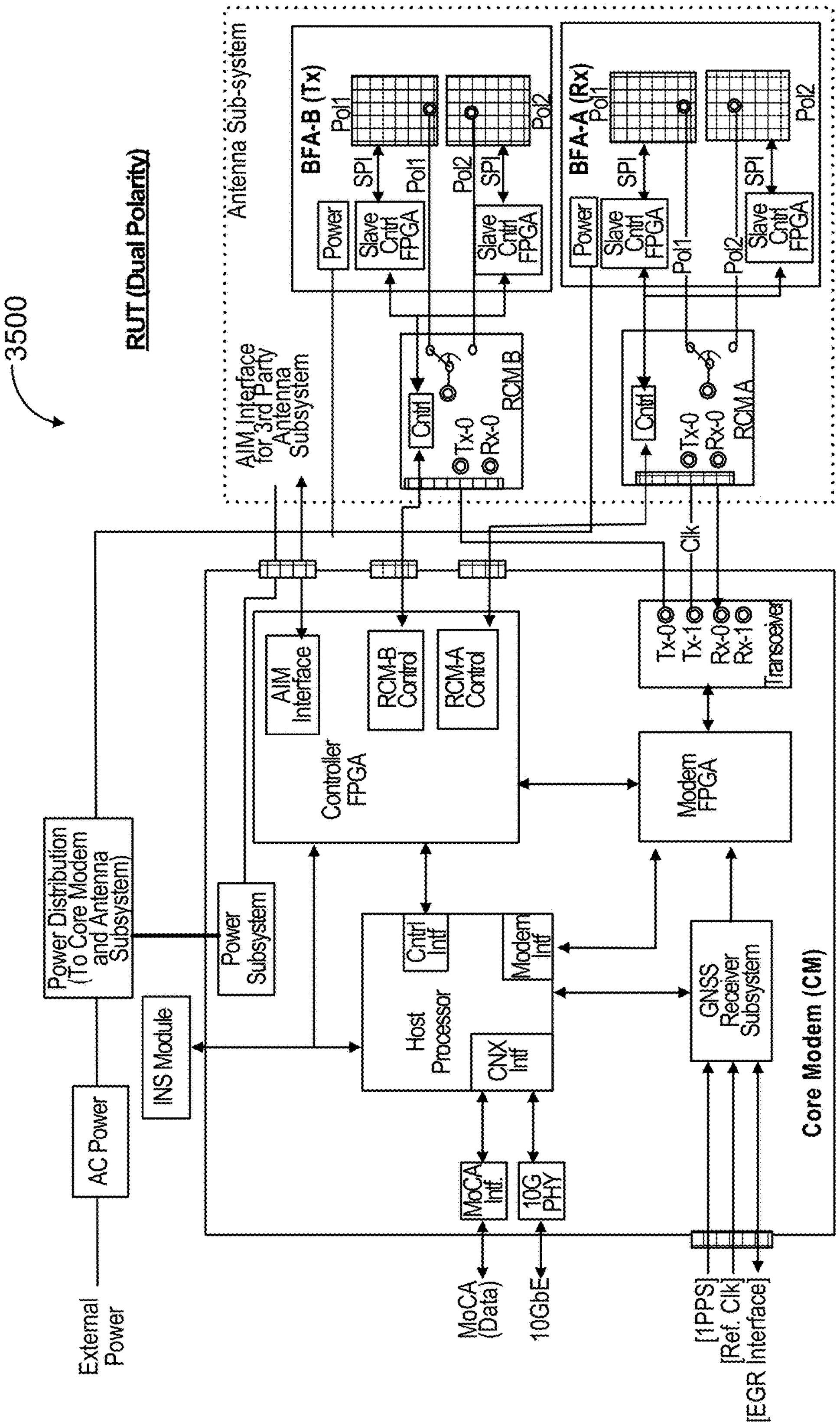
FIG. 35 shows a functional block diagram of an example of a reference user terminal (RUT).

FIG. 35 shows a functional block diagram of an example of a reference user terminal (RUT) 3500. The functional block diagram can be considered as a superset of functional modules (i.e., embodiments can be implemented with a portion of the illustrated modules). The RUT supports antenna subsystems and interfaces described herein and/or compatible with embodiments herein. As illustrated, embodiments of the RUT include at least a core modem (CM), RF converter module (RCM), and beam forming array (BFA). The CM provides baseband and modem functionality, such as by implementing a UT 5G stack in addition to a control interface for the RCM and BFA. The RCM implements up-conversion (e.g., from S-band to Ku-band) in the transmission path and down-conversion (e.g., from Ku to L-band) in the receive path. Embodiments of the RCM also perform gain/power adjustments to compensate for RCM and BFA variations. In one implementation, the receive port is 500 MHz wide from the RCM to the CM to enable carrier aggregation across two 250 MHz carriers on the downlink; and the transmit port from the CM to the RCM is 250 MHz wide to enable carrier aggregation across two 125 MHz carriers in the return direction. The BFA provides an electronically steerable beamforming board for full- and/or half-duplex operations. Some implementations support transmit and/or receive operations with a receive band from 10.7-12.7 GHZ and a transmit band from 13.75 GHz-14.5 GHz. The BFA can connect to the RCM through a common RF interface port (e.g., at Ku band). Two orthogonal polarizations (e.g., LHCP and RHCL) are supported by switching the RCM output to the BFA. In some embodiments, the RUT 3500 with supplied phased array antenna will have a nominal receive sensitivity of 11 dB/K (with a boresight of 11.7 GHz), which can be reduced to 3 dB/K by restricting the number of array elements used (e.g., via software commands).

The functional block diagram in FIG. 35 can be considered as a superset of functional modules (i.e., embodiments can be implemented with a portion of the illustrated modules). In some cases, a board with such a superset is developed and produced, and variants of the RUT can be implemented by performing reconfiguration and/or different stuffing options of various components on the board. Several examples of such variants of the RUT of FIG. 35 can be considered. For example, the RUT 3500 of FIG. 35 can be considered as a high-end full-duplex RUT variant configured to represent a mobile user terminal. Implementations of the RUT 3500 support maritime and aero applications. As illustrated, the variant can have a single CM board supporting two BFA antennas. One BFA-B is for transmit-only operation and the other is for receive-only operation. The aero variant can add a GNSS/INS module for attitude information (pitch, roll and yaw) with reference to the BFA's X, Y, Z axis for computation of beam forming parameters. This variant can also meet additional environmental specifications for aero terminals.

Figure 36:
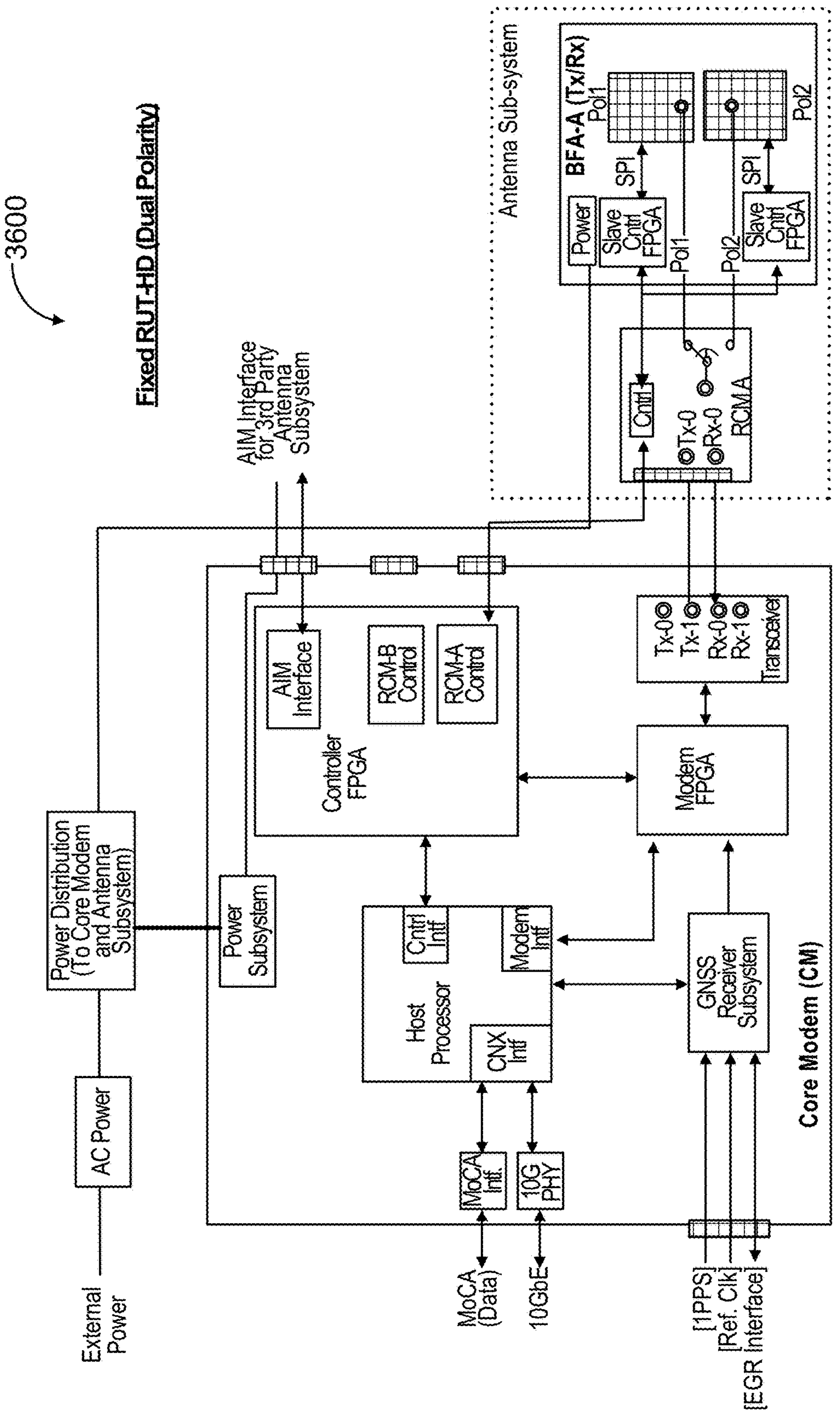
FIG. 36 shows a functional block diagram of an example of a fixed half-duplex RUT with dual polarity support.
Figure 37:
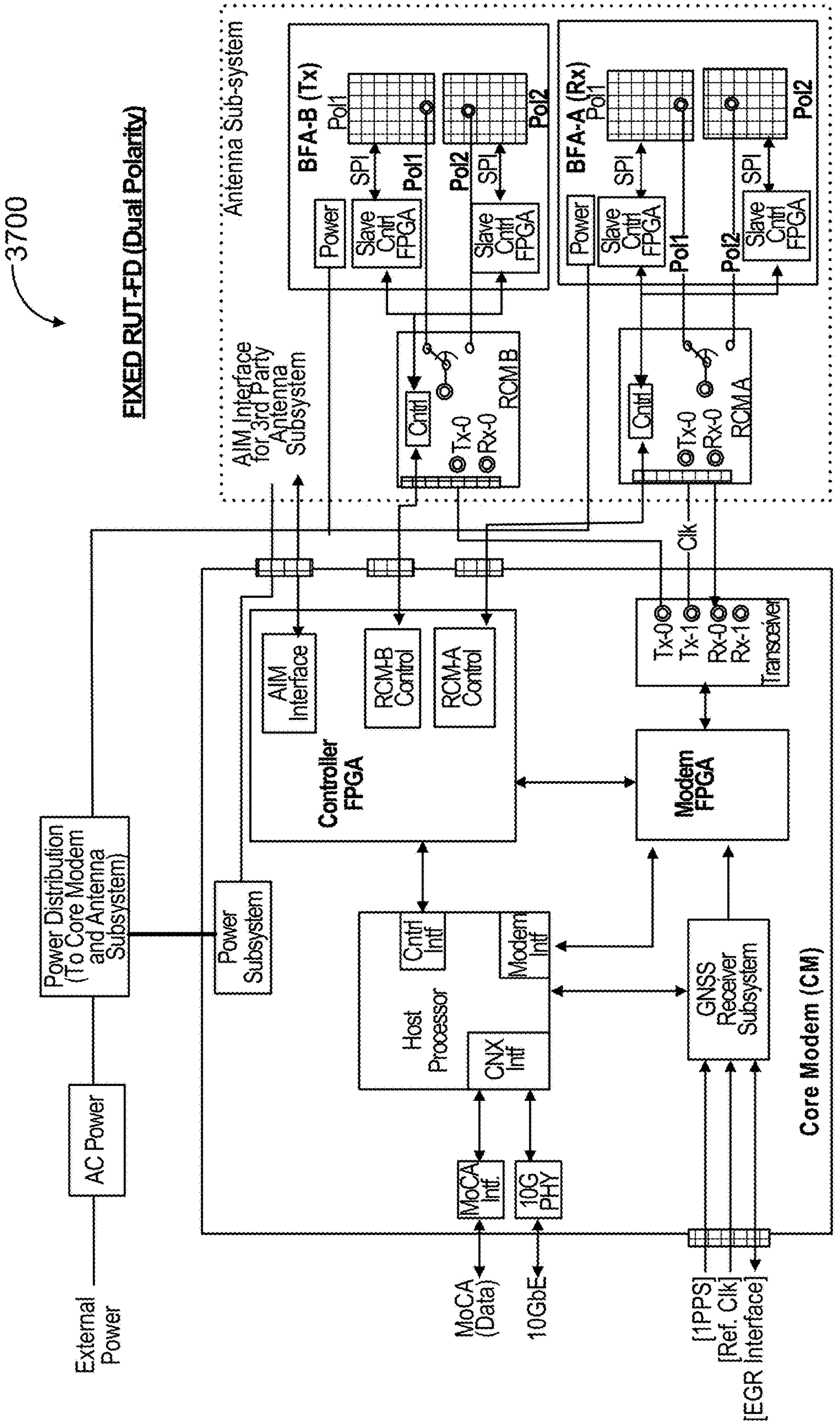
FIG. 37 shows a functional block diagram of an example of a fixed full-duplex RUT with dual polarity support.

FIG. 36 shows a functional block diagram of an example of a fixed half-duplex RUT 3600 with dual polarity support. For example, this RUT 3600 cannot transmit and receive simultaneously and cycles between Transmit ON, Receive ON, and Idle stated with a single supported BFA antenna. FIG. 37 shows a functional block diagram of an example of a fixed full-duplex RUT 3700 with dual polarity support. For example, this RUT has 3700 a single CM board supporting two BFA antennas for each polarity. As illustrated, BFA-B is for transmit-only operation, and BFA-A is for receive-only operation.

Figure 38:
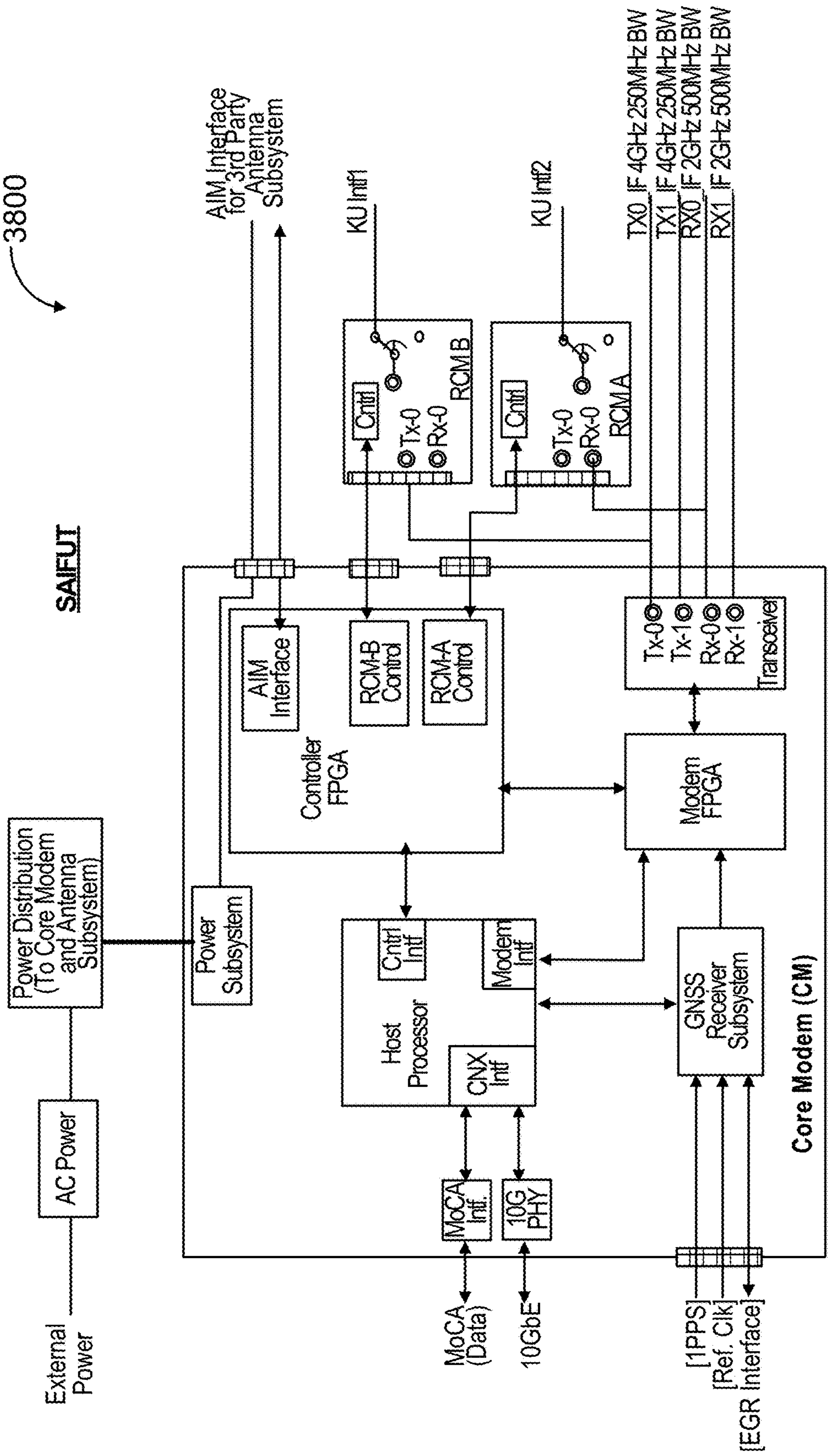
FIG. 38 shows a functional block diagram of an example of a stand-alone IF user terminal (SAIFUT).

FIG. 38 shows a functional block diagram of an example of a "Stand-Alone IF User Terminal" (SAIFUT) 3800. For example, the SAIFUT 3800 is a single-board IF-based setup for lab testing. The SAIFUT 3800 can provide an IP interface for IP-level testing (e.g., to validate the upper layer 5G stacks and their interaction with each of the elements in the system), can provide transmit and receive IF interfaces for IF lab testing, and can be a standalone unit with its own power supply (e.g., via standard NEMA-15 receptacle). This unit can also provide an optional input of a 10 MHz clock and a 1PPS input for testing with a constellation simulator. Embodiments of the SAIFUT 3800 can have capabilities to support L2 and/or L3 use cases.

Figure 39:
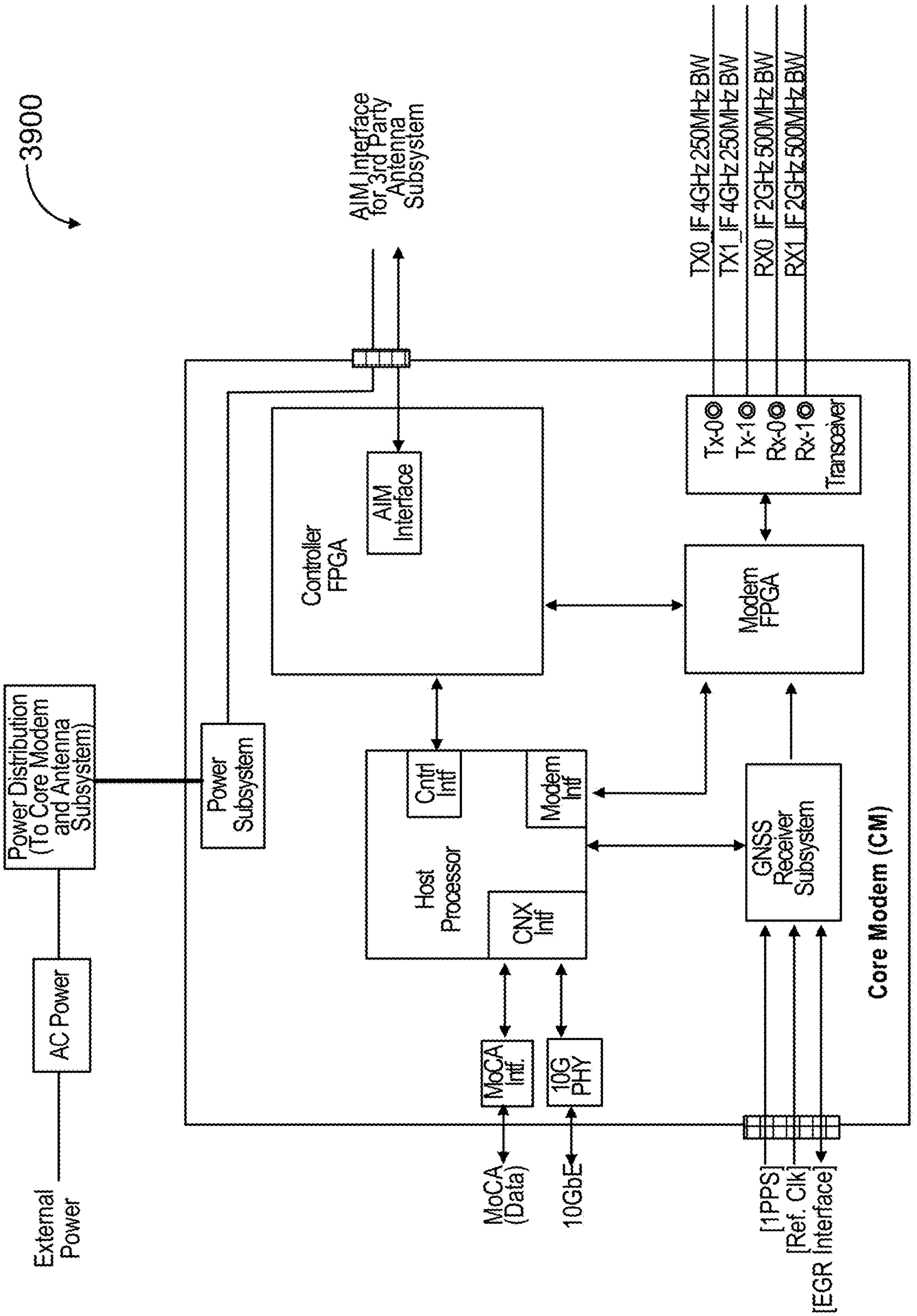
FIG. 39 shows an example circuit configuration for connecting to a third-party antenna subsystem.

FIG. 39 shows an example circuit configuration 3900 for connecting to a third-party antenna subsystem. The antenna interface management (AIM) can provide power and control and two transmit ports, and two receive ports can be provided for the IF interface. The example configuration 3900 includes an embodiment of the core modem (CM). The CM can provide modem, baseband, and control functionality. A host processor can be the main data path router between the modem and a user interface. The host processor can provide customer interface selection between MoCA and 10 GbE user interfaces. Embodiments of the RUT host processor can be implemented as a system on a chip (SOC), such as using a multi-core high-performance chip. For example, such an SOC implementation can provide a DDR3/4 controller, flash controller, numerous high speed I/O support (e.g., PCIE, USB, ethernet, etc.), and low-speed serial interfaces.

A controller FPGA on the CM can provide antenna and RF control to the antenna sub-system and can also control the RCM module. The controller FPGA can also control the power of the BFA and the RCM and can provide fault management services for the CM system. A modem FPGA can provide modem functionality in accordance with air interface specifications (e.g., as described herein). The modem FPGA can connect to an IF transceiver that has two transmit path interfaces and two receive path IF interfaces. In some implementations, the CM includes an inertial navigation system (INS) module and/or other modules and/or interfaces to support aero mode. Embodiments of the CM can incorporate DC-DC converters to power some or all terminal elements.

Embodiments of the RUT are responsible for communicating traffic to and/or from the user interfaces, for initiating network calls through system architectures described herein, handling fault management and recovery, handling logging and statistics, etc. Some embodiments of UTs are implemented by two chip processing platforms: one for UT management and network services, and one for modem activities. Nonetheless, embodiments of the RUT can be implemented using a single processing unit (e.g., with multiple cores), combining all the UT processing under one system.

Figure 40:
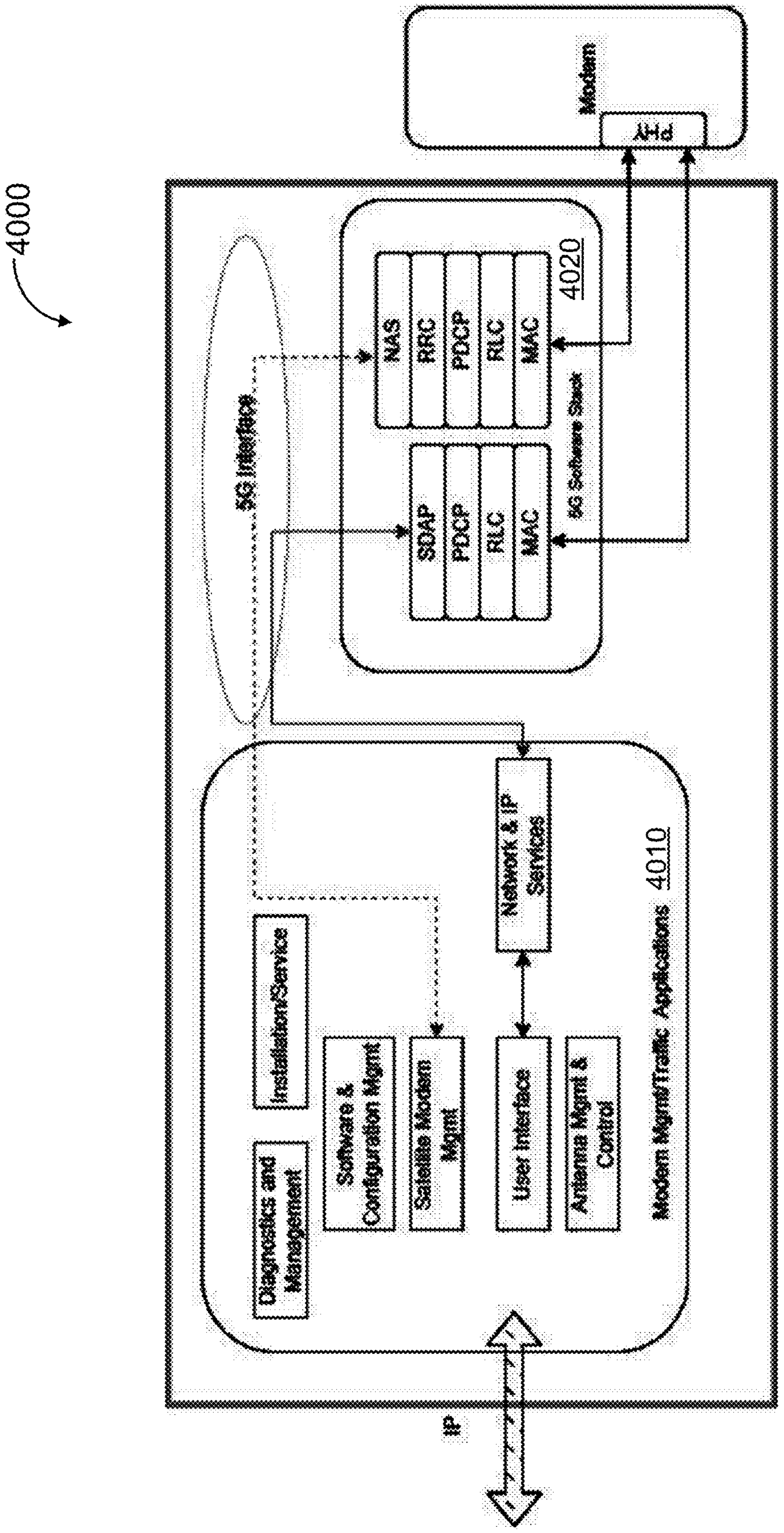
FIG. 40 shows a block diagram illustrating that the RUT can run under a single Linux system and can be home to two sets of applications.

For example, FIG. 40 shows a block diagram 4000 illustrating that the RUT can run under a single Linux system and can be home to two sets of applications. A first set of applications 4010 deals with overall management of the RUT and interactions with both the end user as well as various subsystems of the RUT, including, for example, interactions with the modem, antenna subsystem, and CNX/Ethernet. These applications 4010 can run as several Linux processes: to manages overall RUT Software and configuration; to perform features to monitor and record key events and statistics; to communicate with the 5G software stack, and to handle and distribute GNSS data, to exchange information with the antenna subsystem. A second set of applications 4020 can implement the 5G software stack (or other network software stack if implementing a network protocol other than 5G). A message-based interface between the second applications 4020 and the first applications 4010 can guarantee portability and autonomy. The second set of applications 4020 can handle messages and data transfer to and from the core network, including facilitating the user-link UE protocol stack based on 5G standards, providing interface functions to the first set of applications 4010 and to the modem, etc.

Figure 41:
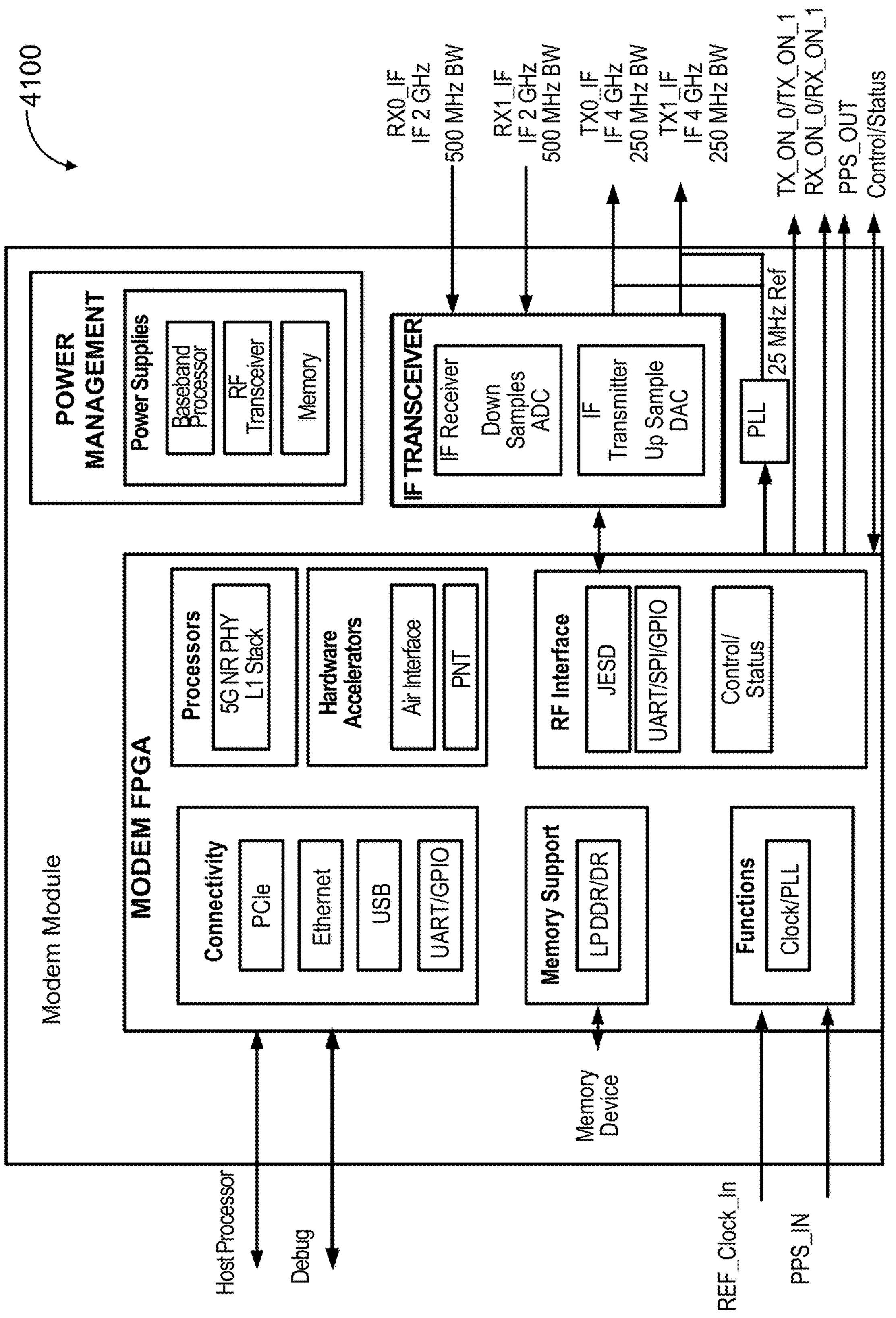
FIG. 41 shows a functional block diagram of an illustrative modem module.

FIG. 41 shows a functional block diagram of an illustrative modem module 4100. In some embodiments, the modem module is implemented using a SOC-based FPGA. The modem FPGA can serve as a platform for all major baseband functions of user-link physical layer and can integrate several functions, including user-link air interface modem functions, and interface functions to the host processor, IF transceiver, and antenna subsystem. Embodiments of the modem module can include the modem FPGA, a memory device, an IF transceiver device, and a PLL. The modem FPGA can be the baseband processor which can include at least the following major sub-systems: a multi-core ARM processor sub-system for implementing the 5G layer 1 stack, an FPGA fabric to host the hardware accelerators to implement compute intensive modem signal processing functions, a memory subsystem to interface to external memory, and a connectivity subsystem that supports high speed interfaces such as PCIe, USB and Ethernet (e.g., the interface to the IF transceiver can use serial JESD interfaces).

The air interface modem can be based on 5G NR standards. A forward-link modem FPGA can support two 250 MHz bandwidth, adjacent channels for purposes of carrier aggregation. There can be two receive signals of 500 MHz BW each, and only one of them may be active at any time to support a third-party antenna subsystem. On the return link, the SOC may support two transmit carriers of 125 MHz BW for uplink carrier aggregation. The two 125 MHz carriers may be contiguous and sent as 250 MHz bandwidth at 4 GHz IF. There may be two transmit signals of 250 MHz, and only one of them may be active at any time to support a third-party antenna subsystem. The IF transceiver can interface to the modem FPGA using a JESD interface.

There can be dedicated ARM processors in the modem FPGA to assist the hardware accelerators in functions such as cell search, link adaptation, beam hopping, handovers, and cold/warm acquisition. The modem can provide TX_ON_1, TX_ON_2, RX_ON_1, and RX_ON_2 signals to be used by the antenna subsystem as enable signals for transmit and receive, respectively. The modem can use a GPS-provided reference clock as a reference for the baseband processor and IF transceiver and can supply a 25 MHz reference signal for the RCM.

Computational System

Figure 42:
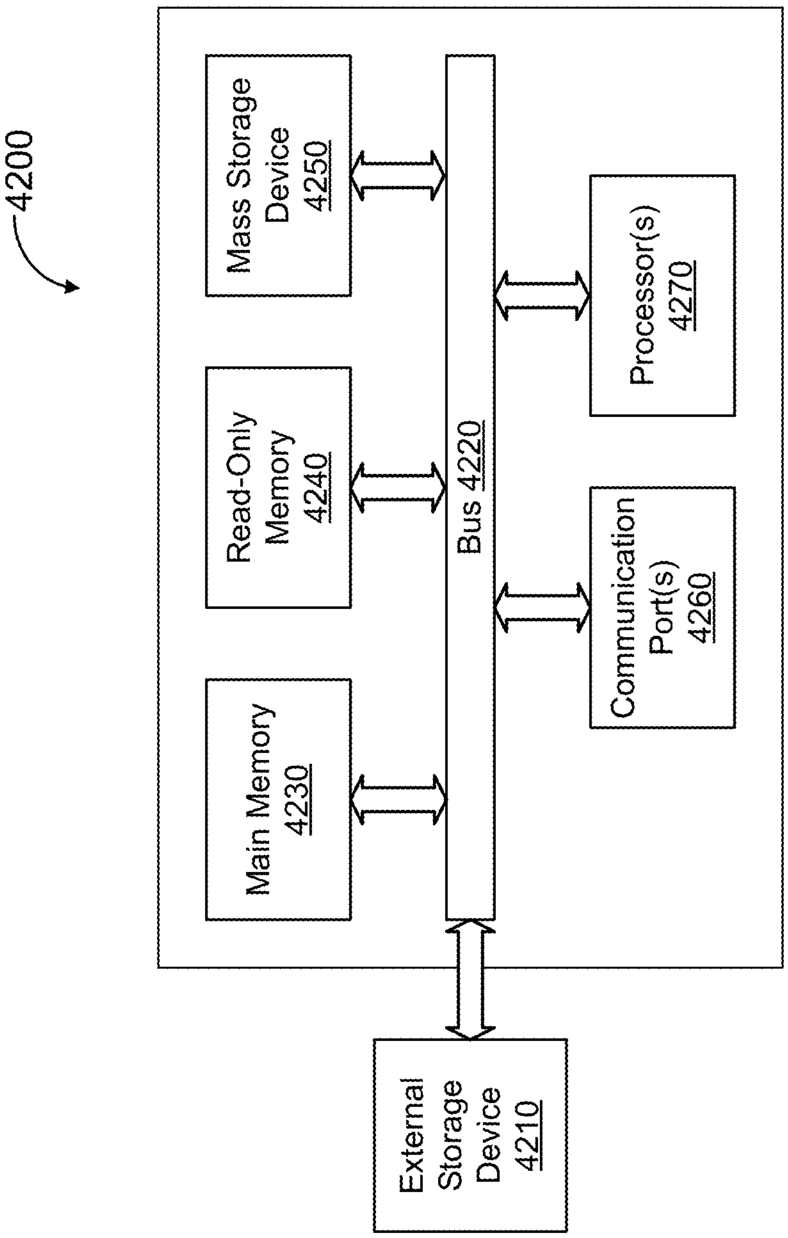
FIG. 42 illustrates an example computational system in which or with which embodiments of the present system may be implemented.

Various systems are described herein. Embodiments of those systems and/or components of those systems can be implemented using a computational system. FIG. 42 illustrates an example computational system 4200 in which or with which embodiments of the present system may be implemented. Embodiments of the computational system 4200 may include an external storage device 4210, a bus 4220, a main memory 4230, a read-only memory 4240, a mass storage device 4250, communication port(s) 4260, and processor(s) 4270. A person skilled in the art will appreciate that the computational system 4200 may include one or more processors 4270 and one or more communication ports 4260.

The processor(s) 4270 can include one or more cores, such as a multi-core processor for parallel processing. The processor(s) 4270 can be special-purpose processors and/or general-purpose processors that are configured for special purposes describes herein. For example, the main memory 4230 (and/or read-only memory 4240 and/or external storage device 4210) can include non-transitory, processor-readable memory having instructions stored thereon. When the instructions are executed, they can effectively reconfigure the processor(s) 4270 by causing the processor(s) 4270 to perform specific instructions corresponding to implementing specific features of embodiments described herein. For example, methods and processes described herein can be implemented by programming the processor(s) 4270 to perform the steps of those methods and processes.

The communication port(s) 4260 may be any of an RS-232 port for use with a modem-based dialup connection, a 10/100 Ethernet port, a Gigabit or 10 Gigabit port using copper or fiber, a serial port, a parallel port, or other existing or future ports. The communication port(s) 4260 may be chosen depending on a network, such a local area network (LAN), wide area network (WAN), or any network to which the computational system 4200 connects. The main memory 4230 may be random access memory (RAM), or any other dynamic storage device commonly known in the art. The read-only memory 4240 may be any static storage device(s) including, but not limited to, a Programmable Read Only Memory (PROM) chips for storing static information e.g., start-up or basic input/output system (BIOS) instructions for the processor 4270. The mass storage device 4250 may be any current or future mass storage solution, which may be used to store information and/or instructions.

The bus 4220 communicatively couples the processor 4270 with the other memory, storage, and communication blocks. The bus 4220 may be, e.g. a Peripheral Component Interconnect (PCI)/PCI Extended (PCI-X) bus, Small Computer System Interface (SCSI), universal serial bus (USB), etc., for connecting expansion cards, drives, and other subsystems as well as other buses, such a front side bus (FSB), which connects the processor 4270 to the computer system 4200. Optionally, operator and administrative interfaces, e.g. a display, keyboard, and a cursor control device, may also be coupled to the bus 4220 to support direct operator interaction with the computer system 4200. Other operator and administrative interfaces may be provided through network connections connected through the communication port(s) 4260. In no way should the exemplary computational system 4200 limit the scope of the present disclosure.

CONCLUSION

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. Components of a larger system, wherein other rules may take precedence over or otherwise modify the application of the invention. Also, a number of steps may be undertaken before, during, or after the above elements are considered.

What is claimed is:

1. A method for multicast communication in an integrated terrestrial-non-terrestrial network (iTNTN), the method comprising:
  - receiving join messages from N user terminals (UTs) by a ground node of a satellite radio access network (SRAN) of the iTNTN, the join messages indicating a request by the UTs to join a multicast session, wherein N is an integer greater than 1;
  - forwarding the join messages by the ground node to a multicast gateway;
  - receiving, by the ground node from the multicast gateway, N point to point (PTP) streams of replicated multicast content associated with the multicast session, each PTP stream destined for a corresponding one of the N UTs;
  - constructing, by the ground node, for each of M cells determined to be serving the N UTs, wherein M is a positive integer less than N, a corresponding one of M multicast radio bearers, each multicast radio bearer to carry a corresponding one of M PTM streams to a corresponding one of the M cells;
  - fusing, by the ground node, the N PTP streams into the M point to multipoint (PTM) streams; and
  - sending the M PTM streams to the N UTs in the M cells via the M multicast radio bearers.

2. The method of claim 1, further comprising:
  - generating, by the multicast gateway responsive to receiving the join messages, multicast membership information for the multicast session;
  - communicating the multicast membership information from the multicast gateway to a multicast content server that hosts the multicast content associated with the multicast session;
  - receiving the multicast content by the multicast gateway from the multicast content server; and
  - replicating and encapsulating the multicast content into the N PTP streams.

3. The method of claim 2, wherein the communicating the multicast membership information from the multicast gateway to the multicast content server further comprises coordinating between the multicast gateway and the multicast content server to construct a Protocol Independent Multicast-Sparse Mode (PIM-SM) multicast tree for the multicast session.

4. The method of claim 1, wherein performance of the constructing step begins responsive to receiving a first of the join messages.

5. The method of claim 1, wherein each multicast radio bearer is constructed at a centralized unit user plane (CU-UP) level of the iTNTN.

6. The method of claim 1, wherein each multicast radio bearer is constructed to carry the corresponding one of M PTM streams to the corresponding one of the M cells via at least one satellite of a constellation of non-geosynchronous orbit (NGSO) satellites of the iTNTN.

7. The method of claim 1, wherein the forwarding the join messages comprises forwarding the join messages from the ground node to a user plane function node of the core network via a tunnel as a unicast communication, such that the user plane function forwards the join messages to the multicast gateway.

8. The method of claim 7, wherein the forwarding the join messages from the ground node to the user plane function node uses a combined user datagram protocol and Internet protocol (UDP/IP).

9. The method of claim 1, wherein the join messages are Internet Group Management Protocol (IGMP) membership report messages.

10. A system for multicast communication in an integrated terrestrial-non-terrestrial network (iTNTN), the system comprising:

a ground node of a satellite radio access network (SRAN) of the iTNTN, the ground node comprising one or more processors and a non-transitory memory having instructions stored thereon which, when executed, cause the one or more processors to perform steps comprising:

receiving join messages from N user terminals (UTs) by a ground node of a satellite radio access network (SRAN) of the iTNTN), the join messages indicating a request by the UTs to join a multicast session, wherein N is an integer greater than 1;

forwarding the join messages by the ground node to a multicast gateway coupled with a core network of the iTNTN;

receiving, by the ground node from the multicast gateway, N point to point (PTP) streams of replicated multicast content associated with the multicast session, each PTP stream destined for a corresponding one of the N UTs;

constructing, by the ground node, for each of M cells determined to be serving the N UTs, wherein M is a positive integer less than N, a corresponding one of M multicast radio bearers, each multicast radio bearer to carry a corresponding one of M PTM streams to a corresponding one of the M cells;

fusing, by the ground node, the N PTP streams into the M point to multipoint (PTM) streams; and sending the M PTM streams to the N UTs in the M cells via the M multicast radio bearers.

11. The system of claim 10, further comprising:

the multicast gateway, the multicast gateway comprising a second one or more processors and a second non-transitory memory having second instructions stored thereon which, when executed, cause the second one or more processors to perform second steps comprising:

generating, by the multicast gateway responsive to receiving the join messages, multicast membership information for the multicast session;

communicating the multicast membership information from the multicast gateway to a multicast content server that hosts the multicast content associated with the multicast session;

receiving the multicast content by the multicast gateway from the multicast content server; and replicating and encapsulating the multicast content into the N PTP streams.

12. The system of claim 11, wherein the communicating the multicast membership information from the multicast gateway to the multicast content server further comprises coordinating between the multicast gateway and the multicast content server to construct a Protocol Independent Multicast-Sparse Mode (PIM-SM) multicast tree for the multicast session.

13. The system of claim 10, wherein:

the multicast gateway interfaces with a core network portion of the iTNTN via a network reference point; and the SRAN portion of the iTNTN is in communication with the core network portion of the iTNTN via one or more anchor nodes.

14. The system of claim 13, wherein the ground node and one of the one or more anchor nodes are in a same point of presence (POP) of the iTNTN.

15. The system of claim 10, wherein performance of the constructing step begins responsive to receiving a first of the join messages.

16. The system of claim 10, wherein each multicast radio bearer is constructed at a centralized unit user plane (CU-UP) level of the iTNTN.

17. The system of claim 10, wherein each multicast radio bearer is constructed to carry the corresponding one of M PTM streams to the corresponding one of the M cells via at least one satellite of a constellation of non-geosynchronous orbit (NGSO) satellites of the iTNTN.

18. The system of claim 10, wherein the forwarding the join messages comprises forwarding the join messages from the ground node to a user plane function node of the core network via a tunnel as a unicast communication, such that the user plane function forwards the join messages to the multicast gateway.

19. The system of claim 18, wherein the forwarding the join messages from the ground node to the user plane function node uses a combined user datagram protocol and Internet protocol (UDP/IP).

20. The system of claim 10, wherein the join messages are Internet Group Management Protocol (IGMP) membership report messages.

* * * * *